(12) United States Patent
Matsumoto et al.

(10) Patent No.: US 7,798,718 B2
(45) Date of Patent: Sep. 21, 2010

(54) ROLLING ELEMENT ACCOMMODATING BELT FOR LINEAR GUIDE APPARATUS AND LINEAR GUIDE APPARATUS

(75) Inventors: Jun Matsumoto, Kanagawa (JP); Yoshinori Mizumura, Kanagawa (JP)

(73) Assignee: NSK Ltd., Tokyo (JP)

( * ) Notice: Subject to any disclaimer, the term of this patent is extended or adjusted under 35 U.S.C. 154(b) by 997 days.

(21) Appl. No.: 11/529,444

(22) Filed: Sep. 29, 2006

(65) Prior Publication Data

US 2007/0076989 A1 Apr. 5, 2007

(30) Foreign Application Priority Data

| Sep. 29, 2005 | (JP) | ............ P. 2005-284086 |
| Sep. 29, 2005 | (JP) | ............ P. 2005-284087 |
| Nov. 10, 2005 | (JP) | ............ P. 2005-325987 |
| Feb. 2, 2006 | (JP) | ............ P. 2006-025952 |
| Feb. 7, 2006 | (JP) | ............ P. 2006-029804 |

(51) Int. Cl.
*F16C 29/06* (2006.01)

(52) U.S. Cl. .................. 384/45; 384/51; 384/54; 384/43

(58) Field of Classification Search .......... 384/15, 384/43–45, 51, 50, 54, 49; 29/898.03
See application file for complete search history.

(56) References Cited

U.S. PATENT DOCUMENTS

| 5,108,197 | A | * | 4/1992 | Morita | ............... 384/45 |
| 5,385,406 | A | * | 1/1995 | Ichida et al. | ............ 384/45 |
| 6,070,479 | A | * | 6/2000 | Shirai | ............... 384/51 |
| 6,094,819 | A | * | 8/2000 | Teramachi et al. | ....... 29/898.03 |
| 6,116,783 | A | * | 9/2000 | Shirai et al. | ............ 384/43 |
| 6,152,602 | A | * | 11/2000 | Honma et al. | ............ 384/45 |
| 6,155,718 | A | * | 12/2000 | Takamatsu et al. | ........ 384/45 |
| 6,481,893 | B1 | * | 11/2002 | Greiner | ............... 384/45 |

(Continued)

FOREIGN PATENT DOCUMENTS

DE 20318163 U1 * 4/2004

(Continued)

OTHER PUBLICATIONS

Japanese Office Action dated Apr. 7, 2010, in counterpart Japanese Application No. 2005-284086.

(Continued)

*Primary Examiner*—Marcus Charles
(74) *Attorney, Agent, or Firm*—Sughrue Mion, PLLC

(57) ABSTRACT

There is provided a rolling element accommodating belt for a linear guide apparatus which has a guide rail, a slider having a load rolling element guiding face which constitutes a rolling element track path together with the guide rail, a pair of direction converting paths and a rolling element return path, a plurality of rolling elements circulating within an endless circulation path defined by the rolling element track path, the pair of direction converting paths and the rolling element return path; and a guide groove. The rolling element accommodating belt includes a plurality of spacer portions interposed between the rolling elements, coupling arms to be guided by the guide grooves and rolling element accommodating portions accommodating the rolling element. The spacer has an inward abutting face abutting on the rolling element so as to prevent the rolling element from moving to inner diameter side of the endless circulation path.

12 Claims, 60 Drawing Sheets

U.S. PATENT DOCUMENTS

| | | | |
|---|---|---|---|
| 6,520,680 B2 * | 2/2003 | Kato et al. | 384/45 |
| 6,733,179 B2 * | 5/2004 | Michioka et al. | 384/44 |
| 6,802,647 B2 * | 10/2004 | Hausberger et al. | 384/45 |
| 6,830,378 B2 * | 12/2004 | Michioka et al. | 384/49 |
| 7,178,982 B2 * | 2/2007 | Chin-Pei et al. | 384/51 |
| 2002/0067869 A1 * | 6/2002 | Michioka et al. | 384/45 |
| 2002/0090152 A1 * | 7/2002 | Shirai et al. | 384/45 |
| 2002/0118898 A1 * | 8/2002 | Blaurock et al. | 384/43 |
| 2006/0034552 A1 * | 2/2006 | Nakano | 384/45 |
| 2006/0159373 A1 * | 7/2006 | Matsumoto | 384/45 |

FOREIGN PATENT DOCUMENTS

| | | | |
|---|---|---|---|
| JP | 3-105042 U | 10/1991 | |
| JP | 5-52217 A | 3/1993 | |
| JP | 2607993 B2 | 2/1997 | |
| JP | 10-9264 A | 1/1998 | |
| JP | 10-089359 A | 4/1998 | |
| JP | 10-281154 A | 10/1998 | |
| JP | 11-002241 A | 1/1999 | |
| JP | 11-2264 A | 1/1999 | |
| JP | 11-351255 A | 12/1999 | |
| JP | 2000-081041 A | 3/2000 | |
| JP | 2001-165169 A | 6/2001 | |
| JP | 3299450 B2 | 4/2002 | |
| JP | 2002-130272 A | 5/2002 | |
| JP | 3447849 B2 | 7/2003 | |
| JP | 2005-147353 A | 6/2005 | |
| JP | 2005164008 A * | 6/2005 | |
| WO | WO 2005068860 A1 * | 7/2005 | |

OTHER PUBLICATIONS

Japanese Office Action dated Apr. 7, 2010, in counterpart Japanese Application No. 2005-284087.

Japanese Office Action dated Apr. 7, 2010, in counterpart Japanese Application No. 2006-025952.

Japanese Office Action dated Apr. 7, 2010, in counterpart Japanese Application No. 2006-029804.

* cited by examiner

ROLLING ELEMENT ACCOMMODATING BELT FOR LINEAR GUIDE APPARATUS AND LINEAR GUIDE APPARATUS

TECHNICAL FIELD

This invention relates to a rolling element accommodating belt for a linear guide apparatus and the linear guide apparatus equipped with such a rolling element accommodating belt.

RELATED ART

Such a kind of linear guide apparatus includes a guide rail having a rolling element guiding face and a slider which is arranged to be movable relatively to the guide rail. The slider has a load rolling element guiding face which constitutes a rolling element track path together with the rolling element guiding face. Further, the slider incorporates a pair of direction converting paths communicating to both ends of the rolling element track path, respectively, and a rolling element return path communicating to the pair of direction converting paths. These rolling element track paths, pair of direction converting paths and rolling element return path constitute an endless circulation path. A plurality of rolling elements circulate within the endless circulation path while they roll. Within the endless circulation path, guide grooves are formed internally along the endless circulation path.

Further, within the endless circulation path, a rolling element accommodating belt is provided. The rolling element accommodating belt includes a plurality of spacers interposed between the adjacent rolling elements in the endless circulation path and coupling arms each coupling the spacers with each other and outwardly hanging over from the end faces of the spacers so as to be guided by the guide grooves. These spacers and coupling arms define rolling element accommodating portions. By individually accommodating the rolling elements within the rolling element accommodating portions apart from each other by a predetermined distance, the rolling elements are aligned in an arrangement direction within the endless circulation path (see Japanese Patent Examined Publications JP-B-2607993, JP-B-3447849 and JP-B-3299450 and Japanese Patent Unexamined Publication JP-A-2002-130272).

JP-B-2607993 discloses a linear guide apparatus provided with a rolling element accommodating belt 10150 in which as seen from e.g. FIG. 19, an opening size W between spacers 10151 opposite to each other in each of rolling element accommodating portions 10155 is made smaller than the outer diameter of the rolling element 146 in order to hold the rolling element (ball) so that it cannot drop out from the rolling element accommodating belt.

JP-B-3447849 discloses a linear guide apparatus provided with a rolling element accommodating belt in which a relief portion is formed between the rolling elements and the rolling element accommodating portion by particular processing such as oil or water supply after the rolling element accommodating belt has been molded by injection molding with the rolling elements (balls) being cores.

JP-B-3299450 discloses a linear guide apparatus provided with a rolling element accommodating belt having rolling element accommodating portions for accommodating the rolling elements removably without holding them.

JP-A-2002-130272 discloses a linear guide apparatus provided with a rolling element accommodating belt in which the thickness of the spacers in a predetermined range is limited so that the they are movable toward the inner and outer peripheries of an endless circulation path.

However, in the technique disclosed in JP-B-2607993 since the opening size of the rolling element accommodating portion is smaller than that of the rolling element, in mounting the rolling elements in the rolling element accommodating portions, after exact alignment between the rolling elements and the rolling element accommodating portions has been made, the rolling elements must be depressed by appropriate force. This makes the assembling operation troublesome and the automation difficult.

Particularly, as seen from FIG. 19, where a rolling element 10146B is mounted in a center rolling element accommodating portion after rolling elements 10146A have been mounted in both neighboring rolling element accommodating portions, both neighboring rolling elements 10146A hinder elastic deformation of spacers 10151. So, the rolling element 10146B must be pushed into the rolling element accommodating portion 10155 by fairly strong depressing force F. Owing to such strong depressing force F, the spacers 10151 may be deformed so that their form is not restored, and further may be broken. Incidentally, if the rolling elements are successively mounted in the rolling element accommodating belt from its one end toward the other end, because the spacers on the side where the rolling elements are not mounted are likely to be deformed, the rolling elements can be mounted in by relatively small force. However, such a mounting operation is troublesome and requires skill, which is a factor hindering facilitation of manufacture.

In the technique disclosed in JP-B-3447849, in the injection molding, the rolling elements must be previously aligned in a mold and also special processing must be done after the injection molding has been completed. So, the manufacture cannot be still executed easily.

On the other hand, in the technique disclosed in JP-B-3299450, because the rolling element accommodating portion accommodates in its front/back direction (defined between the inner diameter side and the outer diameter side), the rolling element removably without holding the rolling element, the operation of mounting the rolling element in the rolling element accommodating portion can be easily done.

On the other hand, in the technique disclosed in JP-B-3299450, because the rolling element accommodating portion accommodates the rolling element removably without holding the rolling element, the operation of mounting the rolling element in the rolling element accommodating portion can be easily done.

However, as described above, inn this kind of linear guide apparatus, the coupling arms of the rolling element accommodating belt are guided by the guide grooves formed along the endless circulation path. Therefore, where the rolling element accommodating belt disclosed in JP-B-3299450 is employed, as seen from FIG. 38, a rolling element accommodating belt 1150 bent in a direction converting path 1124 within an endless circulation path 1128 expands toward the outer periphery in linear portions 1120, 1126 of the endless circulation path 1128 so that coupling arms 1152 of the rolling element accommodating belt 1150 move while rubbing the side walls on the outer peripheral side of guide grooves 1160, 1138 in the linear portions. This is attributed to the fact that the rolling element accommodating belt 1150 is essentially formed in a linear shape so that force to restore from the bent state to a straight state acts.

In this way, in the technique described in JP-B-3299450, since the coupling arms of the rolling element accommodating belt move while rubbing the side walls on the outer peripheral side of guide grooves, the smooth circulation of the rolling element accommodating belt will be impaired. The coupling arms may be also damaged owing to the rubbing.

In the technique disclosed in JP-A-2002-130272, in the rolling element accommodating belt, the thickness of the spacers in a predetermined range is limited. In this configuration also, with the rolling elements being mounted in the endless circulation path, the spacers are movable in the above predetermined range in the front/back direction of the rolling element accommodating portion. Thus, like the technique disclosed in JP-B-3299450, swing of the rolling element accommodating belt or friction with the guide grooves may occur, which is a factor hindering the smooth operation of the linear guide apparatus.

As a rolling element accommodating belt, the techniques described in e.g. Japanese Patent Unexamined Publication JP-A-05-52217 is disclosed.

In the technique disclosed in JP-A-05-52217, for example, as seen from FIG. 46, a plurality of spacers 2151 each intervening between adjacent balls 246 are provided. The spacers 2151 are coupled with one another by a flexible belt-like coupling portion 2152 thereby to constitute a rolling element accommodating belt 2150. Each the spacers 2151 has a pair of holding concave portions 2151c each being in slidable-contact with the adjacent ball 246. Each the pair of holding concave portions 2151c is formed of a concave curved face which follows the outer periphery of the ball 246 in sliding-contact therewith so that the ball 246 between the pair of holding concave portions 2151c is restricted in any orientation.

In accordance with the rolling element accommodating belt, a string of rolling elements can be formed by holding the balls between the pair of holding concave portions of the adjacent spacers. Since the string of rolling elements circulate within the endless circulation path, rubbing or competition between the rolling elements is restricted, thereby improving the circulation capability of the balls.

However, in the technique disclosed in JP-A-05-52217, since the holding concave portion of each spacer is formed of a concave curved face which follows the outer periphery of the ball, the contact between the holding concave portion and the ball is a plane-contact which gives a large contact area. If the contact area is large, owing to the shearing resistance of lubricant usually existing between the spacer and the rolling element, the friction when the rolling element rolls is increased. Thus, the sliding resistance of the linear guide apparatus is increased so that its smooth movement is hindered.

Furthermore, as such a kind of rolling element accommodating belt, the techniques described in e.g. Japanese Patent Unexamined Publications JP-A-11-002264, JP-A-2001-165169 and JP-A-10-009264 are disclosed.

In the techniques described in these references, the rolling element accommodating belt is provided with a plurality of spacers each interposed between adjacent balls. The respective spacers are coupled with one another by a flexible belt-like coupling portion, thereby providing the rolling element accommodating belt. In accordance with such a rolling element accommodating belt, a string of rolling elements can be formed by accommodating the rolling elements between the spacers. Since the string of rolling elements circulate within the endless circulating path, rubbing or competition between the rolling elements is restricted, thereby improving the capability of circulation of the rolling elements.

Now, in the technique disclosed in JP-A-11-002264, the rolling element accommodating belt is formed in a terminating shape. Both terminating ends are opposite to each other in a non-contact state within an endless circulating path. Between both ends opposite to each other, a single rolling element for buffering is mounted. Both ends abutting on the rolling element for buffering have faces each abutting on the rolling element accommodated there, respectively. The abutting faces have concave curved faces each of which follows the outer periphery of the rolling element in sliding-contact with the abutting face.

In the technique disclosed in JP-A-2001-165169, between both ends of the rolling element accommodating belt, a rolling element for keeping both ends in a separated state (hereinafter referred to as a separating rolling element) is arranged. At least one of both ends has a concave curved face which at least partially conforms to the outer periphery of the separating rolling element.

In accordance with the rolling element accommodating belt disclosed in the above JP-A-11-002264 or JP-A-165169, since the rolling element is arranged also between both ends, it is possible to restrain the number of rolling elements undergoing load within the endless circulating path from being reduced. Further, since both ends are restricted by the rolling element owing to the concave curved faces formed there, swing of the end can be restricted.

In the technique disclosed in JP-A-10-009264, between both ends of the rolling element accommodating belt, the rolling element is not arranged but a gap is arranged.

Now, if extension of the rolling element accommodating belt is not considered, in order to restrict the swing of the ends of the rolling element accommodating belt, it is desired that the gaps between the ends of the rolling element accommodating belt and the rolling element is limited as small as possible or so as to always keep their contact state.

However, actually, since the rolling element accommodating belt as exemplified above is made of resin or elastomer, owing to heat generated by its friction with the rolling elements due to circulation within the endless circulating path, the rolling accommodating belt gives extension in the longitudinal direction. Thus, the rolling element arranged between both ends is forcibly held down. As a result, smooth rolling of this rolling element is hindered so that sliding resistance of the slider will be increased.

Particularly, in the technique disclosed in JP-A-11-002264, since the holding concave portion of each spacer is formed of a concave curved face which follows the outer periphery of a ball, the contact between the holding concave portion and the ball is a plane-contact which gives a large contact area. If the contact area is large, owing to the shearing resistance of lubricant usually existing between the spacer and the rolling element, the friction when the rolling element rolls is increased. Thus, the sliding resistance of the slider is further increased so that smooth movement of the slider is hindered.

On the other hand, in the technique disclosed in JP-A-10-009264, between both ends of the rolling element accommodating belt, the rolling element is not arranged but the gap is formed. So, the problem that the rolling element between both ends is forcibly held down does not occur. However, since the rolling element is not arranged between both ends, when both ends of the rolling element accommodating belt are located on the rolling element track path in which the rolling elements undergo load within the endless circulating path, the number of the rolling elements undergoing load will be reduced. As a result, as compared with the rolling element accommodating belt where the rolling element is located between both ends, the load capacity or rigidity of the linear guide apparatus will be lowered.

A traditional linear guide apparatus is constructed in the following structure. A circulation path is formed by coupling a return path provided at a saddle-like slider, direction converting paths formed in end caps and a load path composed of a rail track groove formed on a rail and a slider track groove formed on a slider, which are opposite. Balls are loaded in a belt holder including spacers for separately holding the adjacent balls when they circulate along the circulation path and a coupling belt for coupling the spacers with one another. In such a structure, on the side of the outer periphery of the circulation path, each the spacers is provided with an arc concave face formed to fix the thickness of a sectional shape thereof, and on the side of the inner periphery thereof, the spacer is provided with a spherical concave face formed to make the fan-shape sectional shape, thereby preventing the abrasion at the inner peripheral edge of the spacers. In addition, also on the side of the outer periphery of the circulation path, the spacer is provided with the spherical concave face formed to form the fan-shape sectional shape, thereby preventing the ball from dropping out when the slider is removed from the rail (for example, see JP-A-2002-130272).

In some liner guide devices having the similar configuration, spherical concave faces are formed on both end faces of the spacer to provide a hand-drum shape (for example, see JP-A-05-052217).

Further, in some liner guide devices having the similar configuration, two disks are arranged in parallel to form a spacer and spherical concave faces are formed on the end faces on their ball side to provide the hand-drum shape. Otherwise, spacers each having a semi-disk shape are arranged in a staggered form on the front and back surface of the coupling belt, and spherical concave faces each of which is half of the above spherical concave face are formed on the end faces on their ball side, thereby giving a large bending angle of the coupling arm (for example, see JP-A-11-351255).

Generally, the belt holder is resin-molded by injection molding using a resin material so that the coupling belt can have flexibility.

However, in the technique disclosed in the above conventional JP-A-2002-130272, since the edge of the spherical concave face formed in the spacer is formed directly on the outer face of the spacer, its apex angle is an acute angle smaller than 90° to provide a thin wall. So, in resin molding, resin is difficult to reach the thin-wall area and hence a chipped area is likely to occur. As a result, the shape as designed may not be obtained.

Further, since the thin-wall area is likely to become deformed, when the ball is mounted in the belt holder, crushing or chipping is likely to occur. As a result, the belt holder and the ball may interfere with each other and so mounting of the ball is made difficult. Thus, the manufacturing capability of the linear guide apparatus may be deteriorated.

This also applies to the hand-drum shape spacer disclosed in JP-A-05-052217, and the hand-drum shaped spacer composed of two sheets or a semi-disk shaped spacer disclosed in JP-A-11-351255.

On the other hand, in many cases, the linear guide apparatus is mounted in a machine with the slider being removed from the slider in order to facilitate the mounting of the rail.

In such a case, in the technique disclosed in JP-A-2002-130272, on the side of the outer periphery of the circulation path, each the spacers is provided with an arc concave face formed to fix the thickness of a sectional shape thereof; and on the side of the inner periphery thereof, the spacer is provided with a spherical concave face formed to make the fan-shape sectional shape. Therefore, in removing the slider, the ball is likely to drop out through the arc-concave face toward the rail corresponding to the outer periphery of the circulation path. This may deteriorate the workability of the mounting operation.

SUMMARY OF THE INVENTION

This invention has been accomplished in view of the above problems. An object of this invention is to provide a rolling element accommodating belt for a linear guide apparatus, capable of facilitating mounting of rolling elements in the rolling element accommodating belt, restricting swing of the rolling element accommodating belt or its friction with guide grooves, preventing coupling arms of the rolling element accommodating belt from rubbing the side walls of guide grooves and the linear guide apparatus provided with such a rolling element accommodating belt.

Further, another one of objects of this invention is to provide a rolling element accommodating belt and a linear guide apparatus which can restrain increase in the friction due to the mutual contact between a spacer and a rolling element.

Furthermore, one of objects of this invention is to provide a rolling element accommodating belt and a linear guide apparatus which where a rolling element is arranged between both ends of a terminating rolling element accommodating belt, even if extension of the rolling element accommodating belt in its longitudinal direction is generated, can restrain smooth rolling of the rolling element arranged between both ends from being hindered and the sliding resistance of a slider from being increased.

In addition, one of objects of the invention is to provide a means for preventing deformation of the edge of a spherical concave face formed on a spacer and failing off of a rolling-element when a slider is removed.

In view of the above, according to a first aspect of the invention, there is provided a rolling element accommodating belt for a linear guide apparatus which comprises:
  a guide rail having a rolling element guiding face;
  a slider arranged relatively movable to the guide rail and comprising:
    a load rolling element guiding face opposite to the rolling element guiding face to constitute a rolling element track path together with the rolling element guiding face;
    a pair of direction converting paths communicating to both ends of the rolling element track path; and
    a rolling element return path communicating to the pair of direction converting paths;
    a plurality of rolling elements circulating while rolling within an endless circulation path defined by the rolling element track path, the pair of direction converting paths and the rolling element return path; and
    a guide groove provided internally along the endless circulation path,
  the rolling element accommodating belt comprising:
    a plurality of spacer portions interposed between the rolling elements adjacent to each other;
    coupling arms coupling the spacer portions with one another and hanging over outwardly from end faces of the spacer portions so as to be guided by the guide grooves; and
    rolling element accommodating portions defined by the spacer portions and the coupling arms and accommodating the rolling element individually so as to align the rolling elements in an arrangement direction in which the rolling element aligns within the endless circulation path,
  wherein the spacer comprises an inward abutting face abutting on the rolling element so as to prevent the rolling element from moving to inner diameter side of the endless circulation path.

According to a second aspect of the invention, as set forth in the first aspect of the invention, the spacer further comprises an abutting face abutting on the rolling element, the abutting face permits the rolling element to move outer diameter side of the endless circulation path.

According to a third aspect of the invention, as set forth in the first aspect of the invention, each of the rolling element accommodating portions permit the rolling element from failing off at least one side of inner and outer diameter sides of the endless circulation path, among the spacer portions which exist in the rolling element track path, there exist:

at least one of the spacer portions comprising an inward abutting face preventing the rolling element from moving to an inner diameter side of the endless circulation path; and at least one of the spacer portions comprising an outward abutting face preventing the rolling element from moving to an outer diameter side of the endless circulation path.

According to a fourth aspect of the invention, as set forth in any one of the first through third aspects of the invention, the rolling element accommodating belt comprising both end portions at a longitudinal direction of thereof, and the spacer portions positioned at the end portion comprising the inward abutting face.

According to a fifth aspect of the invention, as set forth in any one of the first through third aspects of the invention, the spacer portion comprising an relief portion at a position of the spacer portion further inner diameter side of the endless circulation path than the inward abutting face, and the relief portion opposes to the rolling element.

According to a sixth aspect of the invention, as set forth in any one of the first through third aspects of the invention, a part of the spacer portion which is positioned further inner diameter side of the circulation path than the coupling arm is thin plate-shaped.

According to a seventh aspect of the invention, as set forth in any one of the first through third aspects of the invention, a part of the inward abutting face which restricts a movement of the rolling elements is formed as a slope, an inclination angle of the respective slope of the inward abutting faces relative to a direction perpendicular to the arrangement direction path is constant.

According to an eighth aspect of the invention, as set forth in seventh aspect of the invention, the slope is a flat surface.

According to a ninth aspect of the invention, as set forth in seventh aspect of the invention, the slope is a concave conical surface.

According to a tenth aspect of the invention, as set forth in seventh aspect of the invention, the slope is a surface having an inclination angle satisfying following equation (1):

$$\theta k \leq \tan^{-1}(((Rb+e)\sin\theta w - (tw/2)\cos\theta w/((Rb+e)\cos\theta w + (tw/2)\sin\theta w - Rp))) - \theta w \quad (1)$$

where $\theta w = tw/2Rb$ (rad), $\theta k$ is an inclination angle (deg) of the slope relative to the direction perpendicular to the arrangement direction, tw is a distance (mm) between centers of the adjacent rolling elements when the rolling-element accommodating belt is developed, Rb is a curvature of radius (mm) of central line of the rolling-element accommodating belt at a center of the direction converting path when the rolling-element accommodating belt curves along the guide groove, "e" is a distance (mm) from a center of the rolling element to a center line of the rolling-element accommodating belt, and Rp is a curvature of radius (mm) of the central locus of the rolling element at the center of the direction converting path.

According to an eleventh aspect of the invention, there is provided a rolling element accommodating belt for a linear guide apparatus which comprises:

a guide rail having a rolling element guiding face;

a slider arranged relatively movable to the guide rail and comprising:

a load rolling element guiding face opposite to the rolling element guiding face to constitute a rolling element track path together with the rolling element guiding face;

a pair of direction converting paths communicating to both ends of the rolling element track path; and a rolling element return path communicating to the pair of direction converting paths;

a plurality of rolling elements circulating while rolling within an endless circulation path defined by the rolling element track path, the pair of direction converting paths and the rolling element return path; and a guide groove provided internally along the endless circulation path, the rolling element accommodating belt comprising:

a plurality of spacer portions interposed between the rolling elements adjacent to each other;

coupling arms coupling the spacer portions with one another and hanging over outwardly from end faces of the spacer portions so as to be guided by the guide grooves;

rolling element accommodating portions defined by the spacer portions and the coupling arms and accommodating the rolling element individually so as to align the rolling elements in an arrangement direction in which the rolling element aligns within the endless circulation path; and end portions at both ends of a longitudinal direction of the rolling element accommodating belt, both of end portions being opposed to each other in non-contacting state, wherein in the rolling element tack path, there exist at least one rolling element accommodating portion which permits the rolling element to move at least one of inner or outer diameter side of the endless circulation path and prevents the rolling element from moving other of the inner or outer diameter side, wherein the rolling element is incorporated between both of the end portions, and the end portions respectively comprises a planner abutting face.

According to a twelfth aspect of the invention, there is provided a rolling element accommodating belt for a linear guide apparatus which comprises:

a guide rail having a rolling element guiding face;

a slider arranged relatively movable to the guide rail and comprising:

a load rolling element guiding face opposite to the rolling element guiding face to constitute a rolling element track path together with the rolling element guiding face;

a pair of direction converting paths communicating to both ends of the rolling element track path; and a rolling element return path communicating to the pair of direction converting paths;

a plurality of rolling elements circulating while rolling within an endless circulation path defined by the rolling element track path, the pair of direction converting paths and the rolling element return path; and a guide groove provided internally along the endless circulation path, the rolling element accommodating belt comprising:

a plurality of spacer portions interposed between the rolling elements adjacent to each other;

coupling arms coupling the spacer portions with one another and hanging over outwardly from end faces of the spacer portions so as to be guided by the guide grooves;

rolling element accommodating portions defined by the spacer portions and the coupling arms and accommodating the rolling element individually so as to align the rolling elements in an arrangement direction in which the rolling element aligns within the endless circulation path; and end portions at both ends of a longitudinal direction of the rolling element accommodating belt, both of end portions being opposed to each other in non-contacting state, wherein in the rolling element tack path, there exist at least one rolling element accommodating portion which permits the rolling element to move at least one of inner or outer diameter side of the endless circulation path and prevents the rolling element from moving other of the inner or outer diameter side, wherein the rolling element is incorporated between both of the end portions, and the end portions respectively comprises a convex curved abutting face.

According to a thirteenth aspect of the invention, as set forth in the twelfth aspect of the invention, each the rolling elements has a diameter of 2 mm or more, and projection amount of the convex curved abutting face in the arrangement direction is within a range from 0.2 mm to 1/10 of the diameter of the rolling element.

According to a fourteenth aspect of the invention, there is provided a linear guide apparatus comprising:

a guide rail having a rolling element guiding face;

a slider arranged relatively movable to the guide rail and comprising:

a load rolling element guiding face opposite to the rolling element guiding face to constitute a rolling element track path together with the rolling element guiding face;

a pair of direction converting paths communicating to both ends of the rolling element track path; and a rolling element return path communicating to the pair of direction converting paths;

a plurality of rolling elements circulating while rolling within an endless circulation path defined by the rolling element track path, the pair of direction converting paths and the rolling element return path; and a guide groove provided internally along the endless circulation path, the rolling element accommodating belt as set forth in any one of the eleventh through thirteenth aspects of the invention.

According to a fifteenth aspect of the invention as set forth in the fourteenth aspect of the invention, gaps between the incorporated rolling element and the respective end portions in the arrangement direction is formed.

According to a sixteenth aspect of the invention, there is provided a linear guide apparatus comprising:

a guide rail having a rolling element guiding face;

a slider arranged relatively movable to the guide rail and comprising:

a load rolling element guiding face opposite to the rolling element guiding face to constitute a rolling element track path together with the rolling element guiding face;

a pair of direction converting paths communicating to both ends of the rolling element track path; and a rolling element return path communicating to the pair of direction converting paths;

a plurality of rolling elements circulating while rolling within an endless circulation path defined by the rolling element track path, the pair of direction converting paths and the rolling element return path;

a guide groove provided internally along the endless circulation path; and the rolling element accommodating belt as set forth in any one of the first though fourth aspects of the invention.

According to a seventeenth aspect of the invention as set forth in the sixteenth aspect of the invention, the guide groove is provided such that in the direction converting path, the coupling arm circulate at inner diameter side of the endless circulation path than a central locus of the rolling element.

According to an eighteenth aspect of the invention, there is provided a linear guide apparatus comprising:

a guide rail having a rolling element guiding face;

a slider arranged relatively movable to the guide rail and comprising:

a load rolling element guiding face opposite to the rolling element guiding face to constitute a rolling element track path together with the rolling element guiding face;

a pair of direction converting paths communicating to both ends of the rolling element track path; and a rolling element return path communicating to the pair of direction converting paths;

a plurality of rolling elements circulating while rolling within an endless circulation path defined by the rolling element track path, the pair of direction converting paths and the rolling element return path;

a guide groove provided internally along the endless circulation path; and a rolling element accommodating belt comprising:

a plurality of spacer portions interposed between the rolling elements adjacent to each other;

coupling arms coupling the spacer portions with one another and hanging over outwardly from end faces of the spacer portions so as to be guided by the guide grooves; and rolling element accommodating portions defined by the spacer portions and the coupling arms and accommodating the rolling element individually so as to align the rolling elements in an arrangement direction in which the rolling element aligns within the endless circulation path, wherein the spacer comprises an abutting face abutting on the rolling element the abutting face abuts on the rolling element with at least two positions, the abutting face prevents the rolling element from moving to an inner diameter side of the endless circulation path, a part of preventing a motion of the rolling element is formed as a slope, an inclination angle of the slope satisfies following equation (1):

$$\theta k \leq \tan^{-1}(((Rb+e)\sin\theta w - (tw/2)\cos\theta w/((Rb+e)\cos\theta w + (tw/2)\sin\theta w - Rp))) - \theta w \quad (1)$$

where $\theta w = tw/2Rb$ (rad), $\theta k$ is an inclination angle (deg) of the slope relative to the direction perpendicular to the arrangement direction, $tw$ is a distance (mm) between centers of the adjacent rolling elements when the rolling-element accommodating belt is developed, $Rb$ is a curvature of radius (mm) of central line of the rolling-element accommodating belt at a center of the direction converting path when the rolling-element accommodating belt curves along the guide groove, "e" is a distance (mm) from a center of the rolling element to a center line of the rolling-element accommodating belt, and $R_p$ is a curvature of radius (mm) of the central locus of the rolling element at the center of the direction converting path.

According to a nineteenth aspect of the invention, a linear guide apparatus comprising:

a rail provided with a rail rolling-element guide face;

a slider comprising a slider rolling-element guide face opposite to the rail rolling-element guide face and a return path, the slider linearly moving reciprocally on the rail;

end caps arranged at front and rear ends in a moving direction of the slider, each having a direction converting path;

a load path defined by the rail rolling-element guide face and the slider rolling-element guide face;

rolling elements rolling along circulating path defined by coupling the load path with the return path through the direction converting paths; and a belt holder comprising:

a spacer portion for separately holding the adjacent rolling elements circulated along the circulating path and a coupling belt portion for coupling the spacers with one another, wherein on at least one of outer and inner diameter sides of the circulation path, the spacer portion comprises:

a sliding-contact surface with which the rolling element slide-contacts;

a outer peripheral face larger than an edge of the sliding-contact face.

According to a twentieth aspect of the invention as set forth in the nineteenth aspect of the invention, when the spacer portion comprises the outer peripheral face larger than the edge of the sliding-contact face on one of the outer and inner diameter sides of the circulation path, the spacer further comprises a rolling element inserting guide surface on an opposite side of the outer peripheral surface.

According to a twenty-first aspect of the invention as set forth in the nineteenth or twentieth aspect of the invention, an apex angle at the edge of the sliding-contact face is 90° or more.

According to a twenty-second aspect of the invention as set forth in the nineteenth or twentieth aspect of the invention, a chamfering is provided at a corner of the outer peripheral face.

According to a twenty-third aspect of the invention as set forth in the twenty-second aspect of the invention, the chamfering is shaped in a curved face.

In accordance with one of the aspects of the invention, the rolling element accommodating portions are configured to permit the rolling elements to drop out on at least one side in their front/back direction (that is, a direction perpendicular to the arrangement direction). For this reason, in mounting the rolling elements in the rolling element accommodating portions of the rolling element accommodating belt, the rolling elements have only to be placed on the rolling element accommodating portions from the side permitting the rolling elements to drop out. Thus, a troublesome operation such as mounting the rolling elements in the rolling element accommodating portions by pushing is not required. Accordingly, the operation of mounting the rolling elements in the rolling element accommodating belt can be facilitated.

Further, in accordance with one of the aspects of the invention, at least one spacer of the spacers located in the rolling element track path in the state mounted in the endless circulation path has an outward abutting face abutting on the rolling element so that it is not movable from the mounted state toward the inner diameter side of the endless circulation path and at least one another spacer of the spacers located on the rolling element track path has an inward abutting face abutting on the rolling element so that it is not movable from the mounted state toward the outer diameter side of the endless circulation path. For this reason, since the outward abutting face and inward abutting face abut on at least one rolling element, respectively, movement of the rolling element accommodating belt is restricted in the rolling element track path at its position relative to the rolling elements in both inner peripheral and outer peripheral sides of the endless circulation path. Accordingly, even if there is external vibration applied to the linear guide apparatus or influence of gravity, swing of the rolling element accommodating belt and its friction with the side walls of the guide grooves can be restricted.

Further, one of the aspects of the invention provides a rolling element accommodating belt for the linear guide apparatus, the rolling element accommodating belt has both ends in its longitudinal direction. Each the spacers located at both ends of the rolling element terminating belt has the inward abutting face.

In accordance with this aspect of the invention, in the spacers at both ends of the rolling element accommodating belt, their inward abutting faces abuts on the rolling elements so that movement of the spacers toward the outer diameter side of the endless circulation path is restricted. Thus, even if the rolling element accommodating belt having ends is used, when the slider is removed from the guide rail, the tip of the rolling element accommodating belt will not fly out from the opening of the endless circulation path. Accordingly, the rolling element accommodating belt which can facilitate handling of the linear guide apparatus can be provided.

Further, one of the aspects of the invention provides a rolling element accommodating belt for a linear guide apparatus, wherein each the spacers has a relief portion at a region opposite to the rolling element at the end nearer to the inner diameter side of the endless circulation path than the inward abutting face.

In accordance with this aspect of the invention, when the rolling element accommodating belt curves in the direction converting path, even if the distance between the adjacent spacers is decreased on the inner peripheral side of the direction converting path, the interference between the spacers and the rolling element can be restricted by the relief portion formed in each of regions where the spacers and the rolling element are opposite on the inner peripheral side. Thus, the rolling element accommodating belt can be circulated more smoothly.

Furthermore, one of the aspects of the invention provides a rolling element accommodating belt for a linear guide apparatus, wherein each the spacers is thin and plate-like in its portion located at least nearer to the inner diameter side of the endless circulation path than the coupling arms.

In accordance with this aspect, when the distance between the adjacent spacers on the inner peripheral side of the direction converting path is decreased, even if the interference between the spacers and the rolling element occurs, the spacers can easily curve. Thus, the rolling element accommodating belt can be circulated more smoothly.

One of the aspects of the invention provides a linear guide apparatus provided with the rolling element accommodating belt.

In accordance this aspect of the invention, there is provided a linear guide apparatus capable of giving the effect of the rolling element accommodating belt.

One of the aspects of the invention provides a linear guide apparatus, wherein the guide grooves are formed to circulate the coupling arms nearer to the inner diameter side of the endless circulation path than a center locus of the rolling elements at least the direction converting paths of the endless circulation path.

In accordance with this aspect of the invention, as compared with the case where the coupling arms are circulated on the center locus of the rolling elements when the rolling element accommodating belt curves in the direction converting path, the spacers adjacent to each other within the direction converting path can be opened largely. Thus, the interference between the spacers and the rolling element in the direction converting path can be preferably restricted. Accordingly, the rolling element accommodating belt of the linear guide apparatus according to this invention can be circulated more smoothly.

One of the aspects of the invention provides a linear guide apparatus, wherein the slider has a rolling element-string guiding member covering the inner face thereof except the area serving as the load rolling element guiding face, the rolling element-string guiding member having the guide grooves, each the guide grooves formed in the rolling element-string guiding member has a side wall formed on only the one side for at least one of the coupling arms.

One of the aspects of the invention provides a linear guide apparatus, wherein the guide grooves are formed in a region except the rolling element track path.

In accordance with this aspect of the invention, as compared with the structure in which the side walls of the each the guide grooves are formed on both sides, the space necessary to from the guide grooves can be reduced. Correspondingly, the groove depth of the rolling element guiding face of the guide rail can be increased. Accordingly, the contact length between the rolling elements and the rolling element guiding face can be kept large so that the load capacity of the linear guide apparatus can be increased.

In accordance with one of the aspect of the invention, the rolling element accommodating portions are configured to permit the rolling elements to drop out toward the outer diameter side of the endless circulation path. For this reason, in mounting the rolling elements in the rolling element accommodating portions of the rolling element accommodating belt, the rolling elements have only to be placed on the rolling element accommodating portions from the side permitting the rolling elements to drop out. Thus, a troublesome operation such as mounting the rolling elements in the rolling element accommodating portions by pushing is not required. Accordingly, the operation of mounting the rolling elements in the rolling element accommodating belt can be facilitated.

Further, in accordance with this aspect of the invention, at least one of two spaces defining each the rolling element accommodating portions has an abutting face abutting on each the rolling elements so that it is not movable from the state mounted in the endless circulation path toward the outer diameter side of the endless circulation path. Therefore, in the accommodating belt bent in the direction converting path, even when it moves from the direction converting path of the endless circulation path to the linear portion thereof, the coupling arms coupled with the spacers will not expand toward the outer peripheral side of the guide grooves in the linear portion, thereby preventing the coupling arms from approaching the side walls on the outer peripheral side of the guide grooves. Accordingly, it is possible to prevent the coupling arms from moving while rubbing the side walls of the guide grooves.

In accordance with this invention, the spacers restrict movement of the rolling elements toward the inner diameter side of the endless circulation path, their restricting segment is formed of a slope which gives a constant inclination angle for the direction perpendicular to the arrangement direction in the endless circulation path. Therefore, the contact portion between the slope and the rolling element provides not a plane-contact but e.g. a point-contact or line-contact. Thus, the contact area can be reduced. For this reason, it is possible to restrain increase in the friction due to the mutual contact between the spacer and the rolling element.

The slope may be formed of a flat face. This is preferred for the case where balls or rollers are adopted as the rolling elements.

The slope may be formed of a concave conical face. This is preferred for the case where the balls are adopted as the rolling elements.

Meanwhile, in the technique described in JP-A-05-52217, because of a structure in which the spacers restrict the rolling element in any orientation, when the coupling portion curves in the direction converting path, for example, as seen from FIG. 46, particularly on the peripheral side of the direction converting path 224, the spacer 2151 and the rolling element 46 interfere with each other (in the figure, image of interference is illustrated as a black-painted portion).

Such interference can be alleviated by elastic deformation of the spacer. However, when such interference occurs, excessive pulling force inevitably acts on the coupling portion. In addition, since the pulling force repeatedly acts on the coupling portion, the coupling portion may be cut in use, thereby impairing normal circulation. Further, when the space and the rolling element interfere with each other, the rolling element will be pushed toward the outer diameter side of the endless circulation path. This increases the circulating resistance.

In order to alleviate the mutual interference between the spacer and the rolling element, more preferably, the above slope is formed of a face having an inclination satisfying Equation (1):

$$\theta k \leq \tan^{-1}(((Rb+e)\sin \theta w-(tw/2)\cos \theta w/((Rb+e)\cos \theta w+(tw/2)\sin \theta w-Rp)))-\theta w \quad (1)$$

where $\theta w=tw/2Rb$(rad), $\theta k$ is an inclination angle (deg) of the slope for the direction perpendicular to the arrangement direction within the endless circulation path, $tw$ is a distance (mm) between the centers of the adjacent rolling elements when the rolling element accommodating belt is developed, $Rb$ is a curvature of radius (mm) of the central line of the rolling element accommodating belt when the rolling element accommodating belt curves along the wall on the inner peripheral side of the guide groove at the center of the direction converting path, $e$ is a distance (mm) from the center of the rolling element to the center line of the rolling element accommodating belt, and $Rp$ is a curvature of radius (mm) of the central locus of the rolling element at the center of the direction converting path.

If the slope is formed of the face within a range defined in Equation (1), as apparent from the considerations later described in detail, the gap between the spacer and the rolling element in the direction converting path can be assured to the degree or more when the rolling element accommodating belt is extended. For this reason, it is possible to restrain increase in the friction due to the mutual contact between the spacer and the rolling element, thereby preferably alleviating the mutual interference between the spacer in the direction converting path.

In accordance with one of aspects of the invention, since the rolling element accommodating belt according to this invention is used, the linear guide apparatus having the above operational advantage can be provided.

According to one of the aspects of the invention, since the slope is formed of the face having the inclination within the range defined by the above Equation (1), the gap between the spacer and the rolling element in the direction converting path can be assured to the degree or more when the rolling element accommodating belt is extended. For this reason, it is possible to restrain increase in the friction due to the mutual contact between the spacer and the rolling element.

In accordance with one of the aspects of the invention, at both ends, their abutting face abutting on the rolling element has a flat face so that the contact portion between the abutting face and the rolling element gives not a plane-contact but a point-contact if the rolling element is a ball or a line-contact if the rolling element is a roller, thereby permitting the contact area to be reduced. As a result, if the rolling element not accommodated in the rolling element accommodating portion is mounted between both ends opposite to each other in a non-contact state within the endless circulating path, even if extension of the rolling element accommodating belt in the longitudinal direction is generated, the degree of the rolling element arranged between both ends being forcibly held down is alleviated. Accordingly, increase in the sliding resistance of the slider can be restricted.

Now, in the rolling element accommodating belt according to this invention, the abutting face at both ends has a flat face. However, in the rolling element accommodating belt according to this invention, the abutting face may have a convex curved face in place of the flat face. The convex curved face may be preferably a convex sphere. In accordance with such a configuration, the contact portion between the abutting face and the rolling element can surely give not the plane-contact but e.g. the point-contact or line-contact. Thus, the contact area can be made as small as possible as compared with the contact portion giving the plane-contact.

Particularly, if the abutting face is formed as the convex curved face, even if the rolling element accommodating belt is extended in the longitudinal direction so that the rolling element is pushed against the abutting face, the ends are likely to drift in a radial direction of the endless circulating path. Thus, it is possible to further alleviate the degree of the rolling element arranged between both ends being forcibly held down and further restrain the sliding resistance of the slider from being increased.

In the configuration in which the abutting face has a convex curved face, it is preferable that the quantity of projection of the convex curved face in the arrangement direction is within the range from 0.2 mm to 1/10 of the diameter of the rolling element. In this case, the diameter of the rolling element is 2 mm or more.

Specifically, when the rolling element accommodating belt is extended so that the rolling element is pushed against the abutting face, the abutting face is elastically deformed. In this case, if the quantity of projection is smaller than 0.2 mm, the abutting face is elastically deformed so that the contact area is larger than in the state of a desired point-contact or line-contact. This is insufficient in order to make the state of mutual contact more preferable. On the other hand, if the quantity of projection exceeds 1/10 of the diameter of the rolling element, the interval between both opposite ends becomes wide so that the load capacity or rigidity of the linear guide apparatus is correspondingly reduced. Thus, in order to reduce the contact area between the abutting face and the rolling element and restrict reduction in the load capacity of the linear guide apparatus, in the configuration in which the abutting face has the convex curved face, it is desired that the quantity of projection of the convex curved face in the arrangement direction is within the range from 0.2 mm to 1/10 of the diameter of the rolling element.

Preferably, in the rolling element accommodating belt according to this invention, each the rolling element accommodating portions is formed to permit the movement of the accommodated rolling element toward the one side of the endless circulating path and restrict it toward the other side thereof.

In accordance with such a configuration, for example, in the operation of mounting the rolling elements in the rolling element accommodating belt, the rolling elements can be easily mounted in from the side permitting the movement of the rolling element so that the efficiency of mounting or removing the rolling elements can be improved. Further, if the rolling element accommodating belt is mounted in the slider with the side permitting the movement of the accommodated rolling element being oriented toward e.g. the outer periphery of the endless circulating path, this is preferable to alleviate the mutual interference between the spacers and the rolling elements in the direction converting path.

In accordance with one of the aspects of the invention, since it employs the above rolling element according to this invention, the linear guide apparatus giving the above operational advantage can be provided.

Now, in the linear guide apparatus according to this invention, if great extension of the rolling element accommodating belt is generated owing to heat generated by the friction with the rolling elements due to circulation within the endless circulating path under a severe using environment with a great change in temperature. Under the condition in which such a case is supposed, it is preferable that when the rolling element not accommodated in the rolling element accommodating portion is mounted between both ends, both ends of the rolling element accommodating belt provide gaps between themselves and the rolling element in the arrangement direction. In accordance with such a configuration, for example, even if great extension of the rolling element accommodating belt is generated, increase in the friction due to the mutual contact between both ends and the rolling element can be restricted more preferably. Further, in accordance with the linear guide apparatus according to this invention, since it employs the above rolling element accommodating belt according to this invention, as compared with the example in which the gap is provided between both ends in the technique disclosed in the above JP-A-10-009264, even if the gap provided is smaller, the increase in the friction due to the mutual contact between the ends and the rolling element can be restricted preferably. In addition, reduction in the load capacity or rigidity of the linear guide apparatus can be also prevented or restricted.

In accordance with one of the aspects of the invention, in removing the slider, since drop-out of the ball toward the rail can be prevented, workability of the operation of mounting the rail is improved. Further, since the apex angle at the edge of the sliding-contact face is increased, no thin-wall area exist. Thus, it is possible to prevent the thin-wall area from being deformed and a chipped area from being occurring in resin molding, As a result, the predetermined shape can be easily formed.

In accordance with this invention, there can be provided a rolling element accommodating belt for a linear guide apparatus, capable of facilitating mounting of rolling elements in the rolling element accommodating belt and suppressing swing of the rolling element accommodating belt or its friction with the guide grooves and friction due to the mutual contact between a spacer and a rolling element, and the linear guide apparatus provided with such a rolling element accommodating belt.

Further, in accordance with this invention, there are provided a rolling element accommodating belt and a linear guide apparatus which where a rolling element is arranged between both ends of a terminating rolling element accommodating belt, even if extension of the rolling element accommodating belt in its longitudinal direction is generated, can restrain smooth rolling of the rolling element arranged between both ends from being hindered and the sliding resistance of a slider from being increased.

Furthermore, in accordance with one of the aspects of the invention, in removing the slider, since drop-out of the ball toward the rail can be prevented, workability of the operation of mounting the rail is improved. Further, since the apex angle at the edge of the sliding-contact face is increased, no thin-wall area exist. Thus, it is possible to prevent the thin-wall area from being deformed and a chipped area from being occurring in resin molding, As a result, the predetermined shape can be easily formed.

BRIEF DESCRIPTION OF THE DRAWINGS

FIG. 42(a) is a partially enlarged perspective view of the rolling element accommodating belt in a developed and enlarged state;

FIG. 42(*c*) is an enlarged view of a part of the rolling element accommodating portion in FIG. 42(*b*);

FIG. 45(*b*) is a partially enlarged view of FIG. 45(*a*);

FIG. 50(*b*) is a front view of FIG. 50(*a*);

FIG. 50(*c*) is an enlarged view of both ends opposite to each other within an endless circulating path;

FIG. 51(*b*) shows a second modification of the rolling element accommodating belt;

FIG. 51(*c*) shows a third modification of the rolling element accommodating belt;

FIG. 52(*b*) shows a fifth embodiment of the rolling element accommodating belt;

DETAILED DESCRIPTION OF THE PREFERRED EMBODIMENTS

Figure 1:
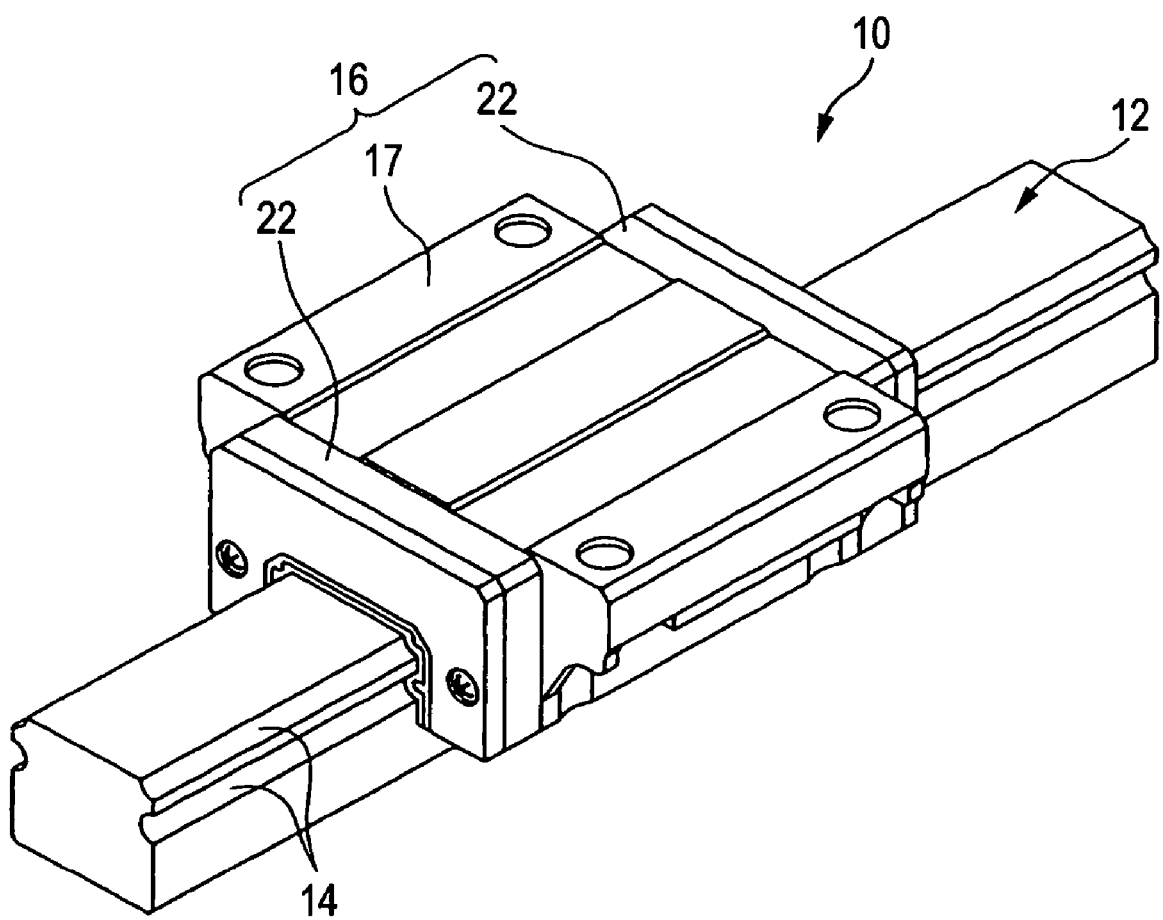
FIG. 1 is a perspective view of a linear guide according to the first embodiment of a linear guide apparatus provided with a rolling element accommodating belt therefor according to this invention.

Now referring to the drawings, an explanation will be given of various embodiments of a rolling element accommodating belt for a linear guide apparatus and the linear guide apparatus according to this invention. Note that in the drawings, "γ" denotes front/back direction, "δ" denotes an inner diameter side of an endless circulation path, "ε" denotes an outer diameter side of the endless circulation path and.

First Embodiment

Figure 2:
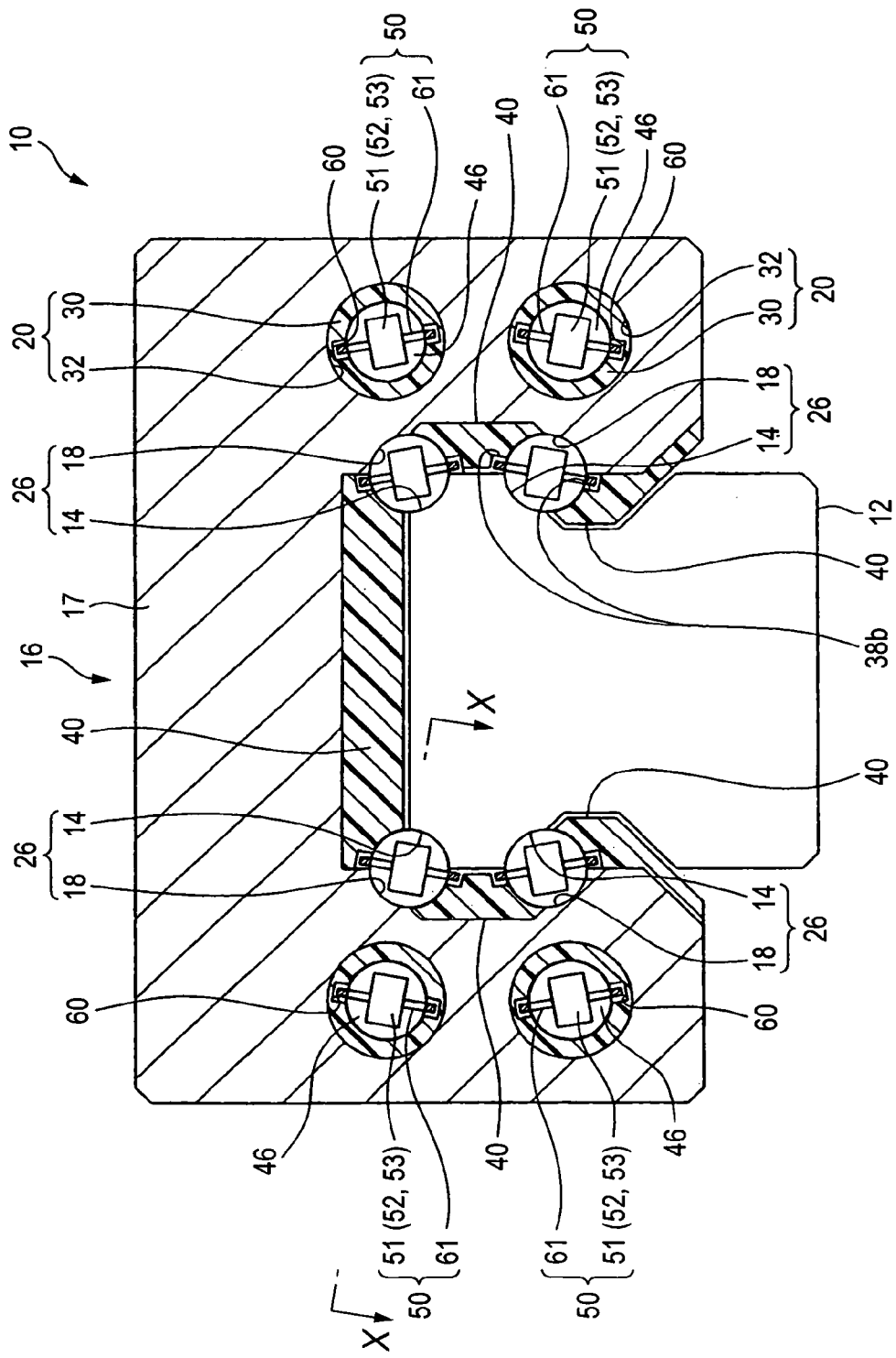
FIG. 2 is a view for explaining the cross section of a slider of the linear guide in FIG. 1.
Figure 3:
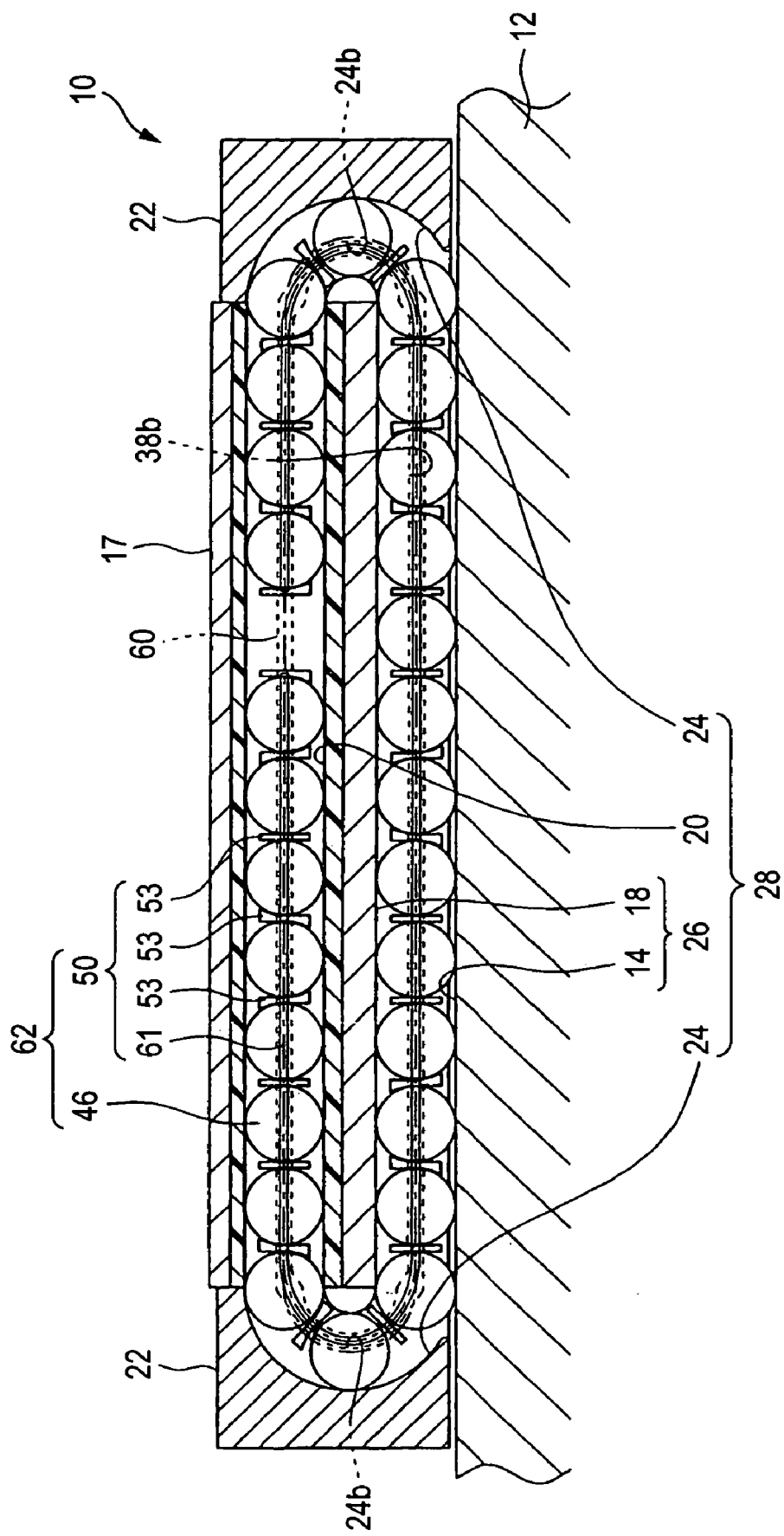
FIG. 3 is a sectional view of the linear guide taken in line X-X in FIG. 2.

FIG. 1 is a perspective view of a linear guide according to the first embodiment of a linear guide apparatus provided with a rolling element accommodating belt for use therein according to this invention. FIG. 2 is a view for explaining the cross section of a slider of the linear guide in FIG. 1. FIG. 3 is a sectional view taken in line X-X in the linear guide in FIG. 2.

As seen from FIGS. 1 and 2, a linear guide apparatus 10 includes a guide rail 12 having rolling element guiding faces 14 and a slider 16 which straddles the guide rail 12 so that the slider is movable relatively to the guide rail 12.

The guide rail 12 is formed in a square sectional shape, and has four strips of rolling element guiding faces 14, two for each of both sides which are formed linearly in the longitudinal direction.

The slider 16, as seen from FIG. 1, includes a slider body 17 and end caps 22 mounted at both ends in an axial direction of the slider body 17. The axially continuous shapes of the slider body 17 and end caps 22 are both nearly U-sectional.

The slider body 17, as seen from FIG. 2, has total four load rolling element guiding faces 18 nearly semicircular in section opposite to the respective rolling element guiding faces 14 of the guide rail 12, which are formed inside both nearly U-shaped sleeves of the slider body 17. As seen from FIG. 3, the end caps 22 have a pair of direction converting paths 24 which communicate to both ends of the load rolling element guiding face 18. Further, as seen from FIGS. 2 and 3, the slider body 17 has rolling element return paths 20 each of which is formed inside the sleeve to be in parallel to the load rolling element guiding face 18 and made as a through-hole circular in section, the rolling element return path 20 communicating to the pair of direction converting paths 24.

As seen from FIG. 3, the space sandwiched between the rolling element guiding face 14 of the guide rail 12 and the opposite load rolling element guiding face 18 of the slider body 17 constitutes a rolling element track path 26. Four endless circulation paths 28 (in total) are formed so that each of them is circularly continuous by the pair of direction converting paths 24, rolling element return path 20 and rolling element track path 26.

Further, as seen from FIG. 3, a plurality of balls 46 serving as the rolling elements are loaded within each endless circulation path 28. The plurality of balls 46 within the endless circulation path 28 constitute a string of rolling elements (rolling element string) 62 as well as the rolling element accommodating belt 50. Incidentally, as seen from FIG. 2, coupling arms 61 hanging over in the width direction within the endless circulation path 28 are guided on both sides in the width direction by guide grooves 60, 38*b*, 24*b* (FIG. 3) formed in the endless circulation path 28 of the slider 16.

Next, the rolling element accommodating belt 50 will be explained in detail.

Figure 4:
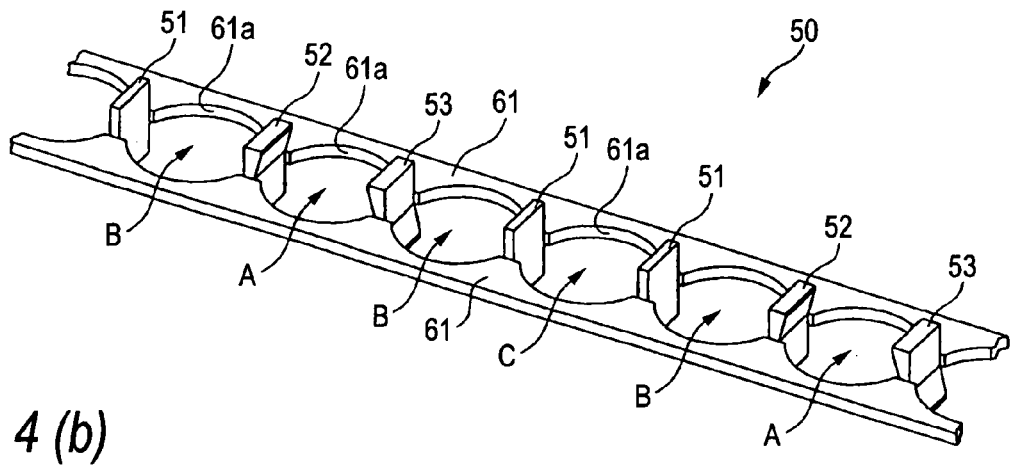
FIG. 4(a) is a partially enlarged perspective view of the rolling element accommodating belt in a developed and enlarged state.
FIG. 4(b) is a front view of the rolling element accommodating belt.
FIG. 4(c) is a view for explaining the section of a partially enlarged rolling element accommodating portion shown in FIG. 4(b)
Figure 4:
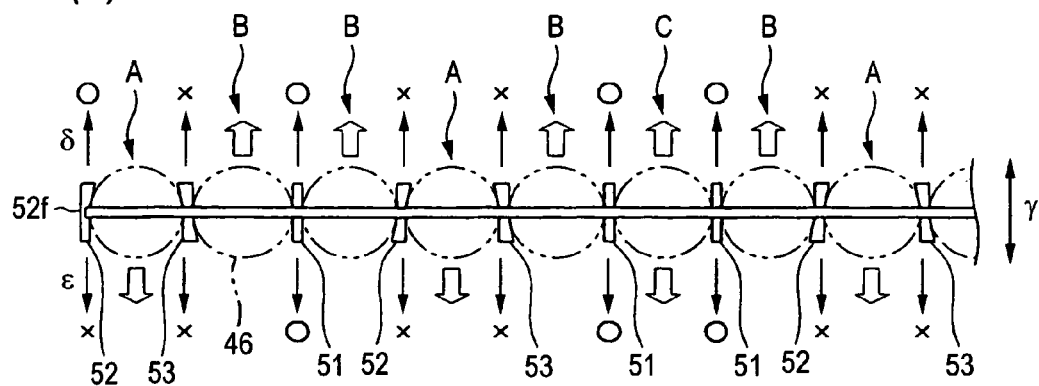
Figure 4:
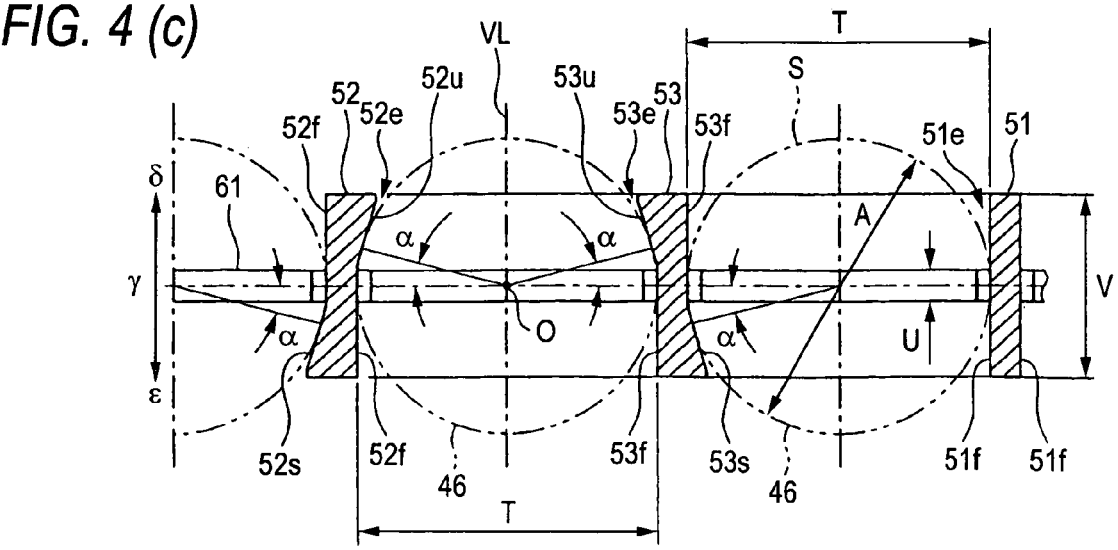

FIG. 4 is views for explaining the rolling element accommodating belt; FIG. 4(*a*) is a partially enlarged perspective view of the rolling element accommodating belt in its developed state, FIG. 4(*b*) is a front view of the rolling element accommodating belt thus developed, and FIG. 4(*c*) is a partially enlarged sectional view of a rolling element accommodating portion in FIG. 4(*b*).

The rolling element accommodating belt 50 is formed in a terminating shape (that is, the rolling element accommodating belt 50 has ends at its longitudinal direction) and as seen from FIGS. 3 and 4(a), has three kinds of spacers 51, 52, 53 interposed between the adjacent balls 46 within the endless circulation path 28. These three kinds of spacers 51, 52, 53 are coupled with each other by a pair of coupling arms 61 on both sides in the width direction of the endless circulation path 28. These spacers 51, 52, 53 and coupling arms 61 are integrally formed of plastic resin material. The spaces defined by the spacers 51, 52, 53 and the coupling arms 61 constitute three kinds of rolling element accommodating portions A, B, C (described later). Thus, the rolling element accommodating belt 50 individually accommodates the balls 46 apart from each other by a predetermined distance (in this embodiment, the center-center distance of the adjacent balls is 5.2 mm) in these three kinds of rolling element accommodating portions A, B, C so that they can be aligned as the string of rolling elements 62 in an arrangement direction within the endless circulation path 28. The rolling element accommodating belt 50 is mounted so that its lower side in FIG. 4 is oriented toward the outer diameter side of the endless circulation path 28 as shown in FIG. 3. Incidentally, the arrangement direction of the balls 46 in the developed state agrees with the longitudinal direction of the rolling element accommodating belt 50.

More specifically, the coupling arms 61 are formed of thin lengthy belt-like members. Ball accommodating holes 61a (see FIG. 4(a)) each made in a nearly circular shape in the front/back direction (thickness direction, or defined between the inner and outer diameter side) of the coupling arms 61 are arranged in the longitudinal direction likewise for each of the rolling element accommodating portions A, B, C. The internal diameter of the ball accommodating hole 61a is slightly larger than the diameter of the ball 46 to be accommodated so that the ball 46 is freely engageable/disengageable in the front/back direction of the coupling arms 61. In this embodiment, the diameter of the ball 46 is 4.7625 mm.

As shown in FIG. 2, the shape of all the three kinds of spacers 51, 52, 53 when viewed in the arrangement direction of the balls 46 is a rectangle. The short sides of the rectangle are provided in nearly parallel to the width direction of the belt-like coupling arms 61. The respective spacers 51, 52, 53 are coupled by the coupling arms 61 at their nearly central positions of the longer sides of the rectangle on both sides in the width direction. Further, the height V (length of the longer side) of all the spacers 51, 52, 53, as seen from FIG. 4(c), is lower than the diameter A of the ball 46. Further, a predetermined interval T between the opposite spacers adjacent to each other in the arrangement direction of the ball 46 is made slightly larger than the diameter of the ball 46. The coupling arms 61 couple the spacers 51, 52, 53 with each other apart by predetermined intervals T. The thickness U (see FIG. 4(c)) of the coupling arm 61 is made small within a range enough to keep the necessary and sufficient strength (in this embodiment, 0.44 mm), and is slightly smaller than that width of the guide grooves 60 and 38b described later. Thus, the coupling arms 61 of the rolling element accommodating belt 50 can be slidably engaged in the guide grooves 60 and 38b.

Now it should be noted that the respective spacers 51, 52 and 53 has different front shapes as shown in FIG. 4.

Specifically, the front shape of the spacer 51, as illustrated in the enlarged manner in FIG. 4(c), is thin and plate-like so that it is a nearly rectangular shape with equal widths extending from the nearly central position in the front/back direction of the coupling arm 61. Two faces formed by the long sides of the nearly rectangular shape constitute a pair of ball-contact faces 51f which correspond to the spherical face S serving as a rolling face of the ball 46 so as to be oriented in the arrangement direction of the balls 46 within the endless circulation path 28, respectively. Namely, of these ball-contact faces 51f, the one ball-contact face 51f is oriented toward one of the adjacent balls 46 whereas the other ball-contact face 51f is oriented toward the other of the adjacent balls 46 on the side opposite to the one ball-contact face 51f.

On the other hand, the front shapes of the spacer 52 and spacer 53, as illustrated in the enlarged manner in FIG. 4(c), are symmetrical to each other with respect to the axis of a vertical straight line VL passing the center O of the ball 46. These spacers 52, 53, as seen from FIG. 4(c), have the faces oriented in the arrangement direction of the balls 46 as the ball-contact faces 52f, 53f formed in the same manner as those of the above spacer 51. Further, the spacers 52, 53 are shaped for the adjacent ball 46 so that their width gradually increases from each the starting point of the nearly central positions coupled by the coupling arm 61 toward their end on only the one side of the front/back direction of the coupling arm 61. The face formed by the ridge line of the portion with an increased width for the ball 46 is formed as an abutting face abutting on the ball 46 at a position with a predetermined angle α (e.g. 15°) from the arrangement direction of the balls. Namely, on the one side (right side) in the arrangement direction of the balls 46, the abutting face is formed on only the one side (upper side in FIG. 4(c)) in the front/back direction of the coupling arm 61, whereas on the other side (left side) in the arrangement direction of the balls 46, the abutting face is formed on only the one side (lower side in FIG. 4(c)) in the front/back direction of the coupling arm 61.

More specifically, as regards the spacer 52 in the state mounted in the endless circulation path 28, the right abutting face constitutes an inward abutting face 52u abutting on the ball 46 so that spacer 52 is not movable toward the outer diameter side of the endless circulation path 28 from the mounted state. Further, the left abutting face constitutes an outward abutting face 52s abutting on the ball 46 so that spacer 52 is not movable toward the inner diameter side of the endless circulation path 28 from the mounted state.

On the other hand, as regards the spacer 53 in the state mounted in the endless circulation path 28, the right abutting face constitutes an outward abutting face 53s abutting on the ball 46 so that spacer 53 is not movable toward the inner diameter side of the endless circulation path 28 from the mounted state. Further, the left abutting face constitutes an inward abutting face 53u abutting on the ball 46 so that spacer 53 is not movable toward the outer diameter side of the endless circulation path 28 from the mounted state.

These spacers 51, 52, 53 are arranged in a predetermined relationship in the arrangement direction of the balls 46 and coupled by the coupling arms 61. Now, in the predetermined relationship, the rolling element accommodating portion permits the ball 46 accommodated therein to drop out on at least one side in its front/back direction.

Concretely, as seen from FIG. 4(b), dropout of the ball 46 is permitted in three kinds of directions inclusive of the one side, other side and both sides of the rolling element accommodating belt 50. In this figure, the directions permitting dropout of the ball 46 are indicated by hollow arrows (this applies to other examples).

Namely, in the three kinds of rolling element accommodating portions, where the spacers adjacent to each other in the arrangement direction of the balls 46 are arranged in the order of the spacer 52 and spacer 53 from left to right side, in the rolling element accommodating portion formed therebetween, the inward abutting faces 52u, 53u are located on the inner peripheral side. Thus, the movement of the ball 46 toward the inner periphery in the front/back direction is restricted, but the ball 46 can be removed toward the outer diameter side of the endless circulation path 28, thereby forming a rolling element accommodating portion A which permits the ball 36 drop out toward only the outer periphery.

Likewise, where the spacer 53 and the spacer 51 are arranged in this order, or the spacer 51 and spacer 52 are arranged in this order, in the rolling element accommodating portion formed therebetween, on its outer peripheral side, the outward abutting face 53s or the outward abutting face 52s is arranged. Thus, the movement of the ball 46 is restricted toward the outer periphery in the front/back direction of the rolling element accommodating portion, but the ball 46 can be removed toward the outer diameter side of the endless circulation path 28, thereby forming a rolling element accommodating portion B which permits the ball 46 to be removed toward only the outer peripheral side.

Further, likewise, where both spaces 51 are arranged, the rolling element accommodating portion formed therebetween does not restrict the movement of the ball 46. Thus, the ball 46 can be removed toward both inner periphery and outer diameter side of the endless circulation path 28, thereby forming a rolling element accommodating portion C which permits the ball 46 to drop out on both sides in the front/back direction.

In this way, in this embodiment, the spacers 51, 52, 53 are arranged in either one of the above arrangement orders in the arrangement direction of the balls 46. The rolling element accommodating portions formed between the adjacent balls in the arrangement direction of the balls 46 are constituted as any one of these three kinds of the rolling element accommodating portions A, B and C.

In both sides in the arrangement direction of the balls, the ball 46 accommodated in each the rolling element accommodating portions A, B, C is in contact with pairs of ball-contact faces 51f, 52f, 53f formed in the arrangement direction of the balls 46 in the endless circulation path 28. Further, in the rolling element accommodating portions A, B, the inward abutting face 52u, 53u or the outward abutting face 52s; 53s is abutting on the ball 46 at the position of the predetermined angle α from the arrangement direction of the balls 46. Thus, in contact at two points, the ball 46 can be held so that it is rollably supported between the adjacent spaces 51.

Further, the spacer 52 has the outward abutting face 52s on the one of the faces oriented toward the arrangement direction of the balls 46 and inward abutting face 52u on the other thereof. On the other hand, the spacer 53 has the outward abutting face 53s on the one of the faces oriented toward the arrangement direction of the balls 46 and inward abutting face 53u on the other thereof. Thus, the spacers 52 and 53, because their abutting faces abutting on the ball 46 as seen from FIG. 4(b), will not move toward both sides in the front/back direction of the rolling element accommodating belt 50 in the state mounted in the endless circulation path 28. Incidentally, the spacer 51, since it does not have the above abutting face, is movable to a degree toward both sides in the front/back direction of the rolling element accommodating belt 50 in the state mounted in the endless circulation path 28, but its movement is restricted by the adjacent spacer 52 or spacer 53. In FIG. 4(b), the moving image of each spacer in the front/back direction is illustrated by a black arrow, and mark O or X. The mark O represents a movable image, and the mark X represents non-movable image (This applies the other embodiment).

Now, as described above, the rolling element accommodating belt 50 is formed in the terminating shape so that the spacers located at the ends of the terminating shape are the spacer 52 and spacer 53, respectively. Outside the ends, the ball 46 is not accommodated. Therefore, as seen from FIG. 4(b), at the spacers at both ends (the spacers 52 in this embodiment), the face oriented outward is formed of only the ball-contact face 52f (or ball-contact face 53f) (This applies to other embodiments).

Further, the spacers 51, 52, 53, at their upper ends in FIG. 4(c), provide gaps at the regions where the ball-contact face 51f or inward abutting face 52u, 53u is opposite to the ball 46, thereby giving relief portions 51e, 52e, 53e, respectively.

Next, a more detailed explanation will be given of the linear guide apparatus 10 in which the string of rolling elements 62 is mounted.

As seen from FIG. 2, the inner wall of the slider body 17 is covered with a rolling element string guiding member 40 of synthetic resin except the areas serving as the load rolling element guiding faces 18. Between the rolling element string guide member 40 and the surface of the guide rail 12 opposite thereto, a slight space is formed. Inside the U-shape of the slider body 17, groves in which the string of rolling elements 62 is inserted are formed by the load rolling element guiding faces 18 and the rolling element string guide member 40.

Figure 5:
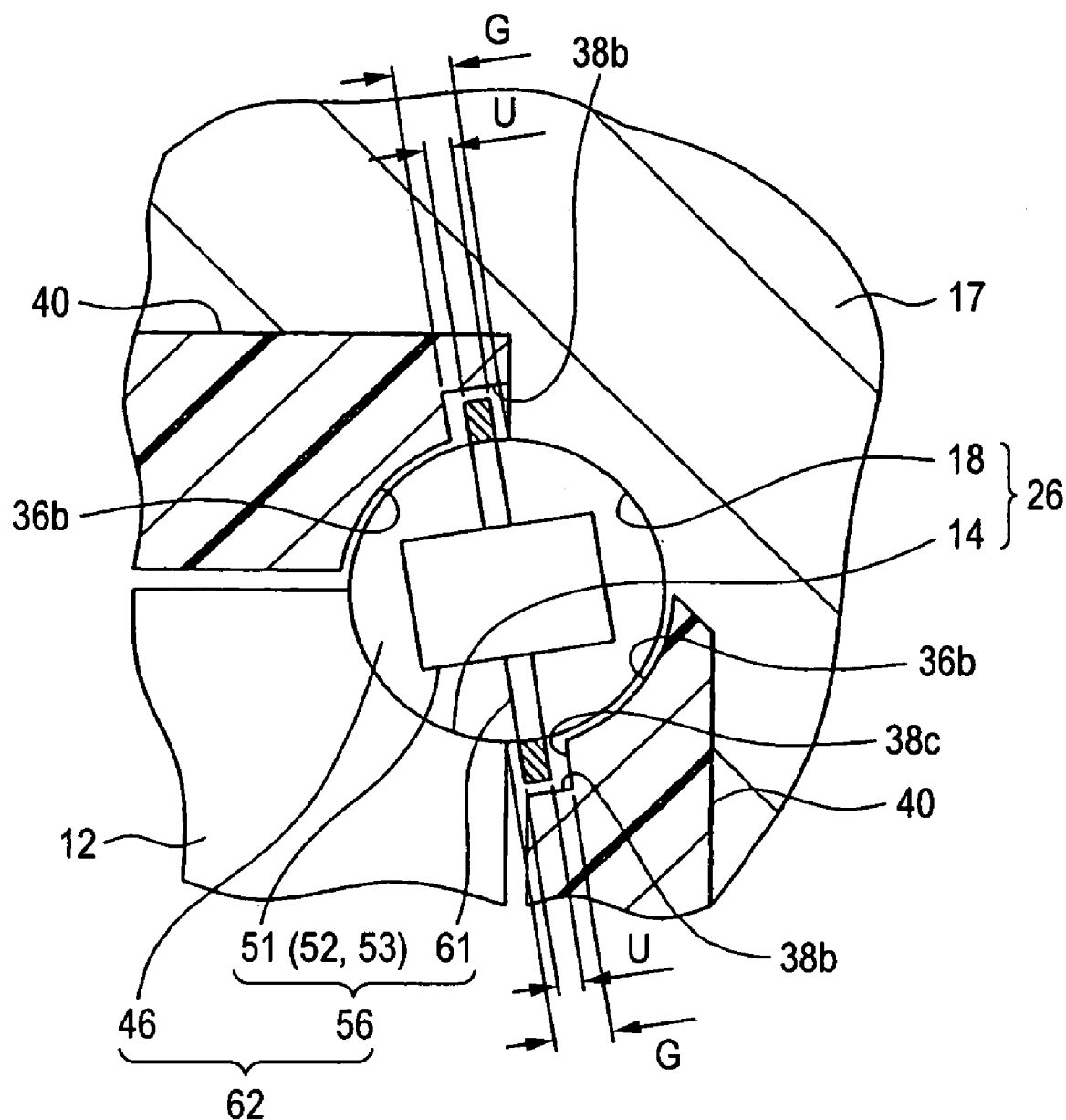
FIG. 5 is a sectional view perpendicular to the longitudinal direction in a ball track path of the linear guide in FIG. 2.

More specifically, as seen from FIG. 5, the grooves are formed because the rolling element string guide member 40 has guide walls 36b formed for the string of rolling elements 62. The interval between the guide walls 36b is slightly larger than the diameter of the ball 46. On the guide wall 36b, the guide groove 38b with which the coupling arm 61 of the rolling element accommodating belt 50 is engaged is formed continuously in the longitudinal direction. The groove width G of the guide groove 38b is slightly larger than the thickness U of the coupling arm 61. Therefore, the coupling arms 61 of the rolling element accommodating belt 50 can be slidably engaged in the guide grooves 38b, respectively.

Usually, the guide groove 38b is formed in the rolling element string guide member 40 at the position where the coupling arm 61 can engaged so as to be held. However, in this embodiment, as seen from FIG. 5, the rolling element string guide member 40 on the lower side in FIG. 5 is provided with a side wall 38c on only the one side in the thickness direction of the coupling arm 61 so that the guide groove 38b is opened toward the guide rail 12.

Figure 6:
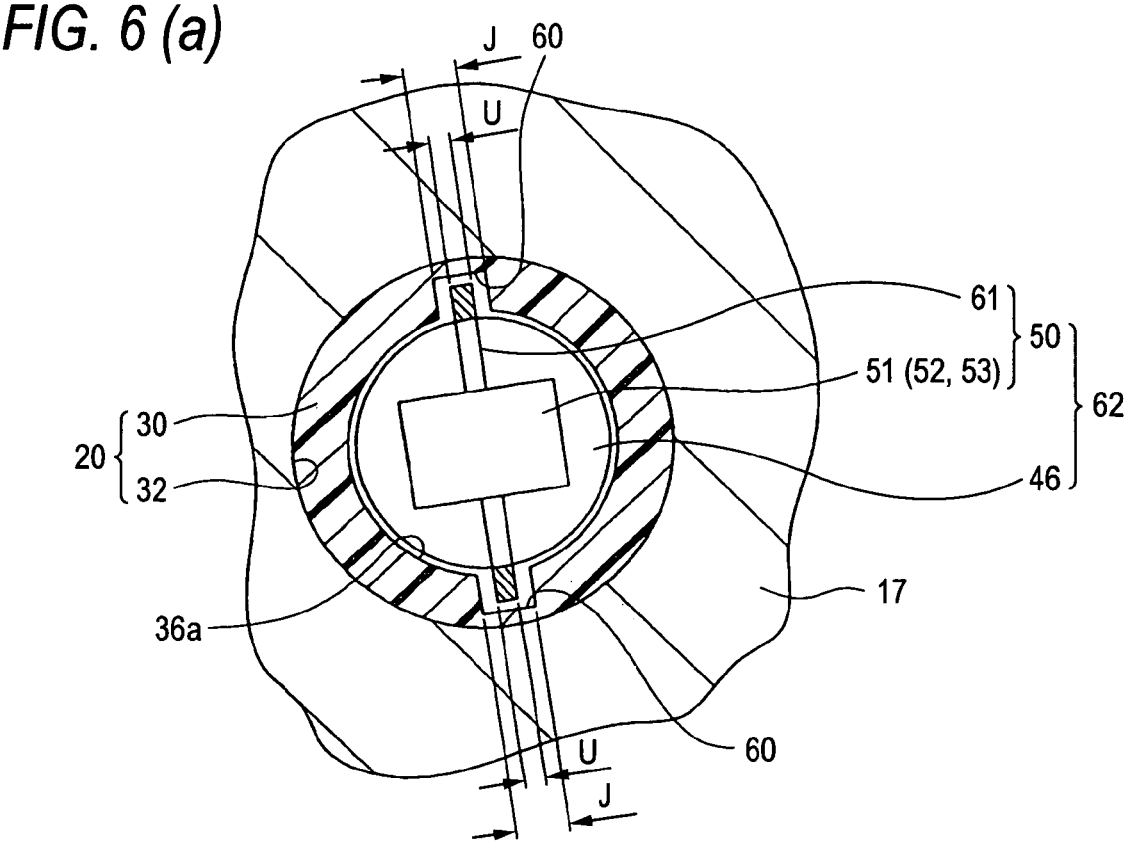
FIG. 6(a) is a sectional view perpendicular to the longitudinal direction of a ball return path of the linear guide in FIG. 2.
FIG. 6(b) is a view for explaining its modification.
Figure 6:
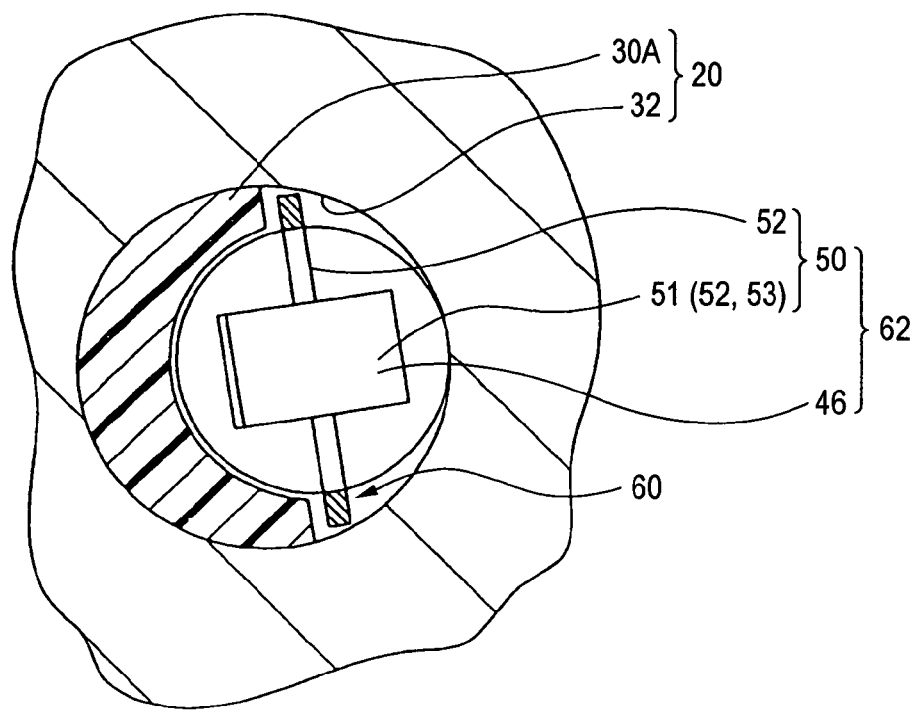

Further, as seen from FIG. 2 and FIG. 6(a), ball-return paths 20 are formed in the walls at the sleeves of the U-shape slider body 17, the ball-returns paths 20 extending in nearly parallel to the corresponding load rolling element guiding faces 18 apart by a predetermined distance. The ball-return path 20 is composed of a through-hole 32 whose circular section continues in the longitudinal direction and a circulating tube 30 inserted in the through-hole 32. The circulating tube 30 is a tube made of synthetic resin. The sectional shape continuing in the longitudinal direction within the internal space of the circulating tube 30 is a nearly circular shape having an inner diameter slightly larger than the diameter of the balls 46 so that the balls 46 can internally pass. The inner wall of the nearly circular shape constitutes a guide wall 36a for the string of rolling elements 62.

On both sides in the width direction of the guide wall 36a, guide grooves 60 are continuously formed in the longitudinal direction, the guide grooves 60 having the width which permits engagement and guiding of the pair of coupling arms 61 of the rolling element accommodating belt 50 which moves within the circulating tube 30. The groove width J of the guide groove 60 is slightly larger than the height U of the coupling arm 61. Therefore, the coupling arms 61 of the rolling element accommodating belt 50 are slidably engaged in the guide grooves 60, respectively. Thus, the balls 46 and rolling element accommodating belt 50 are smoothly movable within the space of the circulating tube 30.

Further, as seen from FIG. 3, a pair of direction converting paths 24 connected to both ends of the ball track path 26 are formed in the end caps 22. The direction converting paths 24 are curved through-holes which communicate to the ball return path 20 and have circular sectional shapes continuing in the longitudinal direction. The above guide walls 36a, 36b are formed continuously so as to sandwich the direction converting paths 24. Within the direction converting path 24, the coupling arm 61 of the string of rolling elements 62 is elastically deformed so that the entire string of rolling elements 62 moves while rolling. Therefore, considering the curvature according to the deforming range of the coupling arm 61, the width of the guide groove 24b for guiding the coupling arm 61 is increased in the direction converting path 24.

Figure 7:
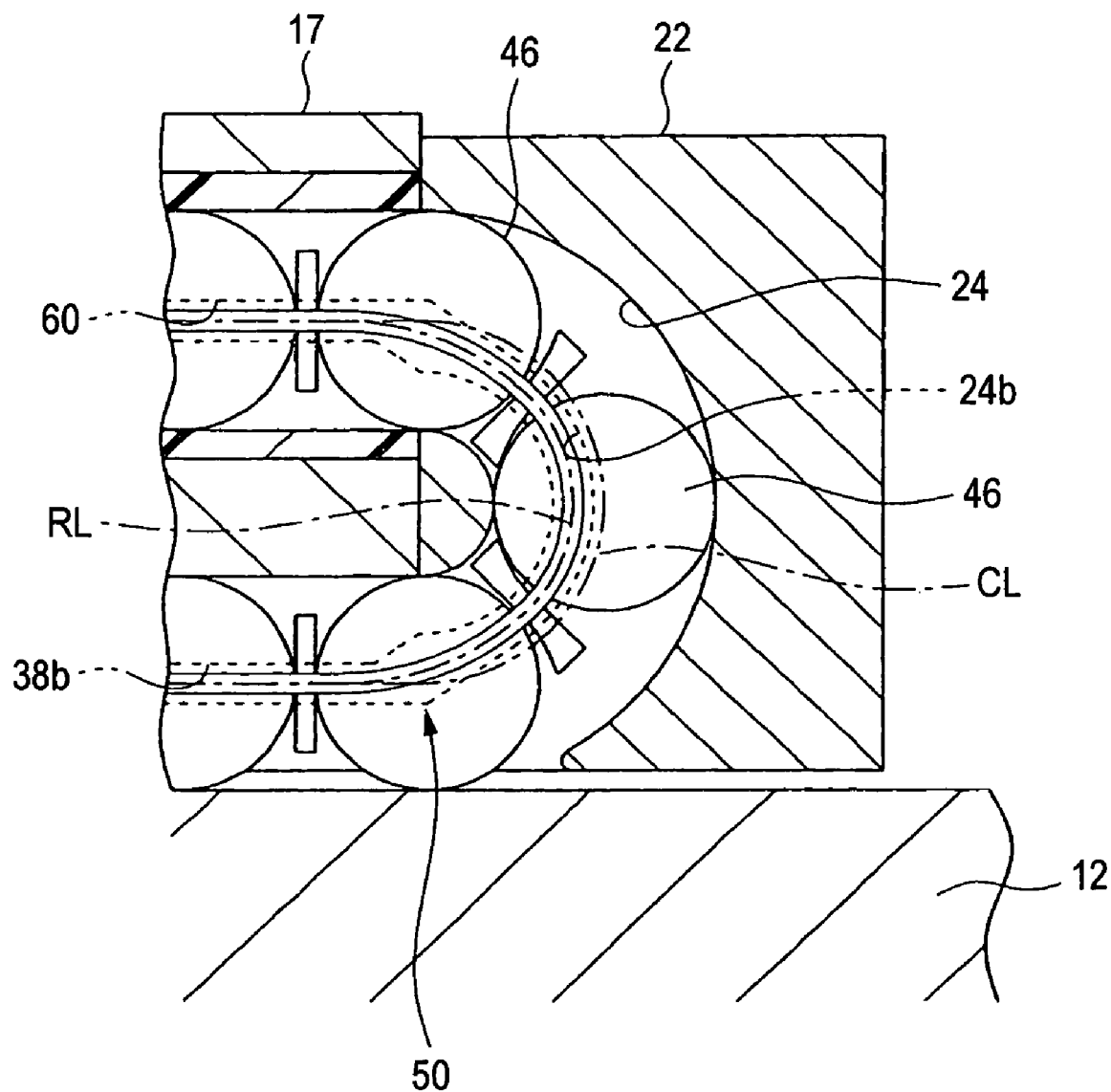
FIG. 7 is an enlarged view for explaining a direction converting path of the linear guide shown in FIG. 3.

Now, the guide groove 24b in the direction converting path 24, as seen from FIG. 7 which is a partially enlarged view of FIG. 3, is formed so that the locus RL drawn by the center in the width direction of the coupling arm 61 is near to the inner diameter side of the endless circulation path 28 with respect to the center locus CL drawn by the center of the ball 46. More concretely, in this embodiment, the center locus CL drawn by the center of the ball 46 is an arc having a radius of 4 mm whereas the locus RL drawn by the center in the width direction of the coupling arm 61 is an arc having a radius of 3.3 mm at a nearly central position of the guide groove 24b within the direction converting path 24. In the other place than the direction converting path 24 within the endless circulation path 28, the guide groove is formed so that the locus RL drawn by the center in the width direction of the coupling arm 61 and the center locus CL of the ball 46 substantially agree with each other.

Next, an explanation will be given of the operational advantage of the linear guide apparatus 10.

In the linear guide apparatus 10, when the slider 16 is relatively moved in the axial direction of the guide rail 12, the balls 46 roll to move within the endless circulation path 28. Simultaneously, the rolling element accommodating belt 50 also move together with the balls 46 within the endless circulation path 28. At this time, the respective spacers 51, 52, 53 of the rolling element accommodating belt 50 within the endless circulation path 28 push the balls 46 in front of themselves in the moving direction, and the balls 46 also push the respective spacers 51, 52, 53 in front of themselves in the moving direction. In this case, the string of rolling elements 62 repeats the circulation in such a manner that it moves in the direction opposite to the slider 16 along the ball track path 26, enters the one direction converting path 24 continuous from the one end of the ball track path 26 to change its moving direction, enters the ball return path 20 from the direction converting path 24 to move in the same direction as the slider 16, enters the other direction converting path 24 to change its moving direction again and returns to the ball track path 26. In short, the entire string of rolling elements 62 circulates within the endless circulation path 28.

In accordance with the linear guide apparatus 10, the rolling element accommodating belt 50 can constitute the string of rolling elements 62 by accommodating the balls 46 in the three kinds of rolling element accommodating portions A, B, C.

In accordance with the linear guide apparatus 10, since the respective spacers 51, 52, 53 intervene between the balls 46 in the endless circulation path 28, the balls 46 are not brought into direct contact with each other. Thus, occurrence of noise or abrasion owing to the rubbing of the balls 46 against each other is prevented. Further, since the spacers 51, 52, 53 are coupled with one another by the coupling arms 61 to provide the rolling element accommodating belt 50, the respective balls 46 can be moved by the rolling element accommodating belt 50 while keeping a predetermined distance therebetween and keeping the stable rolling of the string of rolling elements 62 within the endless circulation path 28.

Further, in accordance with the linear guide apparatus 10, in the rolling element accommodating belt 50, the predetermined interval T among the spacers 51, 52, 53 (between a pair of ball-contact faces) is made slightly larger than the diameter of the ball 46. In addition, the respective rolling element accommodating portions A, B, C are structured so as to permit the drop-out of the accommodated balls 46 toward at least one side in the front/back face direction of the endless circulation path 28. Thus, in mounting the balls 46 in the respective rolling element accommodating portions A, B, C of the rolling element accommodating belt 50, in the developed state, the balls 46 have only to be placed within the rolling element accommodating portions A, B, C from the side permitting the drop-out of the balls 46. Accordingly, the efficiency of accommodating the balls 46 between the spacers is improved so that a troublesome operation such as mounting the balls 46 in the rolling element accommodating portions A, B, C by pushing is not required. As a result, the mounting operation of the balls 46 in the rolling element accommodating belt 50 can be facilitated.

Further, in accordance with the linear guide apparatus 10, since the coupling arms 61 of the rolling element accommodating belt 50 are guided along the guide grooves 60, 38b, 24b within the endless circulation path 28, swing of the rolling element accommodating belt 50 when it moves is restricted. Thus, the entire string of rolling elements 62 can be moved precisely and smoothly within the endless circulation path 28. Further, as regards the spacers 52, 53 of the spacers defining the respective rolling element accommodating portions A, B, C, since their abutting faces, i.e. inward abutting faces 52u, 53u or outward abutting faces 52s, 53s abut on the balls 46, the spacers 52, 53 are not movable toward both inner periphery and outer diameter side of the endless circulation path 28. Thus, in the ball track path 26, movement of the rolling element accommodating belt 50 at its position relative to the balls 46 toward both the inner periphery and outer diameter side of the endless circulation path 28 is restricted. Accordingly, even if there is external vibration applied to the linear guide apparatus 10 or influence of gravity, swing of the rolling element accommodating belt 50 and friction between the coupling arms 61 and the guide grooves can be restricted.

Further, in accordance with the linear guide apparatus 10, although the balls 46 suffer from resistance within the ball track path 26, the respective balls 46 are pushed from behind by the spacers 51, 52, 53, they can be moved smoothly within the ball tack path 26. Further, in the ball tack path 26, the interval between the guide walls 36b for the string of rolling elements 62 is slightly larger than the diameter of the ball 46 and the coupling arms 61 of the rolling element accommodating belt 50 are guided by the guide grooves 38b of the guide walls 36b. For this reason, it is possible to prevent the respective spacers 51, 52, 53 from falling down in the ball track path 26 and prevent the smooth movement of the string of rolling elements 62 from being hindered owing to disorder of the arrangement of the string of rolling elements 62.

Further, in accordance with the linear guide apparatus 10, the side wall of the guide groove 38b is formed as the side wall 38c on only one side of the coupling arm 61. Therefore, as seen from FIG. 8(a), the space required to the guide groove 38b is reduced so that the groove depth D1 of the ball guiding face 14 of the guide rail 12 can be increased correspondingly.

Figure 8:
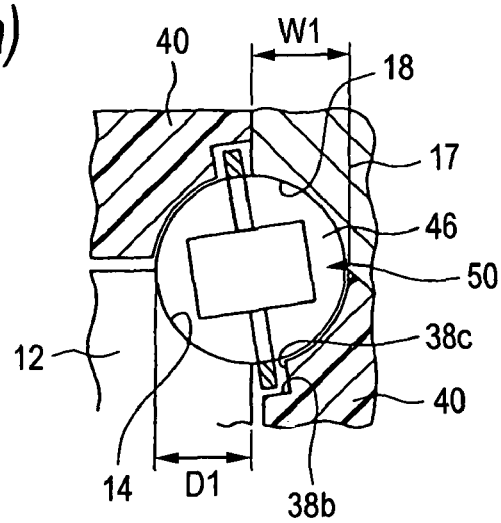
FIG. 8 is a view for explaining the operation of the linear guide according to the first embodiment.
Figure 8:
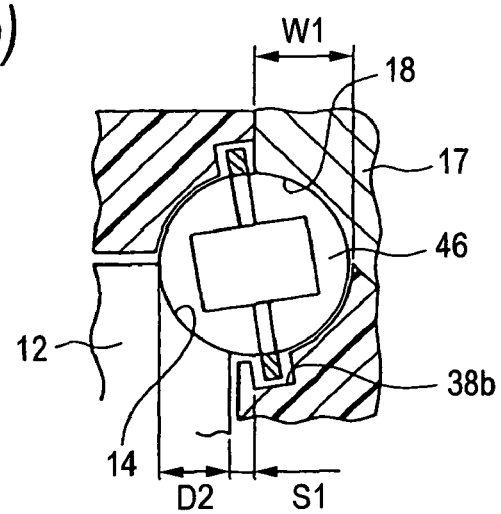
Figure 8:
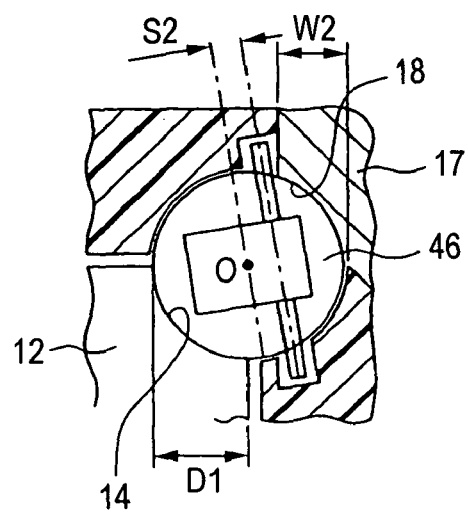

More specifically, as seen from a comparative example of FIG. 8(b), where the side walls of the guide groove 38b are formed on both sides, a space S1 for forming the side wall is required in the horizontal direction of the figure. Therefore, the groove depth D2 of the ball guiding face 14 must be smaller than the groove depth D1 indicated in FIG. 8(a) by the space S1. Further, as seen from another comparative example in FIG. 8(c), the coupling arm 61 can be set near the inner diameter side of the endless circulation path 28 by an offset quantity S2 with respect to the center O of the ball 46. However, in this case, the groove depth W2 of the load rolling element guiding face 18 must be smaller by the quantity corresponding to the offset quantity S2 than the groove depth W1 indicated in FIG. 8(a). In this way, in accordance with this embodiment, as compared with the structure in which the side walls of the guide groove are both sides, without reducing the groove depth of the load rolling element guiding face 18, the groove depth of the ball guiding face 14 of the guide rail 12 can be increased. Accordingly, the contact length between the ball 46 and the ball guiding face 14 can be kept large so that the load capacity of the liner guide 10 can be increased.

Figure 9:
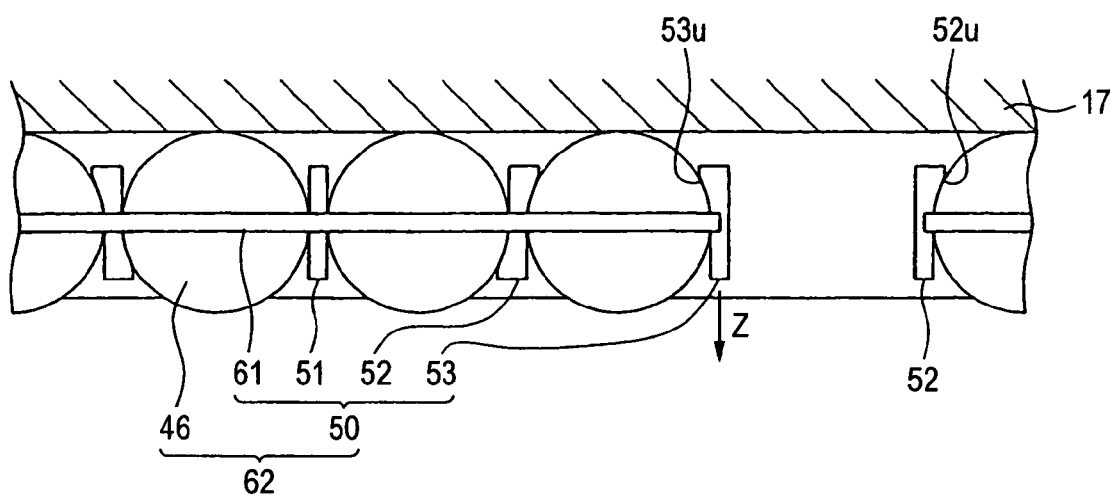
FIG. 9 is a view for explaining the operation of the linear guide according to the first embodiment.
Figure 9:
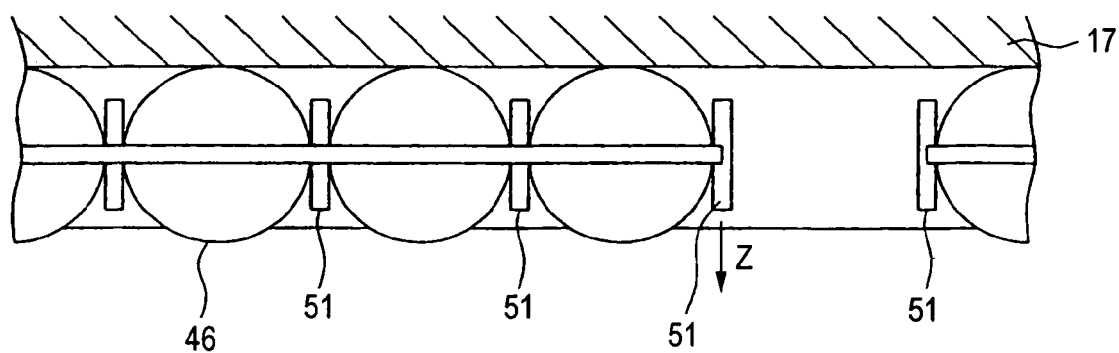

In accordance with the linear guide apparatus 10, the rolling element accommodating belt 50 is formed in the terminating shape so that the spacers located at the ends of the terminating shape are the spacer 52 and spacer 53 having the inward abutting face 52u and the inward abutting face 53u respectively abutting on the ball 4. Therefore, as seen from FIG. 9(a), the respective inward abutting faces 52u and 53u of the spacers 52 and 53 located at both ends abut on the balls 46. Thus, the spacers 52 and 53 located at both ends are engaged in the endless circulation path 28 so that they are not movable toward the outer diameter side of the endless circulation path 28 (the direction of a downward arrow Z). On the other hand, as seen from an comparative example of FIG. 9(b), in the configuration of the rolling element accommodating belt provided with only the spacers 51 each having not the abutting face abutting on the ball 46 in the front/back direction of the rolling element accommodating belt, the spacers 51 at the ends will move toward the outer diameter side of the endless circulation path 28 (the direction of a downward arrow Z). In this way, in accordance with this embodiment, even when the slider 16 is pulled out from the guide rail 12, the spacers 52, 53 at both ends prevent the string of rolling elements 62 from dropping out from the slider 16 so that the tip of the rolling element accommodating belt 50 will not fly out from the opening of the endless circulation path 28. Accordingly, the liner guide 10 can be handled more easily.

Figure 10:
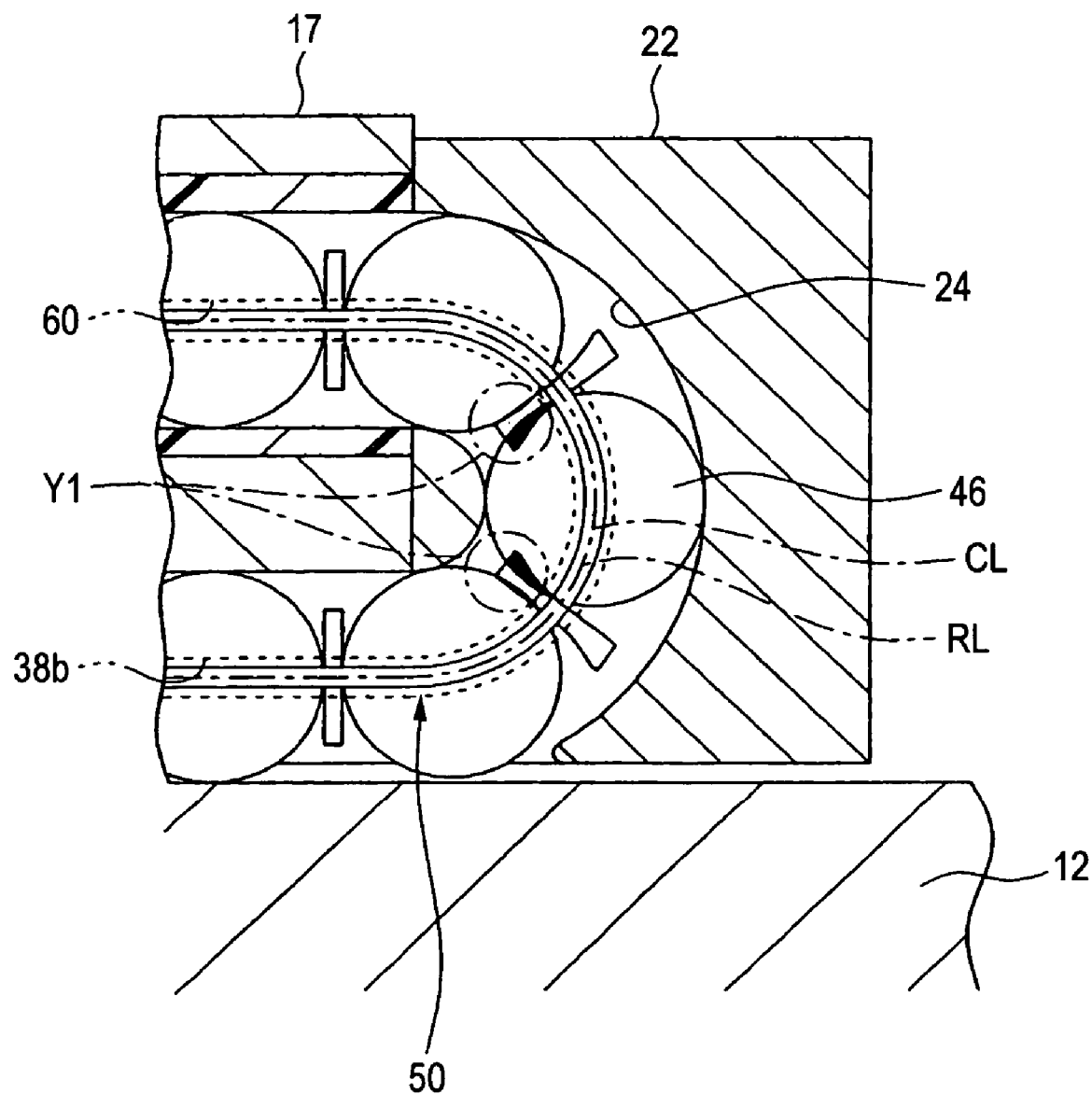
FIG. 10 is a view for explaining the operation of the linear guide according to the first embodiment.

In accordance with the linear guide apparatus 10, the guide groove 24b within the direction converting path 24 of the endless circulation path 28 is formed to circulate the coupling arm 61 near the inner diameter side of the endless circulation path 28 with respect to the center locus CL of the ball 46. Now, as seen from a comparative example of FIG. 10, if the coupling arm is circulated along the center locus CL of the ball 46 (i.e. CL=RL), assuming that there is no deformation in the respective areas, interference between the spacer 51 and the ball 46 occurs in a black zone within a circle indicated by symbol Y1. On the other hand, as seen from FIG. 7, in accordance with the configuration of this embodiment, when the rolling element accommodating belt 50 curves in the direction converting path 24, the spacers adjacent to each other within the direction converting path 24 can be opened largely. Thus, the distance between the adjacent spacers is increased so that a clearance for displacing the ball 46 outwardly in the radial direction is generated. As a result, the interference between the spacers and the ball 46 in the direction converting path 24 can be preferably restricted. Accordingly, the rolling element accommodating belt 50 of the linear guide apparatus 10 can be circulated more smoothly.

Further, in accordance with the linear guide apparatus 10, the spacers 51, 52, 53 provide relief portions 51e, 52e, 53e at the regions opposite to the balls 46 accommodated in the rolling element accommodating portions A, B, C at the ends on the inner peripheral side of the endless circulation path 28, respectively.

Figure 11:
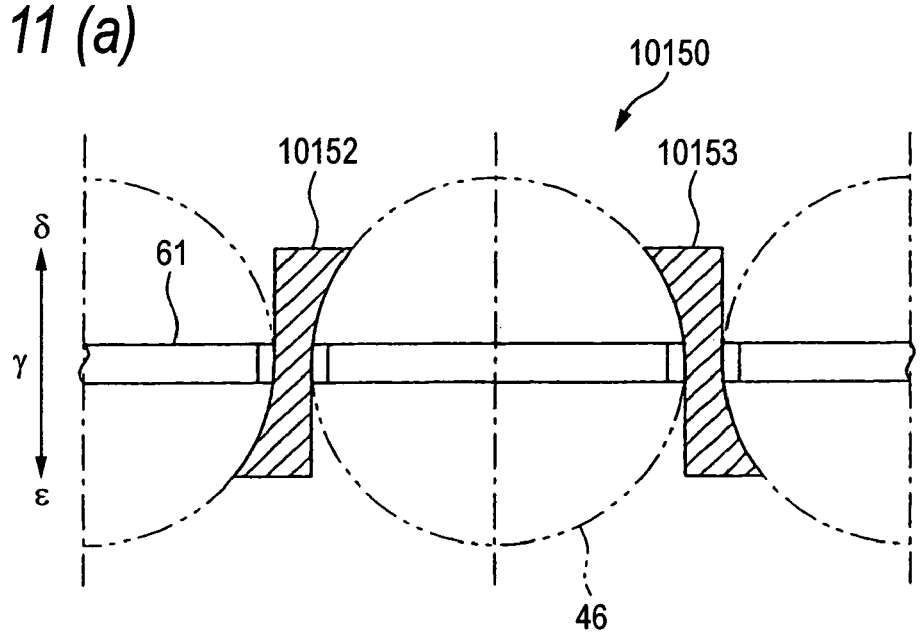
FIG. 11 is a view for explaining the operation of the linear guide according to the first embodiment.
Figure 11:
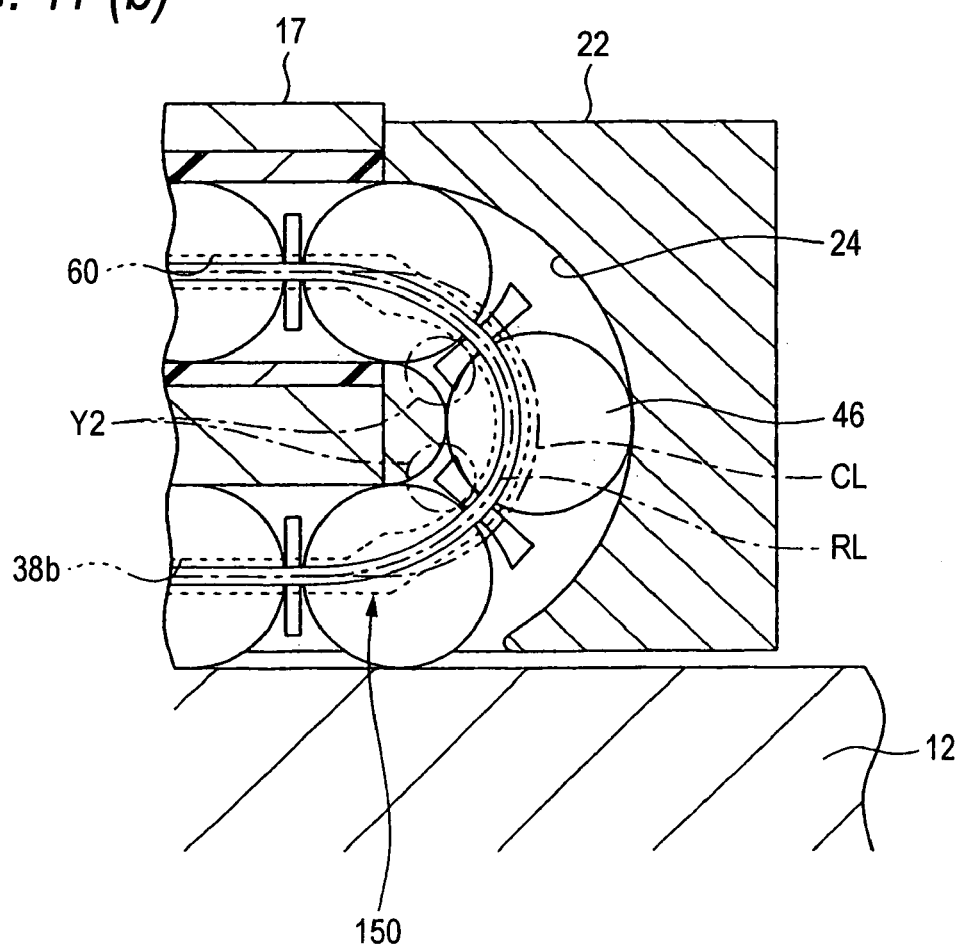

Now, as seen from a comparative example of FIG. 11(a), if the spacer does not provide the relief portion at its end, as seen from FIG. 11(b), when the rolling element accommodating belt 50 curves in the direction converting path 24, the distance between the adjacent spacers 51 is decreased on the inner peripheral side of the direction converting path 24, assuming that there is no deformation in the respective areas, slight interference between the spacers 51 and the ball 46 occurs in the area where the spacers 51 and the ball 46 are opposite on the inner peripheral side (black zone within a circle indicated by symbol Y2). On the other hand, as seen from FIG. 7, in accordance with the configuration of this embodiment, when the rolling element accommodating belt 50 curves in the direction converting path 24, even if the distance between the adjacent spacers 51 is decreased on the inner peripheral side of the direction converting path 24, the interference therebetween can be restricted by the relief portions 51e, 52e, 53e formed in the regions where the spacers 51 and the ball 46 are opposite on the inner peripheral side. Thus, the rolling element accommodating belt 50 of the linear guide apparatus 10 can be circulated more smoothly.

Further, in accordance with the linear guide apparatus 10, the front shape of the spacer 51 has a certain width providing a thin and plate-like nearly rectangular shape. Therefore, when the distance between the adjacent spacers 51 on the inner peripheral side of the direction converting path 24 is decreased, even if the interference between the spacers 51 and the ball 46 occurs, the spacers 51 can easily curve at the thin and plate-like nearly rectangular portion. Thus, the rolling element accommodating belt 50 of the linear guide apparatus 10 can be circulated smoothly.

The spacers 52, 53 also provide gaps between themselves and the ball 46 on the sides of the ball-contact faces 52f, 53f where no abutting faces are formed. Therefore, as compared with the spacers having, on both sides thereof, the abutting faces on both sides in the front/back direction, the degree of the mutual interference between the spaces 52, 53 and the ball 46 can be reduced.

The ball return path should not be limited to the structure described previously, but may be the structure as shown in FIG. 6(b). Specifically, in place of the circulating tube 30, a member 30A having a nearly crescent shape in its section is inserted in the through-hole 32 formed in the slider body 17, thereby providing the ball return path 20. Thus, each the guide grooves 60 is composed of the through-hole 32 and the nearly crescent-shaped member 30A. In this configuration, as compared with the configuration using the circulating tube described above, the diameter of the through-hole can be easily reduced. Thus, the slider body can be made thick to this degree, the rigidity of the slider body can be enhanced. As a result, the liner guide with high rigidity can be provided.

Second Embodiment

Next, an explanation will be given of the linear guide apparatus according to a second embodiment of this invention. In this embodiment, the configuration is the same as the first embodiment except that the structure of the rolling element accommodating belt is partially different. Therefore, only the difference on the rolling element accommodating belt will be explained, and the other will be not be explained.

Figure 12:
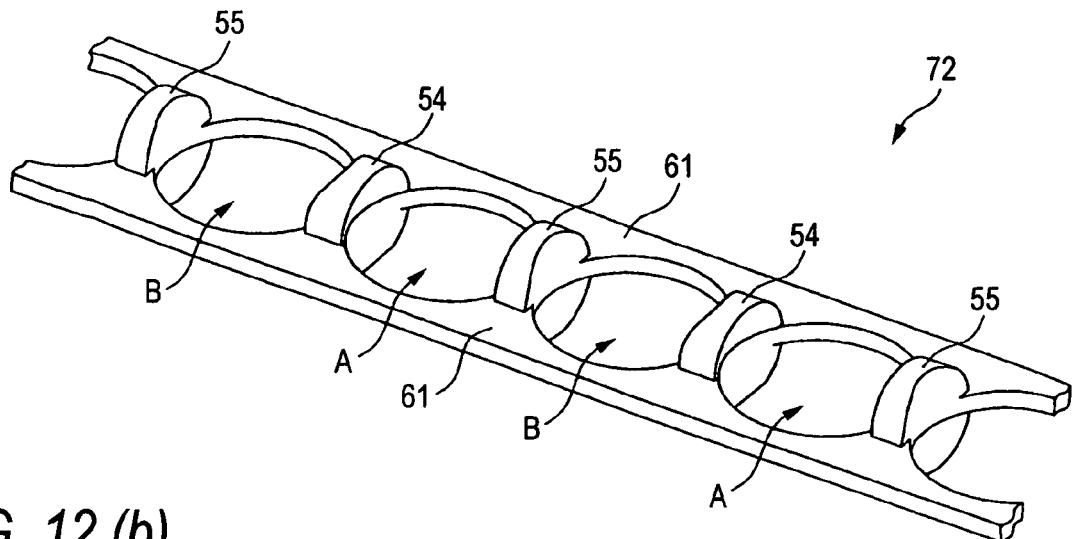
FIG. 12 is a view for explaining the second embodiment of a linear guide apparatus according to this invention.
Figure 12:
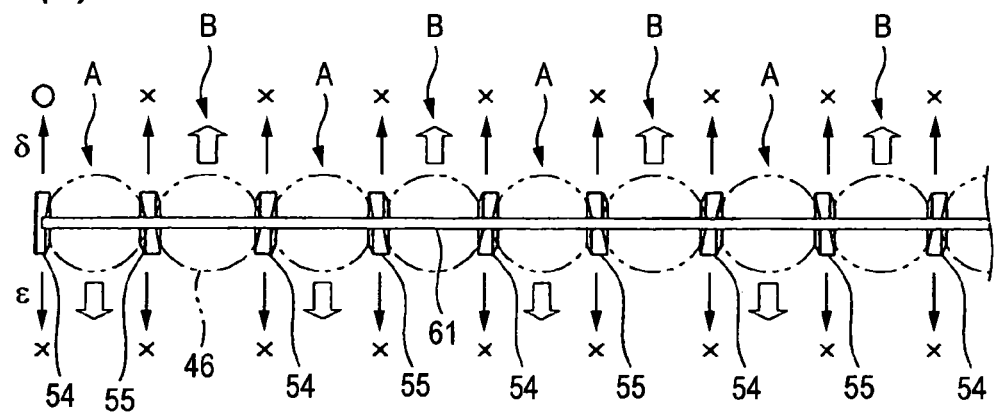
Figure 12:
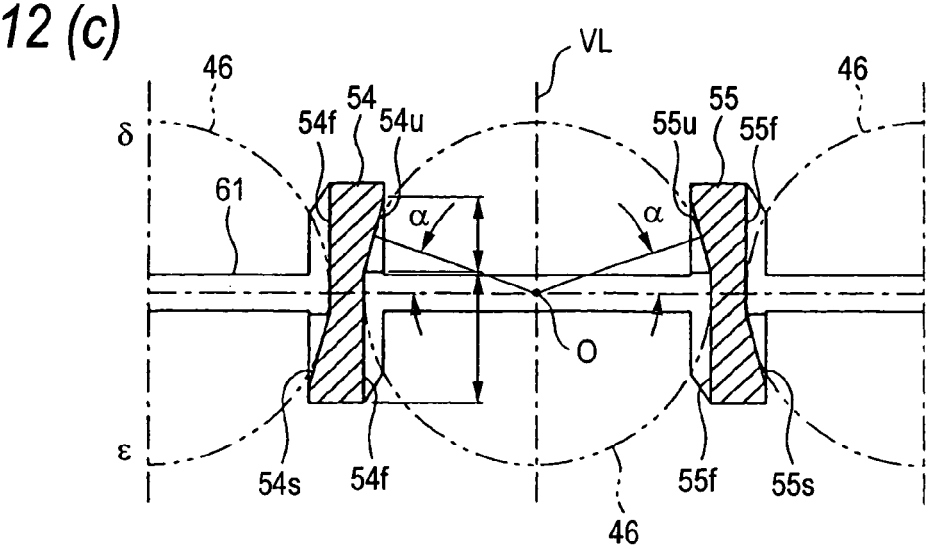

As seen from FIG. 12, a rolling element accommodating belt 72 has two kinds of spacers, i.e. a spacer 54 and a spacer 55. These spacers are alternately arranged in the arrangement direction of the balls so that two kinds of rolling element accommodating portions, i.e. a rolling element accommodating portion A and a rolling element accommodating portion B are alternately formed in the arrangement direction of the balls 46. The rolling element accommodating belt 50 according to this embodiment is different from that in the first embodiment in that these spacers 54, 55 have a circular shape when viewed in their arrangement direction, respectively and the ball-contact face and abutting face of each of the spacers 54, 55 are curved faces.

More specifically, as seen from FIG. 12(c), the spacers 54, 55 have front shapes symmetrical to each other with respect to the axis of a vertical straight line VL passing the center O of the ball 46. In this example, the abutting faces are formed by conical faces 54u, 54s, 55u, 55s which abut on the ball 46 at a point of an angle α with respect to the axis of the straight line VL. The conical face 54u and the conical face 55u correspond to the inward abutting faces described above whereas the conical face 54s and the conical face 55s correspond to the outward abutting faces described above. Further, the faces corresponding to the ball-contact faces are formed by cylindrical faces 54f, 55f each having a diameter slightly larger than the diameter of the accommodated ball 46 with respect to the axis of the straight line VL. At both ends of the rolling element accommodating belt 72, as in the first embodiment, the spacers 54, 55 are arranged so that the conical faces 54u and 55u serving as their inward abutting faces are oriented toward the balls 46. The rolling element accommodating belt 72, as in the first embodiment, is mounted in the linear guide with the upper side of the figure being located in the inner peripheral side of the endless circulation path 28.

In such a configuration also, the balls accommodated in the respective ball 46 accommodating portions A, B are removable in either one of the outer and inner peripheral sides of the endless circulation path 28 so that their drop-out is permitted. This facilitates the mounting of the balls 46 into the rolling element accommodating belt 72. Further, the respective spacers 54, 55 except those located at the ends abut, in their curved abutting face, on the balls 46 and so do not move toward both outer periphery and inner periphery of the endless circulation path 28. The movement of the spacers located at both ends toward the inner periphery and outer periphery is restricted by the spacers 54, 55 in the vicinity thereof. Thus, the swing of the rolling element accommodating belt 72 and the friction between the coupling arms 61 and the guide grooves are restricted. Accordingly, the linear guide giving the same operational advantage as those of the first embodiment can be provided. Particularly, in accordance with the second embodiment, since all the spacers have the abutting faces with the balls 46, the effect of restricting the swing of the rolling element accommodating belt 72 in the endless circulation path 28 is remarkable.

Further, in accordance with the second embodiment, since both the faces of the spacers 54, 55 of the rolling element accommodating belt 72 corresponding to the ball-contact face and abutting face are concave faces, the movement in the lateral direction of the spacers 54, 55 (width direction of the rolling element accommodating belt 72 or vertical direction to paper face in FIG. 12(b)) is restricted by the balls 46. For this reason, the swing of the rolling element accommodating belt 72 owing to the circulation of themselves can be further reduced, thus giving smoother movement thereof.

Further, in accordance with the second embodiment, the two kinds of rolling element accommodating portions A, B are alternately arranged in their arrangement direction. Therefore, as shown in an enlarged manner in FIG. 12(c), the spacers 54, 55 located on the left and right sides of a certain rolling element accommodating portion (in this illustrated example, rolling element accommodating portion A) do not provide the abutting faces on their faces opposite to the balls 46 adjacent thereto outside them, respectively. The sides with no abutting faces are arranged on the same side in the front/back direction.

Figure 19:
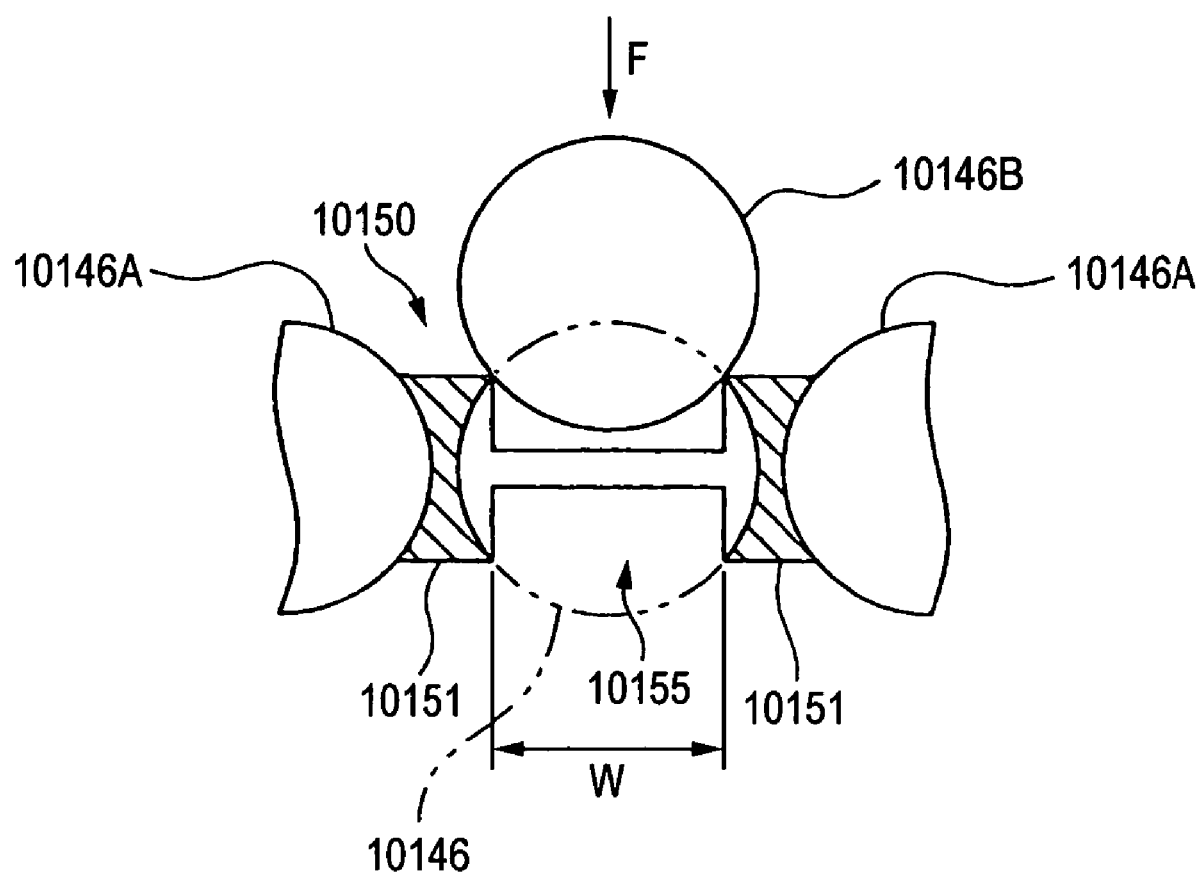
FIG. 19 is a view for explaining an example of the rolling element accommodating belt according to a prior art.
Figure 20:
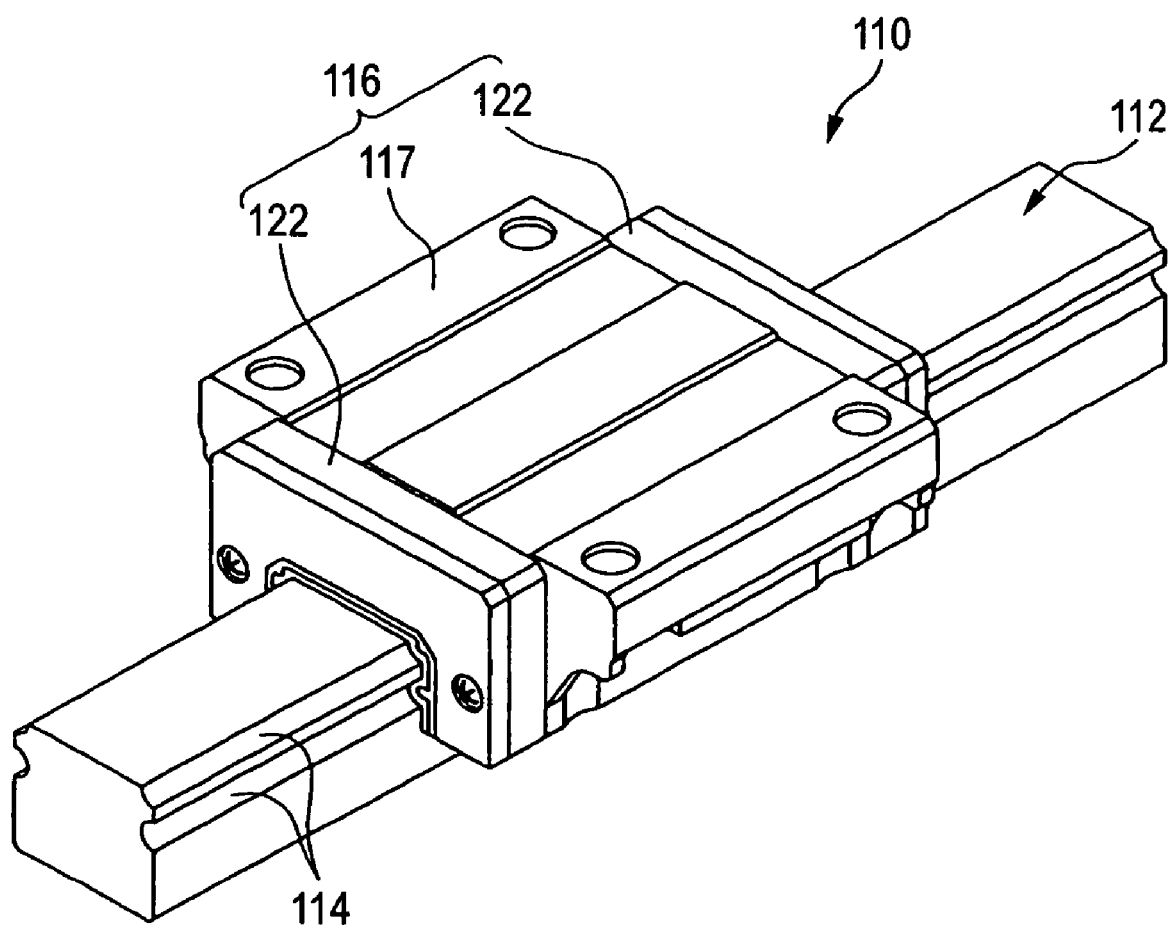
FIG. 20 is a perspective view of a linear guide according to the sixth embodiment of a linear guide apparatus provided with a rolling element accommodating belt therefor according to this invention.

In accordance with such a configuration, after the balls 46 have been mounted in the rolling element accommodating portions on both neighboring sides, even if the ball 46 is mounted in the rolling element accommodating portion at issue from the side which does not permit the ball 46 to drop out, on the side where the spacers 54, 55 do not provide the abutting face, the gaps are formed between the ball and the spacers so that the spacers 54, 55 on both sides can be elastically deformed so as to be easily extended. For this reason, large depressing force F as indicated in FIG. 19 as explained above is not required. As a result, the ball 46 can be inserted into the rolling element accommodating portion at issue by small force. In addition, there is no fear that the spacers 54, 55 are deformed to a non-restorable degree or broken. Further, the order of inserting the balls 46 into the rolling element accommodating portions is not restricted. Therefore, in accordance with this second embodiment, the balls 46 can be mounted from either one side in the front/back direction. Namely, without turning the rolling element accommodating belt 72 upside down, from the same side, the balls 46 can be easily accommodated in all the rolling element accommodating portions, thus further facilitating the mounting operation. Additionally, after only the rolling element accommodating belt 72 has been mounted into the slider 16, the balls 46 can be mounted in the respective rolling element accommodating portions by pushing from their openings.

Third Embodiment

Next, an explanation will be given of the linear guide apparatus according to a third embodiment of this invention. In this embodiment, the configuration is the same as the embodiments described above except that the structure of the rolling element accommodating belt is partially different. Therefore, only the difference on the rolling element accommodating belt will be explained, and the other will be not be explained.

Figure 13:
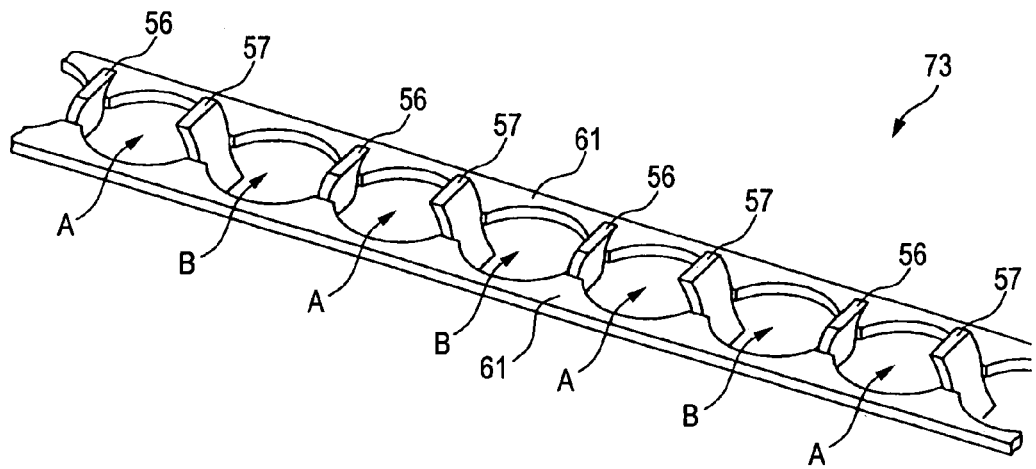
FIG. 13 is a view for explaining the third embodiment of a linear guide apparatus according to this invention.
Figure 13:
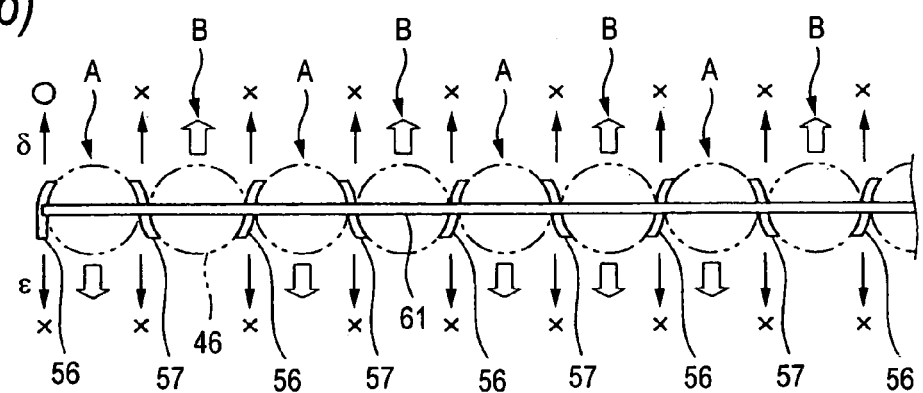
Figure 13:
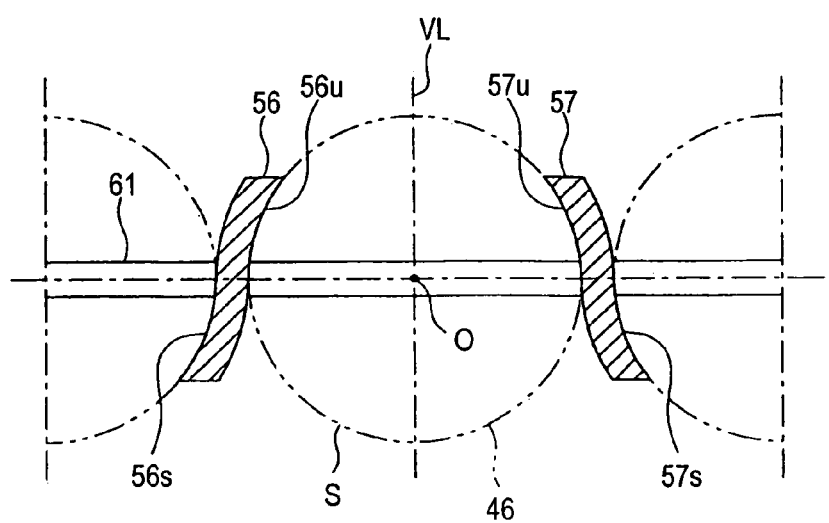

As seen from FIG. 13, a rolling element accommodating belt 73 is different from the rolling element accommodating belt 50 according to the first embodiment in that it has two kinds of spacers, i.e. a spacer 56 and a spacer 57; and these spacers are alternately arranged in the arrangement direction of the balls so that two kinds of rolling element accommodating portions, i.e. a rolling element accommodating portion A and a rolling element accommodating portion B are alternately formed in the arrangement direction of the balls 46.

The spacers 56, 57 have a nearly rectangular shape when viewed in their arrangement direction, respectively, but their front shape is thin and plate-like. The thickness of each the spacers 56, 57 is 0.44 mm. Further, as seen from FIG. 13(c), the front shapes of these spacers 56, 57 are symmetrical to each other with respect to the axis of a vertical straight line VL passing the center O of the ball 46. The faces of the spacers 56, 57 serving as both the ball-contact face and abutting face are formed by curved faces 56u, 56s; 57u, 57s which are curved in a substantially S-shape so as to follow the surface of the ball 46. Now, the curved face 56u and the curved face 57u correspond to the inward abutting faces described above whereas the curved face 56s and the curved face 57s correspond to the outward abutting faces described above. At both ends of the rolling element accommodating belt 73, the rolling element accommodating portions A are located in which the spacers 56, 57 are arranged so that their curved face 56u and curved face 57u are oriented toward the ball 46. The rolling element accommodating belt 73, as in the first embodiment, is mounted in the linear guide with the upper side of the figure being located on the inner peripheral side of the endless circulation path 28.

In such a configuration also, as seen from FIG. 13(b), the balls 46 accommodated in the respective rolling element accommodating portions A, B are removable in either one of the outer and inner peripheral sides of the endless circulation path 28 so that their drop-out is permitted. This facilitates the mounting of the balls 46 into the rolling element accommodating belt 73. Further, the respective spacers 56, 57 except those located at the ends abut, in their curved face, on the balls 46 and so are not move toward both in both outer periphery and inner periphery of the endless circulation path 28. The spacer located at the end is movable toward one of the inner periphery and outer diameter side of the endless circulation path 28, but its movement is restricted by the neighboring spacer not moving toward the other side. Thus, the swing of the rolling element accommodating belt 73 and the friction between the coupling arms 61 and the guide grooves are restricted. Accordingly, the linear guide giving the same operational advantage as those of the first embodiment can be provided. Particularly, in accordance with the third embodiment, since all the spacers have curved faces serving as the abutting faces with the balls 46, the effect of restricting the swing of the rolling element accommodating belt 72 in the endless circulation path 28 is remarkable.

Figure 14:
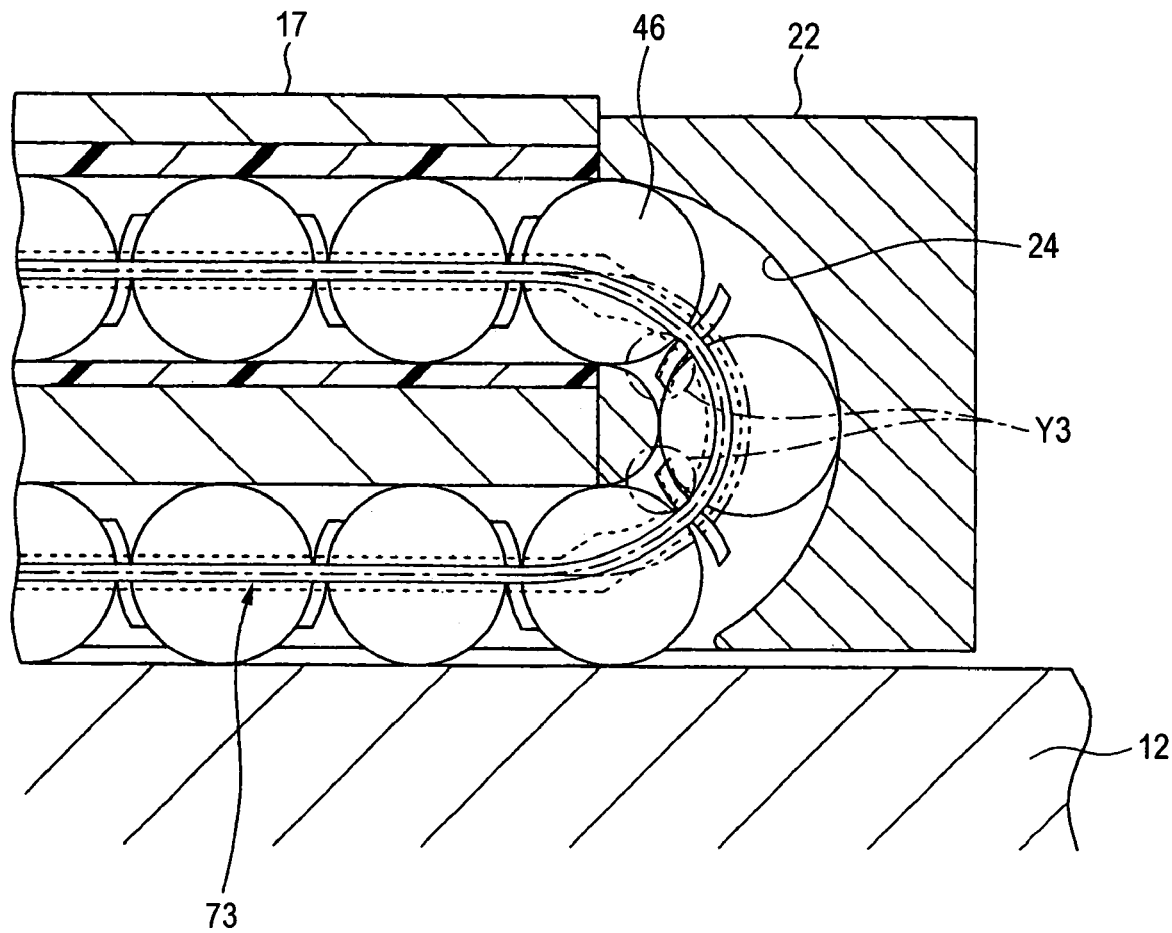
FIG. 14 is view for explaining the operation of the linear guide according to the third embodiment.

Further, in accordance with this third embodiment, the front shape of each the spacers 56, 57 is thin and plate-like. For this reason, as seen from FIG. 14, when the distance between the adjacent spacers on the inner peripheral side of the direction converting path 24, even if the spacers and the ball 46 interferer with each other in the regions (regions indicated by symbol Y3) where the spacers and the ball 46 are opposite to each other on the inner peripheral side, the spacers are thin and plate-like so that they can be easily bent. As a result, the force generated by the interference between the spacers 56, 57 and the ball 46 is small so that the rolling element accommodating belt 73 of the linear guide can be smoothly circulated. In the region indicated by symbol Y3 in FIG. 14, the image that the spacers are deformed to restrict the interference is illustrated in two-dot chain lines.

Additionally, the above interference can be avoided by displacing the coupling arm 61 further inwardly in the direction converting path 24. However, if the coupling arm 61 is displaced too inwardly, the bending radius of the coupling arm 61 is decreased so that great bending stress is generated in the coupling arm 61. If the coupling arm 61 suffers from such great stress, it may be damaged. So, in this embodiment, in order that such great stress is not applied to the coupling arm 61, the bending radius of the coupling arm 61 in the direction converting path 24 is set at a comparatively larger value. For this reason, even if the spacers and the ball 46 interfere with each other, the smooth movement of the rolling element accommodating belt 73 will not be impaired.

Fourth Embodiment

Next, an explanation will be given of the linear guide apparatus according to a fourth embodiment of this invention. In this embodiment, the configuration is the same as the embodiments described above except that the structure of the rolling element accommodating belt is partially different. Therefore, only the difference on the rolling element accommodating belt will be explained, and the other will be not be explained.

Figure 15:
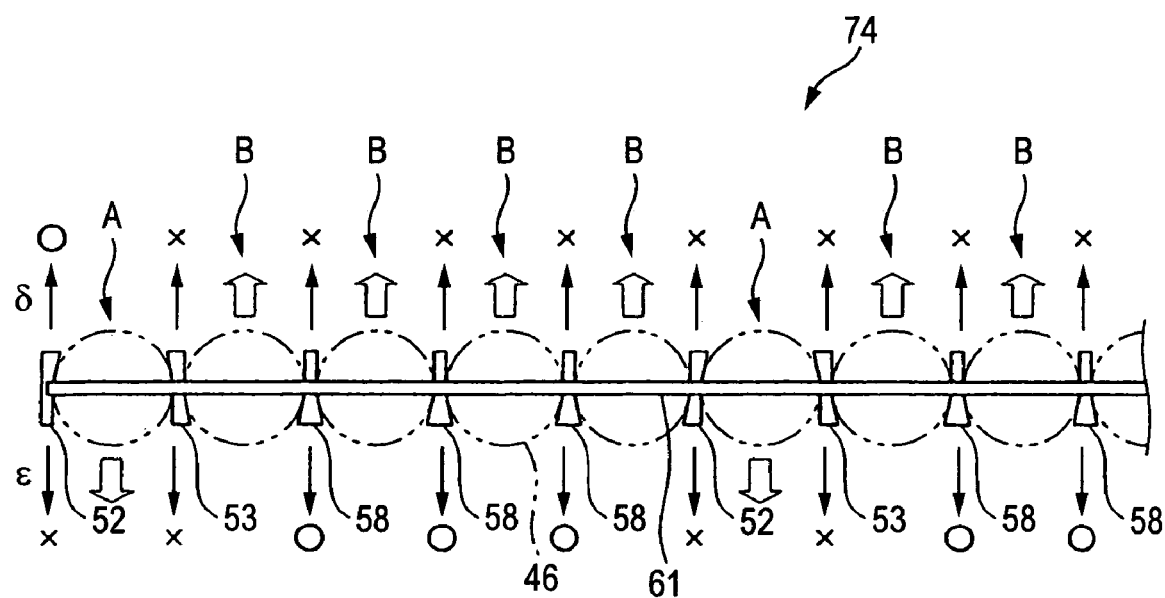
FIG. 15 is a view for explaining the fourth embodiment of a linear guide apparatus according to this invention.

As seen from FIG. 15, a rolling element accommodating belt 74 is different from the rolling element accommodating belt 50 according to the first embodiment in that it includes spacers 58 in place of the spacers 51 in the first embodiment.

The spacer 58 is different in its front shape from that of the spacer 51 in the first embodiment.

On the outer peripheral side of the endless circulation path 28 (lower side in the figure), the front shape of the spacer 58 has a width increasing from the center to the end whereas on the inner peripheral side (upper side in the figure), it has a fixed width. In other words, on the lower side in the figure, the front shape of the spacer 58 is nearly trapezoidal. With its part coupled by the coupling arm 61 being an upper bottom and its lower bottom being an end, the front shape has the width gradually increasing toward the end. On the other hand, on the upper side in the figure, the front shape has a thin and plate-like nearly rectangular shape extending toward the upper side with the width equal to that of the upper bottom of the nearly trapezoidal shape. In this front shape, the slopes on both sides of the trapezoidal shape are formed in the same manner as the outward abutting faces described previously. Namely, in the state where the spacers mounted in the endless circulation path 28, they abut on the ball 46 so that the ball 46 is not movable from the mounted state toward the outer periphery.

An appropriate number of spacers 58 are arranged to define the rolling element accommodating portions B. The spacers 52 and 53 are arranged from left to right in the figure to define the rolling element accommodating portions A. At both ends of the rolling element accommodating belt 74, the rolling element accommodating portions A are located; as in the first embodiment, the spacers 52, 53 are arranged so that their inward abutting face 52u and the outward abutting face 53u are oriented toward the balls 46. The rolling element accommodating belt 74, as in the embodiments described above, is mounted in the linear guide with the upper side of the figure being located on the inner peripheral side of the endless circulation path 28.

In such a configuration also, the balls 46 accommodated in the respective ball 46 accommodating portions A, B are removable toward either one of the outer periphery and inner periphery of the endless circulation path 28 so that their drop-out is permitted. This facilitates the mounting of the balls 46 into the rolling element accommodating belt 74. Further, the spacers 52, 53 except those located at the ends abut, in their abutting faces, on the balls 46 and so do not move toward both outer periphery and inner periphery of the endless circulation path 28. The spacer 52, 53 located at the ends the respective spacers 58 are movable toward one of the inner periphery and outer diameter side of the endless circulation path 28, but their movement is restricted by the neighboring spacer 52 or 53. Thus, the swing of the rolling element accommodating belt 72 and the friction between the coupling arms 61 and the guide grooves are restricted. Accordingly, the linear guide giving the same operational advantage as those of the first embodiment can be provided.

Fifth Embodiment

Next, an explanation will be given of the linear guide apparatus according to a fifth embodiment of this invention. In this embodiment, the configuration is the same as the embodiments described above except that the structure of the rolling element accommodating belt is partially different. Therefore, only the difference on the rolling element accommodating belt will be explained, and the other will be not be explained.

Figure 16:
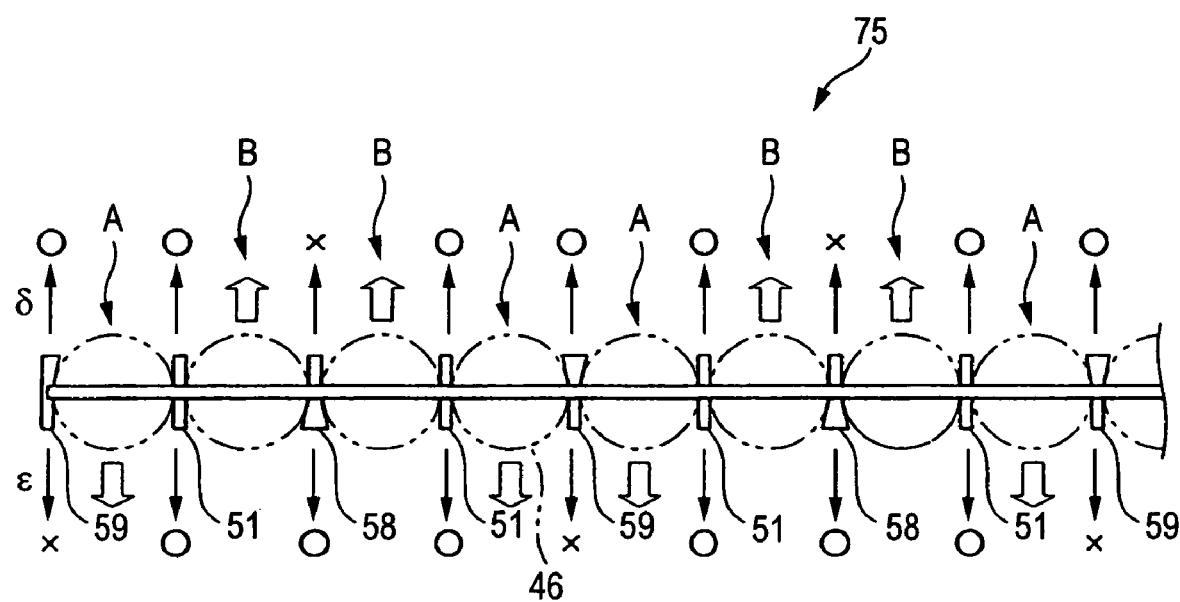
FIG. 16 is a view for explaining the fifth embodiment of a linear guide apparatus according to this invention.

As seen from FIG. 16, a rolling element accommodating belt 75 is different from the rolling element accommodating belts according to the embodiments described above in that it includes three kinds of spacers, i.e. spacers 51, 58, 59; and of these three kinds of spacers, the spacers 51, 58 are the same as described above and the spacer 59 has a shape when the spacer 58 is inverted in the front/back direction of the rolling element accommodating belt 75. These spacers are appropriately arranged as shown in FIG. 16 to define the rolling element accommodating portion A, B. At both ends of the rolling element accommodating belt 75, the spacers 59 are arranged so that their inward abutting faces are oriented toward the balls 46. The rolling element accommodating belt 75, as in the embodiments describe above, is mounted in the linear guide with the upper side of the figure being located on the inner peripheral side of the endless circulation path 28.

In such a configuration also, the balls 46 accommodated in the respective rolling element accommodating portions A, B are removable from either one of the outer and inner peripheral sides of the endless circulation path 28 so that their drop-out is permitted. This facilitates the mounting of the balls 46 into the rolling element accommodating belt 75. Further, the spacers 51, 58, 59 abut, in their abutting faces, on the balls 46 and so do not move toward either one of the outer periphery and inner periphery of the endless circulation path 28. The spacers 51, 58, 59 inclusive of those located at the ends are movable toward the one side of the inner and outer peripheral sides of the endless circulation path 28, but their movement is restricted by the neighboring spacers not moving toward the other side. Thus, the swing of the rolling element accommodating belt 72 and the friction between the coupling arms 61 and the guide grooves are restricted. Accordingly, the linear guide giving the same operational advantage as those of the first embodiment can be provided.

As understood from the description hitherto made, in accordance with the embodiments described above, there is provided a rolling element accommodating belt and linear guide which can facilitate the operation of mounting the balls 46 in the rolling element accommodating belt and restrict the swing of the rolling element accommodating belt and the friction between the coupling arms and the guide grooves.

The linear motion guide device according to this invention should not be limited to the embodiments described above, but may be modified in various manners as long as it does not depart from the spirit of the invention.

Figure 17:
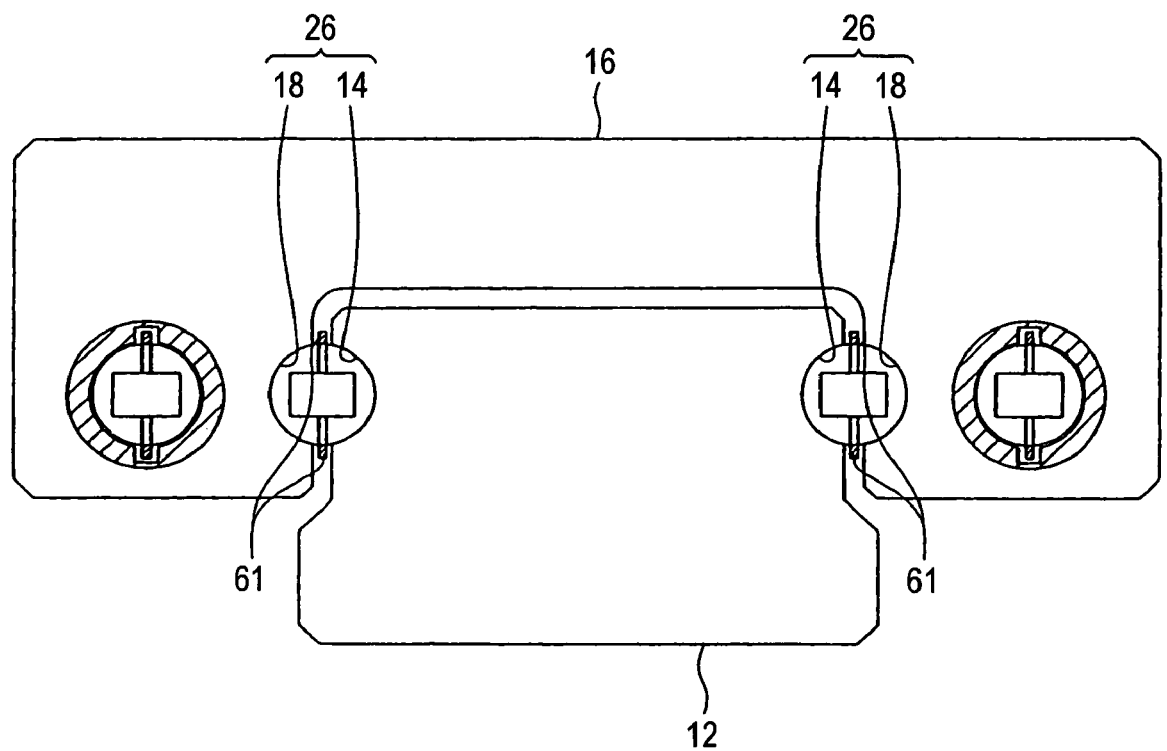
FIG. 17 is a view for explaining a modification of the linear guide apparatus according to this invention.

For example, in the embodiments described above, in the lower rolling element string guide member 40, the side wall 38c was provided on only the one side in the thickness direction of the coupling arm 61 so that the guide groove 38b is opened toward the guide rail 12. However, without being limited to such a configuration, as shown in FIG. 17, the guide groove in the ball track path 26 may not be provided on both sides of the coupling arm 61. In such a configuration also, in accordance with the rolling element accommodating belt according to the embodiments described above, the spacers do not move toward the outer diameter side of the endless circulation path 28 so that the fly-out of the rolling element accommodating belt can be prevented. In addition, since the space for forming the guide groove can be reduced, the groove depth of the ball guiding face of the guide rail can be increased.

Figure 18:
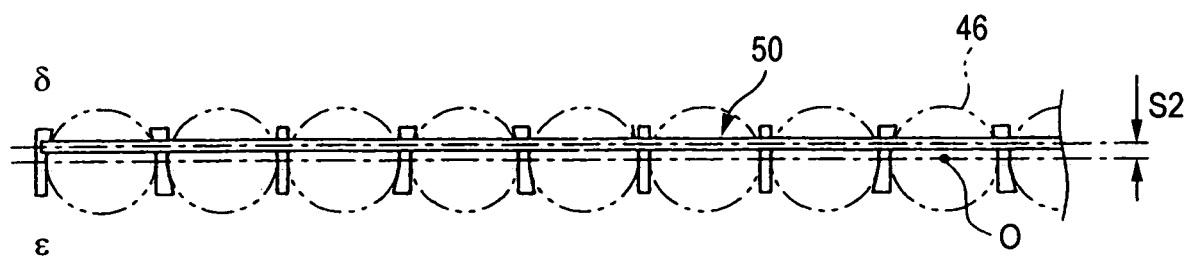
FIG. 18 is a view for explaining another modification of the linear guide apparatus according to this invention.

Further, in the embodiments described above, the locus RL drawn by the center in the width direction of the coupling arm 61 nearly agrees with the center locus CL of the balls 46. However, without being limited to such a configuration, as seen from FIG. 18, the coupling position of the coupling arm 61 may be located at a position displaced by an offset quantity S2 toward the inner diameter side of the endless circulation path 28. Correspondingly, the guide groove may be formed near the inner periphery in the linear portion of the endless circulation path 28 also. However, in this case, as seen from FIG. 8(c), since the coupling arms 61 are coupled near the inner diameter side of the endless circulation path from the center O of the ball 46 by the offset quantity S2, the groove depth W2 of the load rolling element guiding face 18 is shallower by the degree corresponding to the offset quantity S2 than the groove depth W1 in the embodiments described above. For this reason, in order to keep large the contact length between the balls and the ball guiding face and increase the load capacity of the linear guide, the configuration in the embodiments described above is preferred.

Further, in the embodiments described above, the face outwardly oriented at the end of the rolling element accommodating belt was only the ball contact-face, i.e. flat face. Without being limited to such a configuration, the face outwardly oriented at the end may be the abutting face left as it is as in the other spaces.

Further, the above various embodiments was explained with reference to the linear guide apparatus 10 having the balls 46 as rolling elements. However, this invention should not be limited to such a liner guide but may be also applied to a linear guide having rollers as the rolling elements.

Next, sixth to ninth embodiments of the present invention will be explained.

Sixth Embodiment

Next, an explanation will be given of the linear guide apparatus according to a sixth embodiment of this invention. In this embodiment, the configuration is the same as the first embodiment except that the structure of the rolling element accommodating belt is partially different. Therefore, only the difference on the rolling element accommodating belt will be explained, and the other will be not be explained.

A rolling element accommodating belt 150 according to the sixth embodiment is formed in a terminating shape. Also, as seen from FIGS. 22 and 23(a), the rolling element accommodating belt 150 has spacers 151 interposed between the adjacent balls 146 within the endless circulation path 128, and belt-like coupling arms 152 for coupling the spacers 151 with one another on both sides in the width direction of the endless circulation path 128. These spacers 151 and coupling arms 152 are integrally formed of flexible resin material. By individually accommodating the balls 146 at predetermined intervals in a plurality of rolling element accommodating portions 155 defined by the spacers 151 and the coupling arms 152, the balls 146 are aligned as a string of rolling elements 162 in the arrangement direction within the endless circulation path 128 and kept in a rollable state. The thickness of the coupling arms 152 coupling the adjacent spacers 151 with each other is made thin within a range enough to keep necessary and sufficient strength.

Each the coupling arms 152 has a ball accommodating hole 152a having a circular opening in their front/back direction (thickness direction) for each of the rolling element accommodating portions 155. The inner diameter of the ball accommodating hole 152a is slightly larger than that of the ball 146 to be accommodated.

Figure 21:
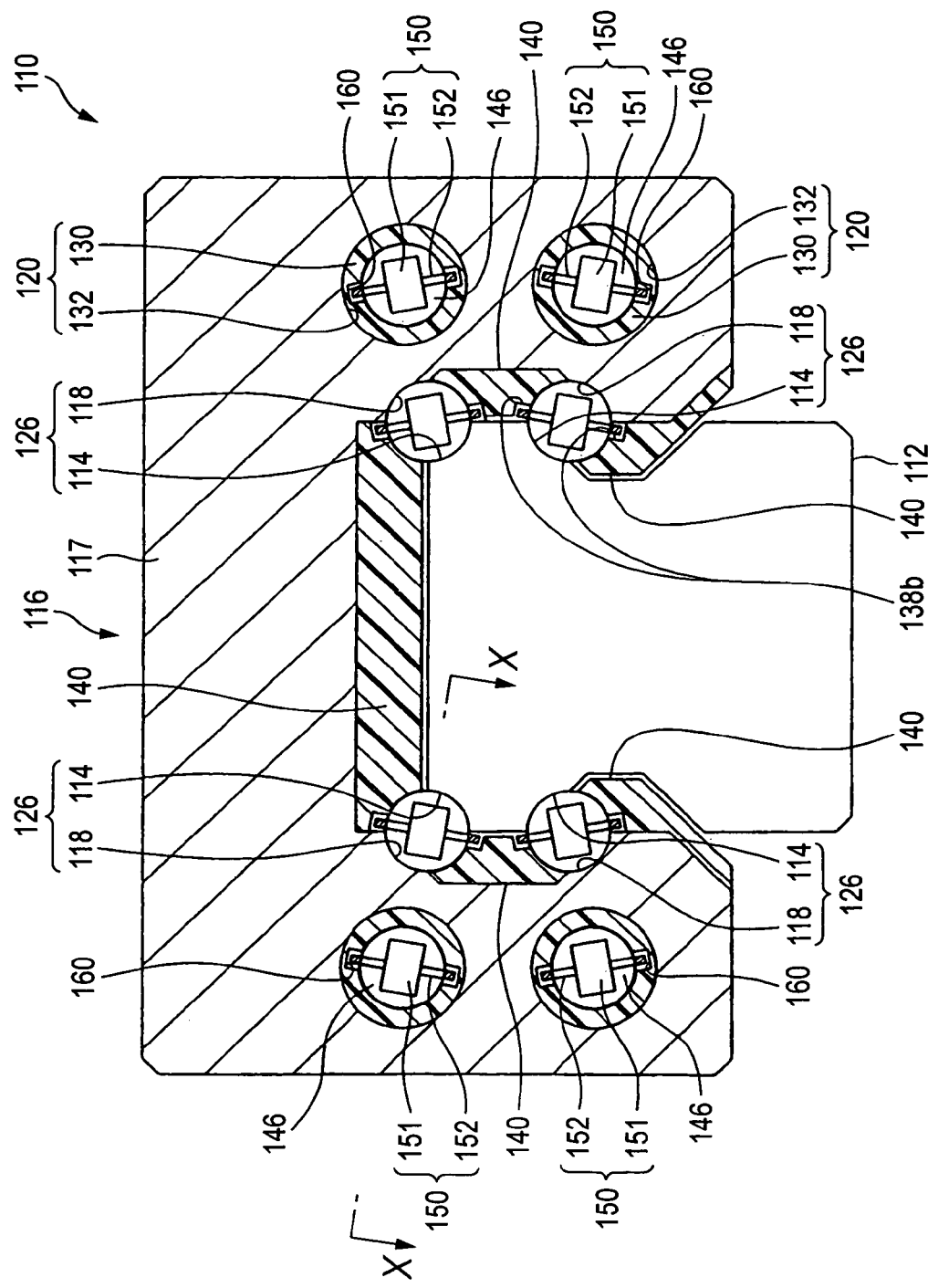
FIG. 21 is a view for explaining the cross section of a slider of the linear guide in FIG. 20.

As shown in FIG. 21, the shape of the spacers 151 when viewed in the arrangement direction of the balls 146 is a rectangle. The short sides of the rectangle are provided in nearly parallel to the width direction of the belt-like coupling arms 152. The respective spacers 151 are coupled by the coupling arms 152 at their nearly central positions of the longer sides of the rectangle on both sides in the width direction.

Figure 23:
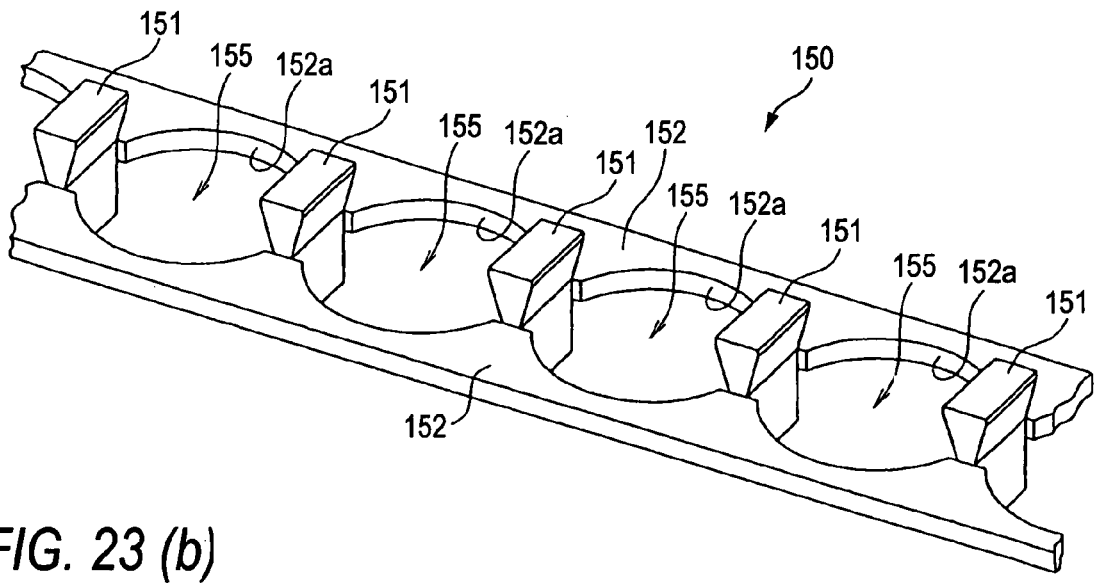
FIG. 23(a) is a partially enlarged perspective view of the rolling element accommodating belt in a developed and enlarged state.
FIG. 23(b) is a front view of the rolling element accommodating belt.
FIG. 23(c) is a view for explaining the section of a partially enlarged ball accommodating portion shown in FIG. 23(b)
Figure 23:
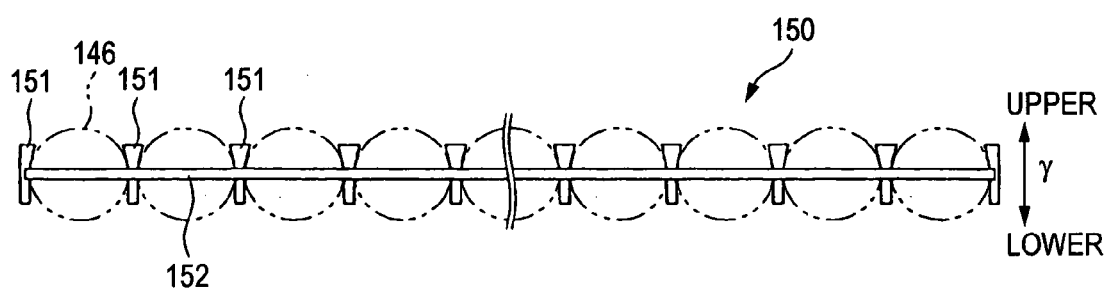
Figure 23:
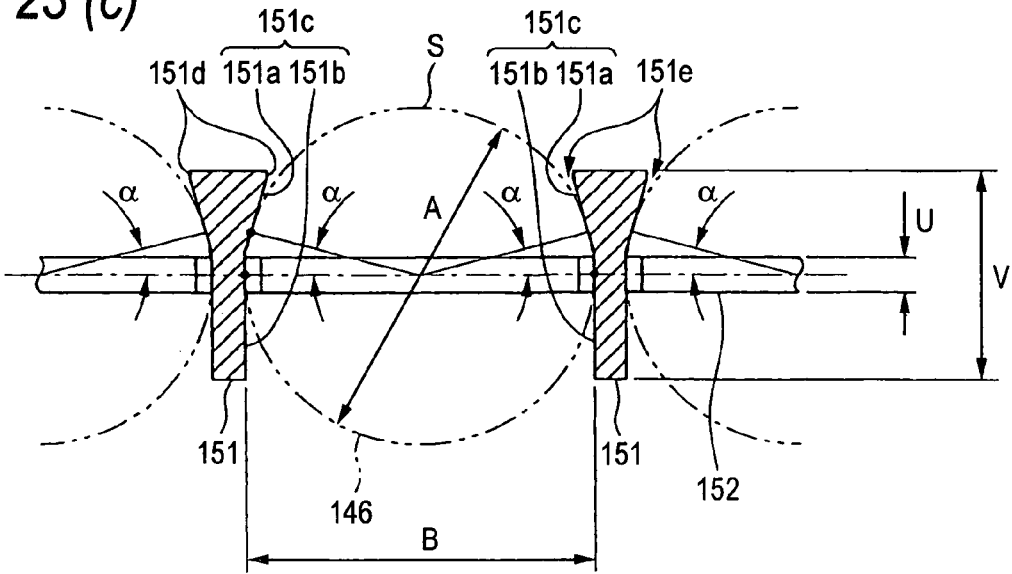

The front shape of the spacer 151, as illustrated in the enlarged manner in FIG. 23(*c*), has a width increasing toward the end on the one side (upper side in the figure) in the front/back direction of the coupling arms 152 and a fixed width on the other side (lower side in the figure).

Specifically, the front shape of the spacer 151 is nearly trapezoidal. With its part coupled by the coupling arm 152 being an upper bottom and its lower bottom being an end, the front shape has the width gradually increasing toward the end. On the other hand, on the lower side in the figure, the front shape has a thin and plate-like nearly rectangular shape extending toward the lower side with the width equal to that of the upper bottom of the nearly trapezoidal shape. In this front shape, the height V of the spacer 151 is smaller than the diameter A of the ball 146. The predetermined interval B between the adjacent spacers 151 is slightly larger than the diameter of the ball 146. The coupling arms 152 couple the adjacent spacers 151 with each other at the predetermined intervals B. The thickness U (FIG. 23(*c*)) of the coupling arms 152 is slightly smaller than the groove width of guide grooves 160 and guide grooves 138*b*. Therefore, the coupling arms 152 of the rolling element accommodating belt 150 can be slidably engaged in the guide grooves 160 and guide grooves 138*b*.

The spacer 151 has a pair of rolling element contact faces 151*c* which follow the spherical face S serving as a rolling face of the ball 146. Of these pair of rolling element contact faces 151*c*, the one rolling element contact face 151*c* is oriented toward one of the adjacent balls 146 whereas the other rolling element contact face 151*c* is oriented toward the other of the adjacent balls 146, which is oriented oppositely to the one rolling element contact face 151*c*.

More specifically, the rolling element contact face 151*c* is composed of two faces consisting of a side 151*b* of the nearly rectangular shape of the spacer 151 and a slope 151*a* which is the side of the trapezoidal shape of the space 151. The balls 146 accommodated in the rolling element accommodating portions 155, at both ends in their arrangement direction, are in contact with the sides 151*b* formed to be oriented to the arrangement direction of the balls 146 continuous within the endless circulation path 128. The slope 151*a* constituting the side of the trapezoidal shape is an abutting face abutting on the ball 146 at a position of a predetermined angle α (15° in this embodiment) from the arrangement direction. Thus, the balls 146 can be held while being rollably supported between the adjacent spacers 151. Now, the predetermined angle α is preferably set within a range from 10° to 15°. By setting the predetermined angle α within this range, the rolling element accommodating belt 150 can be smoothly circulated. If the predetermined angle α exceeds 15°, when the distance between the adjacent spacers 151 decreases in the direction converting path, the spacer 151 and the ball 146 are likely to interfere with each other. If the predetermined angle α is smaller than 10°, it is difficult to assure the holding tab of the ball 146.

At the end on the upper side in FIG. 23(*c*), the spacer 151 has a chamfering 151*d* and a gap formed in the area where the slope 151*a* of the rolling element contact face 151*c* is opposite to the ball 146, thereby providing a relief portion 151*e*.

The rolling element accommodating belt 150 is formed in the terminating shape so that outside the spacers 151 located at the ends of the terminating shape, the ball 146 is not accommodated. Therefore, as seen from FIG. 23(*b*), the outward oriented face of each the spacers 151 located at both ends is only the face continuous to the side 151*b*.

Figure 22:
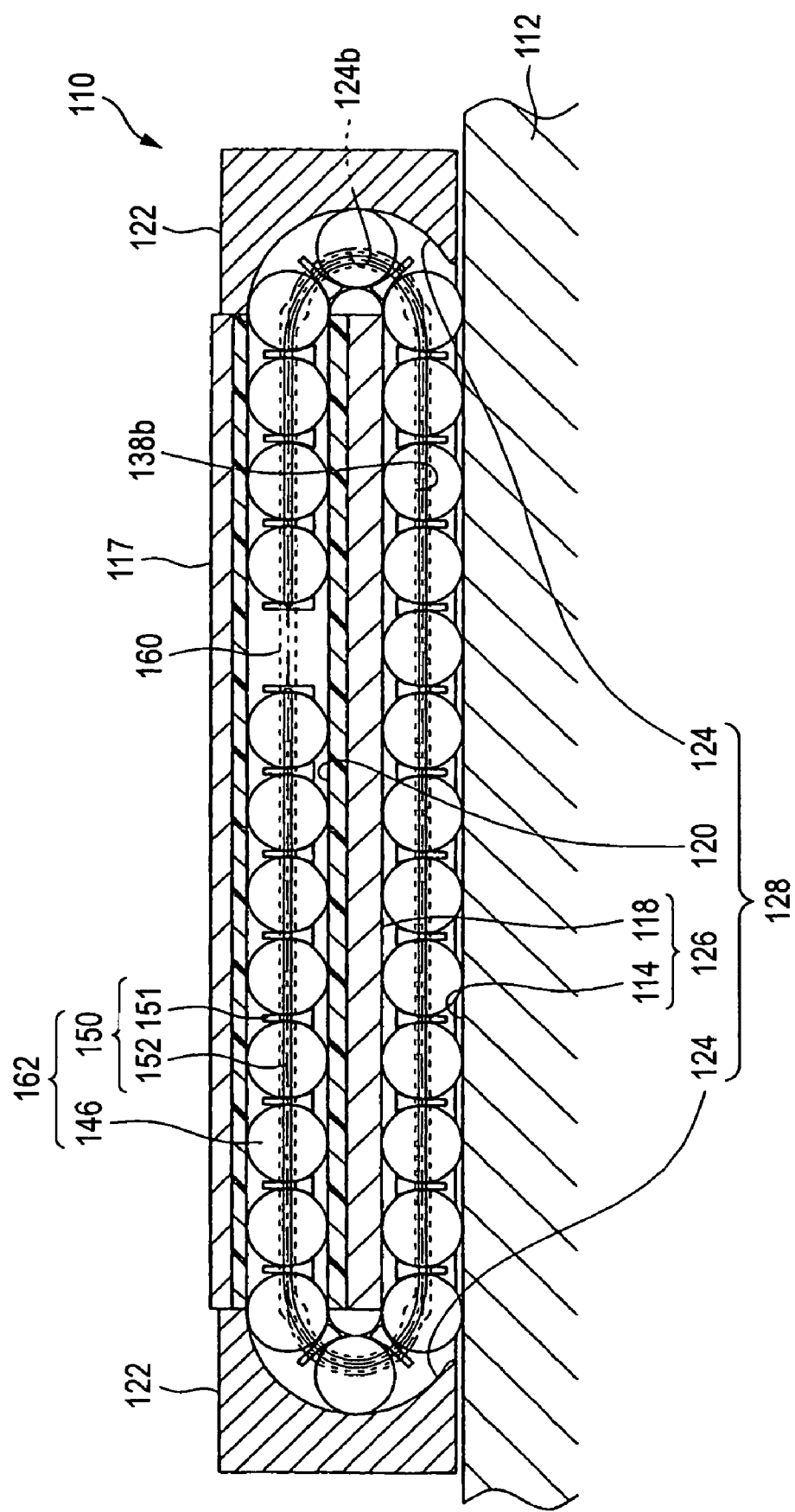
FIG. 22 is a sectional view of the linear guide taken in line X-X in FIG. 21.

The rolling element accommodating belt 150 is mounted in the endless circulation path 128 so that the side of the trapezoidal shape of each the spacers 151 is oriented toward the inner diameter side of the endless circulation path 128 as seen from FIG. 22. In the developed state, the arrangement direction of the balls 146 agrees with the longitudinal direction of the rolling element accommodating belt 150.

Now, the rolling element accommodating belt 150 is mounted in the endless circulation path 128 so that the side (lower side in FIG. 23(*c*)) having a fixed width of the spacers 151 defining the respective rolling element accommodating portions 155 is oriented toward the outer diameter side of the endless circulation path 128. The predetermined interval B between the adjacent spacers 151 is set to be slightly larger than the diameter of the ball 146. Thus, the balls 146 accommodated in the rolling element accommodating portions 155 are removable toward the outer periphery so that their drop-out is permitted. Further, the side having the increasing width of the spacers 151 is located on the inner peripheral side of the endless circulation path 128. Thus, since the slope 151*a* of each the spacers 151 abuts on the ball 146, the spacers 151 mounted within the endless circulation path 128 are not movable toward the outer diameter side of the endless circulation path 128 from the state mounted in the endless circulation path 128.

Next, a more detailed explanation will be given of the linear guide apparatus 110 in which the string of balls 162 is mounted.

As seen from FIG. 21, the inner wall of the slider body 117 is covered with a rolling element string guiding member 140 of synthetic resin except the areas serving as the load rolling element guiding faces 118. Between the rolling element string guide member 140 and the surface of the guide rail 112 opposite thereto, a slight space is formed. Inside the U-shape of the slider body 117, groves in which the string of balls 162 is inserted are formed by the load rolling element guiding faces 118 and the rolling element string guide member 140.

Figure 24:
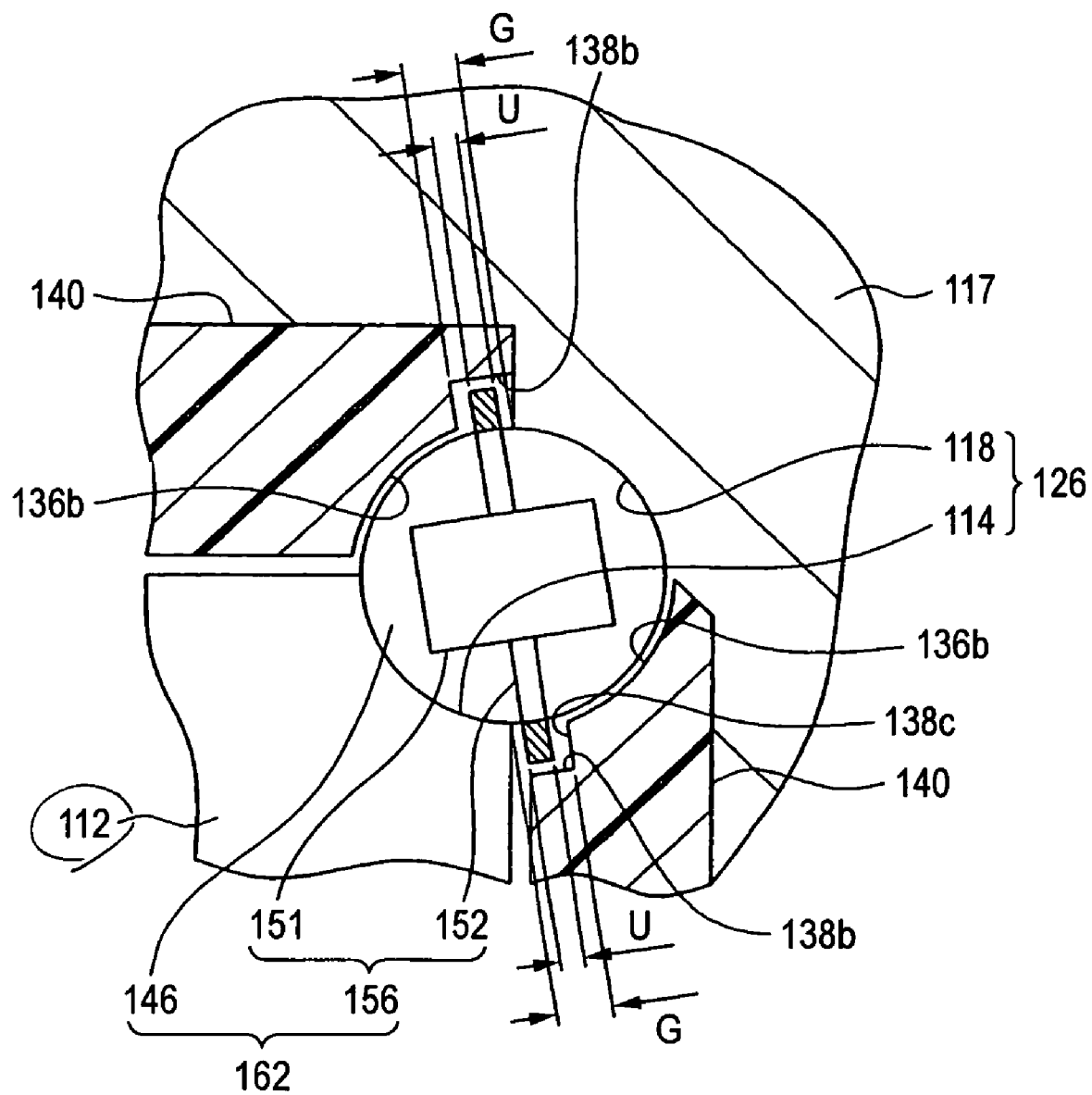
FIG. 24 is a sectional view perpendicular to the longitudinal direction in a rolling element track path of the linear guide in FIG. 21.

More specifically, as seen from FIG. 24, the grooves are formed because the rolling element string guide member 140 has guide walls 136*b* formed for the string of rolling elements 162. The interval between the guide walls 136*b* is slightly larger than the diameter of the ball 146. On the guide wall 36*b*, the guide groove 138*b* with which the coupling arm 152 of the rolling element accommodating belt 150 is engaged is formed continuously in the longitudinal direction. The groove width G of the guide groove 138*b* is slightly larger than the thickness U of the coupling arm 152. Therefore, the coupling arms 152 of the rolling element accommodating belt 150 can be slidably engaged in the guide grooves 138*b*, respectively.

Usually, the guide groove 138*b* is formed in the rolling element string guide member 140 at the position where the coupling arm 152 can engaged so as to be held. However, in this embodiment, as seen from FIG. 24, the rolling element string guide member 140 on the lower side in FIG. 24 is provided with a side wall 138*c* on only the one side in the thickness direction of the coupling arm 152 so that the guide groove 138*b* is opened toward the guide rail 112.

Figure 25:
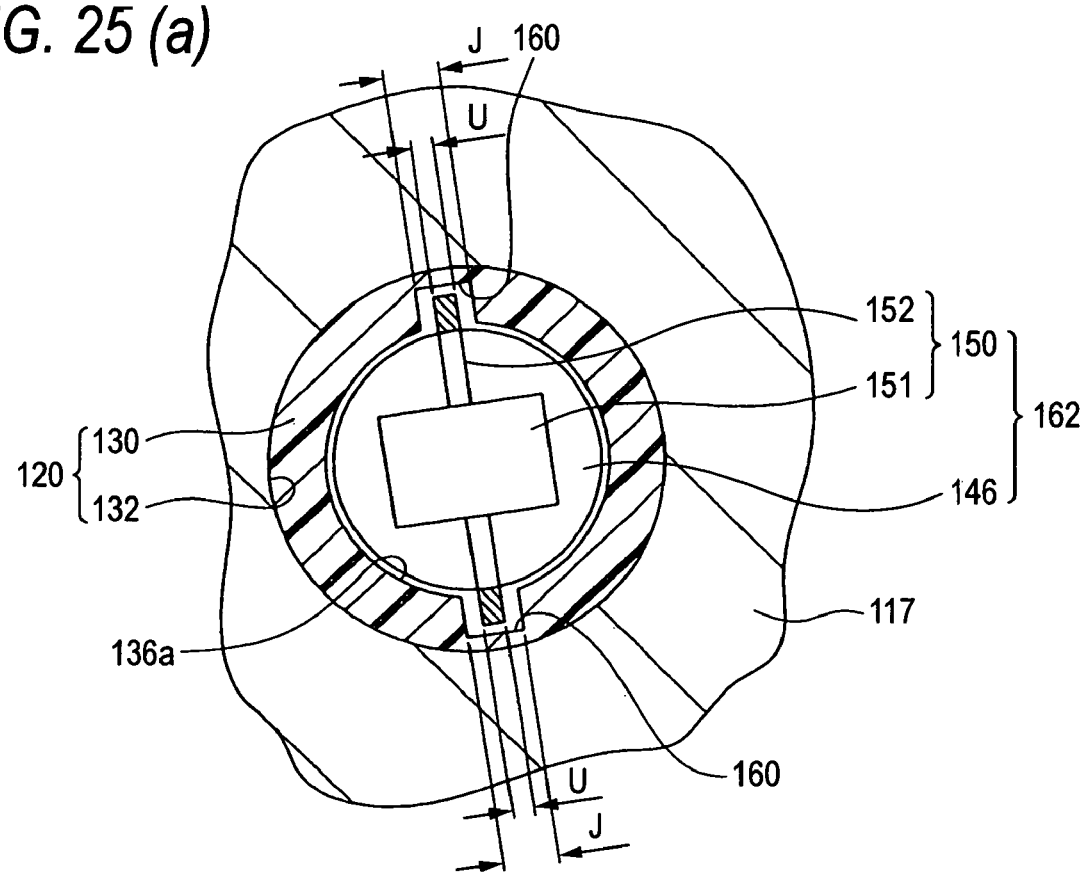
FIG. 25(a) is a sectional view perpendicular to the longitudinal direction of a rolling element return path of the linear guide in FIG. 21.
FIG. 25(b) is a view for explaining its modification.
Figure 25:
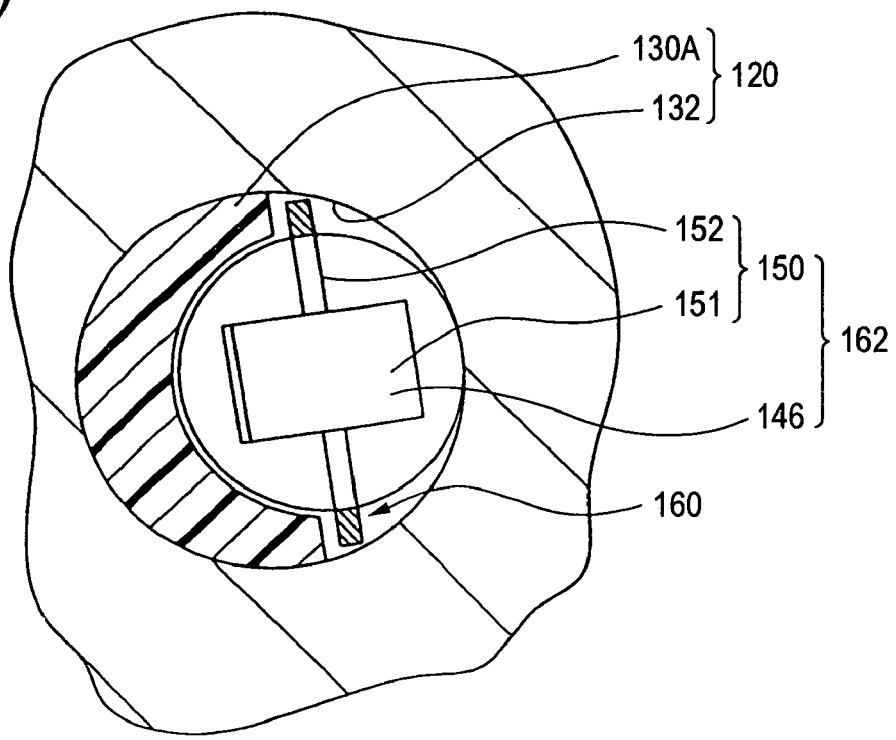

Further, as seen from FIG. 21 and FIG. 25(*a*), ball-return paths 120 are formed in the walls at the sleeves of the U-shape slider body 117, the ball-returns paths 120 extending in nearly parallel to the corresponding load rolling element guiding faces 118 apart by a predetermined distance. The ball-return path 120 is composed of a through-hole 132 whose circular section continues in the longitudinal direction and a circulating tube 130 inserted in the through-hole 132. The circulating tube 130 is a tube made of synthetic resin. The sectional shape continuing in the longitudinal direction within the internal space of the circulating tube 130 is a nearly circular shape having an inner diameter slightly larger than the diameter of the balls 146 so that the balls 146 can internally pass.

The respective faces opposite to the pair of coupling arms 152 of the rolling element accommodating belt 150 moving within the circulating tube 130 serve as the guide walls 136a. On the guide walls 136a, guide grooves 160 having the width which permits engagement and also guiding of the pair of coupling arms 152 of the rolling element accommodating belt 150 are continuously formed in the longitudinal direction. The groove width J of the guide groove 160 is slightly larger than the height U of the coupling arm 152. Therefore, the coupling arms 152 of the rolling element accommodating belt 150 are slidably engaged in the guide grooves 160, respectively. Thus, the balls 146 and rolling element accommodating belt 150 are smoothly movable within the space of the circulating tube 130.

Further, as seen from FIG. 22, a pair of direction converting paths 124 connected to both ends of the rolling element track path 126 are formed in the end caps 122. The direction converting paths 124 are curved through-holes which communicate to the rolling element return path 120 and have circular sectional shapes continuing in the longitudinal direction. The above guide walls 136a, 136b for the string of rolling element 162 are formed continuously so as to sandwich the direction converting paths 124. Within the direction converting path 124, the coupling arm 152 of the string of rolling elements 162 is elastically deformed so that the entire string of rolling elements 162 moves while rolling. Therefore, considering the curvature according to the deforming range of the coupling arm 152, the width of the guide groove 124b for guiding the coupling arm 152 is increased in the direction converting path 124.

Figure 26:
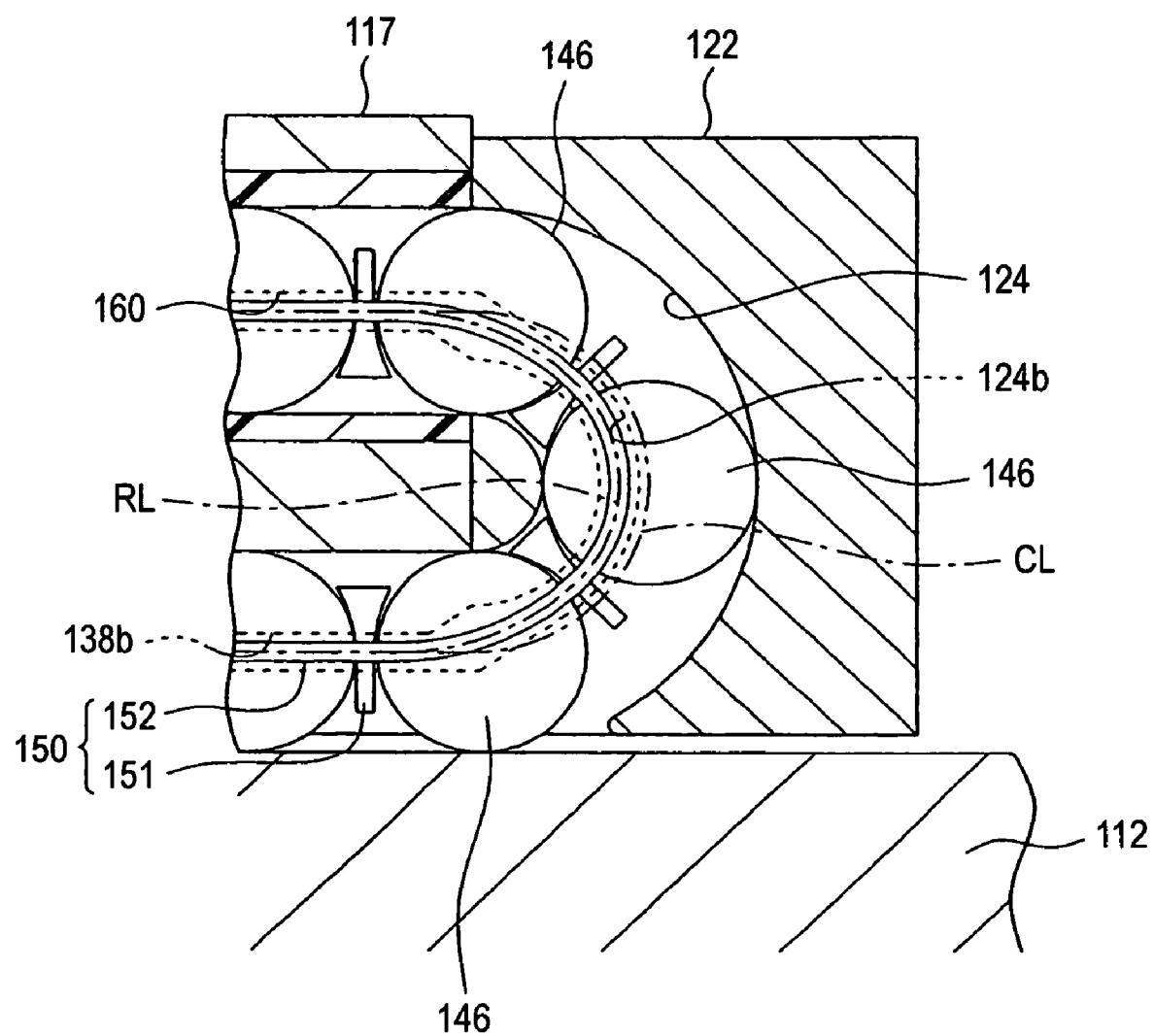
FIG. 26 is an enlarged view for explaining a direction converting path of the linear guide shown in FIG. 22.

Now, the guide groove 124b in the direction converting path 124, as seen from FIG. 26 which is a partially enlarged view of FIG. 22, is formed so that the locus RL drawn by the center in the width direction of the coupling arm 152 is near to the inner diameter side of the endless circulation path 128 with respect to the center locus CL drawn by the center of the ball 146. More concretely, in this embodiment, the center locus CL drawn by the center of the ball 146 is an arc having a radius of 4 mm whereas the locus RL drawn by the center in the width direction of the coupling arm 152 is an arc having a radius of 3.3 mm at a nearly central position of the guide groove 124b within the direction converting path 124. In the other place than the direction converting path 124 within the endless circulation path 128, the guide groove is formed so that the locus RL drawn by the center in the width direction of the coupling arm 152 and the center locus CL of the ball 146 substantially agree with each other.

Next, an explanation will be given of the operational advantage of the linear guide apparatus 110.

In the linear guide apparatus 110, when the slider 116 is relatively moved in the axial direction of the guide rail 112, the balls 146 roll to move within the endless circulation path 128. Simultaneously, the rolling element accommodating belt 150 also move together with the balls 146 within the endless circulation path 128. At this time, the respective spacers 151 of the rolling element accommodating belt 150 within the endless circulation path 128 push the balls 146 in front of themselves in the moving direction, and the balls 146 also push the respective spacers 151 in front of themselves in the moving direction. In this case, the string of rolling elements 162 repeats the circulation in such a manner that it moves in the direction opposite to the slider 116 along the rolling element track path 126, enters the one direction converting path 124 continuous from the one end of the rolling element track path 126 to change its moving direction, enters the rolling element return path 120 from the direction converting path 124 to move in the same direction as the slider 116, enters the other direction converting path 124 to change its moving direction again and returns to the rolling element track path 126. In short, the entire string of rolling elements 162 circulates within the endless circulation path 128.

In accordance with the linear guide apparatus 110, by accommodating the balls 146 in the ball accommodating portions 155, the rolling element accommodating belt 150 can constitute the string of rolling elements 162 in which the balls 146 and the spacers 151 are alternately arranged.

In accordance with the linear guide apparatus 110, since the spacers 151 intervene between the balls 146 within the endless circulation path 128, the balls 146 are not brought into direct contact with each other. Thus, occurrence of noise or abrasion owing to the rubbing of the balls 146 against each other is prevented. Further, since the spacers 151 are coupled with one another by the coupling arms 152 to provide the rolling element accommodating belt 150, the respective balls 146 can be moved by the rolling element accommodating belt 150 while keeping a predetermined distance therebetween and keeping the stable rolling of the string of balls 162 within the endless circulation path 128.

Further, in accordance with the linear guide apparatus 110, in the rolling element accommodating belt 150, before the ball 146 is caused to intervene between the adjacent spacers 151, the predetermined interval B between the spacers 151 (between a pair of ball-contact faces 151c) is made slightly larger than the diameter of the ball 146. In addition, the ball accommodating portions 155 are structured so as to permit the drop-out of the accommodated balls 146 toward the outer diameter side of the endless circulation path 128. Thus, in mounting the balls 146 in the respective ball accommodating portions 155 of the rolling element accommodating belt 150, in the developed state, since the side permitting the drop-out of the balls 146 is located at only one side, the balls 146 have only to be placed within the ball accommodating portions 155 from this side. Accordingly, the efficiency of accommodating the balls 146 between the spacers 151 is improved so that a troublesome operation such as mounting the balls 146 in the ball accommodating portions 155 by pushing is not required. As a result, the mounting operation of the balls 146 in the rolling element accommodating belt 150 can be facilitated.

Further, in accordance with the linear guide apparatus 110, since the coupling arms 152 of the rolling element accommodating belt 150 are guided along the guide grooves 160, 138b, 124b within the endless circulation path 128, swing of the rolling element accommodating belt 150 when it moves is restricted. Thus, the entire string of balls 162 can be moved precisely and smoothly within the endless circulation path 128. Further, the spacers 151 defining the respective ball accommodating portions 155 are constructed so that they are not movable toward the outer diameter side of the endless circulation path 128 because their abutting faces, i.e. slopes 151a abut on the balls 146. Thus, in the accommodating belt 150 bent in the direction converting path 124, even when it moves from the direction converting path 124 of the endless circulation path 128 to the linear portion thereof, the coupling arms 152 coupled with the spacers 151 will not expand toward the outer peripheral side of the guide grooves 160, 138b in the linear portion, thereby preventing the coupling arms 152 from approaching the side walls on the outer peripheral side of the guide grooves 160, 138*b*. Accordingly, it is possible to prevent the coupling arms 152 of the rolling element accommodating belt 150 from moving while rubbing the side walls of the guide grooves 160, 138*b*.

Further, in accordance with the linear guide apparatus 110, although the balls 146 suffer from resistance within the rolling element track path 126, the respective balls 146 are pushed from behind by the spacers 151, they can be moved smoothly within the ball tack path 126. Further, in the ball tack path 126, the interval between the guide walls 136*b* for the string of rolling elements 162 is slightly larger than the diameter of the ball 146 and the coupling arms 152 of the rolling element accommodating belt 150 are guided by the guide grooves 138*b* of the guide walls 136*b*. For this reason, it is possible to prevent the respective spacers 151 from falling down in the rolling element track path 126 and prevent the smooth movement of the string of rolling elements 162 from being hindered owing to disorder of the arrangement of the string of balls 162.

Further, in accordance with the linear guide apparatus 110, the side wall of the guide groove 138*b* is formed as the side wall 138*c* on only one side of the coupling arm 152. Therefore, as seen from FIG. 27(*a*), the space required to the guide groove 138*b* is reduced so that the groove depth D1 of the rolling element guiding face 114 of the guide rail 112 can be increased correspondingly.

Figure 27:
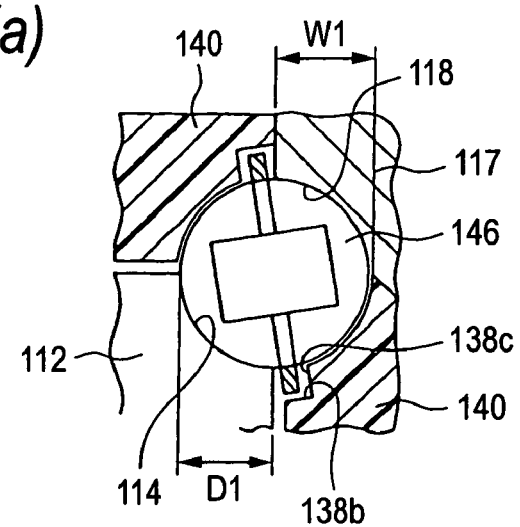
FIG. 27 is a view for explaining the operation of the linear guide according to the sixth embodiment.
Figure 27:
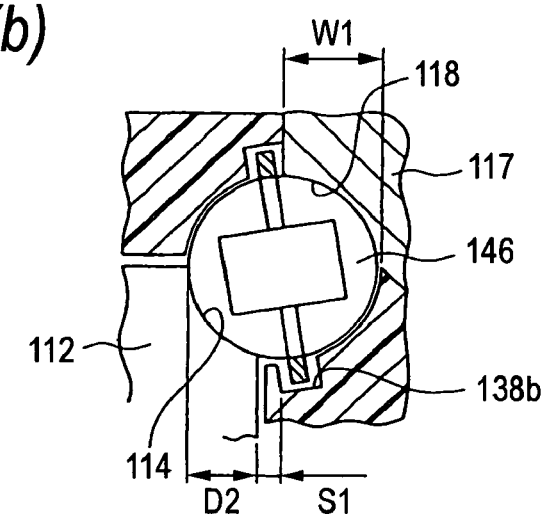
Figure 27:
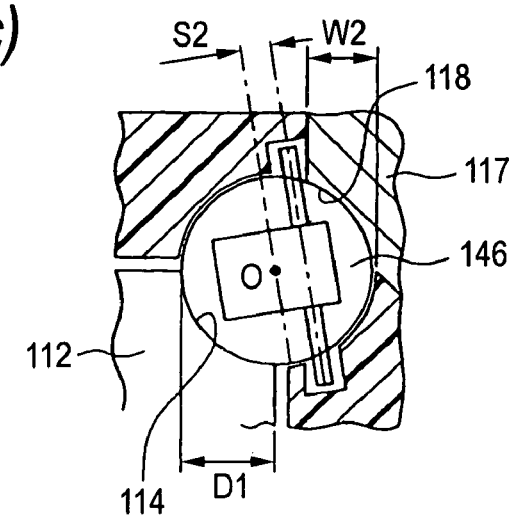

More specifically, as seen from a comparative example of FIG. 27(*b*), where the side walls of the guide groove 138*b* are formed on both sides, a space S1 for forming the side wall is required in the horizontal direction of the figure. Therefore, the groove depth D2 of the rolling element guiding face 114 must be smaller than the groove depth D1 indicated in FIG. 27(*a*) by a space D1. Further, as seen from another comparative example, the coupling arm 152 can be set near the inner diameter side of the endless circulation path 128 by an offset quantity S2 with respect to the center O of the ball 146. However, in this case, the groove depth W2 of the load rolling element guiding face 118 must be smaller by the quantity corresponding to the offset quantity S2 than the groove depth W1 indicated in FIG. 27(*a*). In this way, in accordance with this embodiment, as compared with the structure in which the side walls of the guide groove are both sides, without reducing the groove depth of the load rolling element guiding face 118, the groove depth of the rolling element guiding face 114 of the guide rail 112 can be increased. Accordingly, the contact length between the ball 146 and the rolling element guiding face 114 can be kept large so that the load capacity of the linear guide apparatus 110 can be increased.

Figure 28:
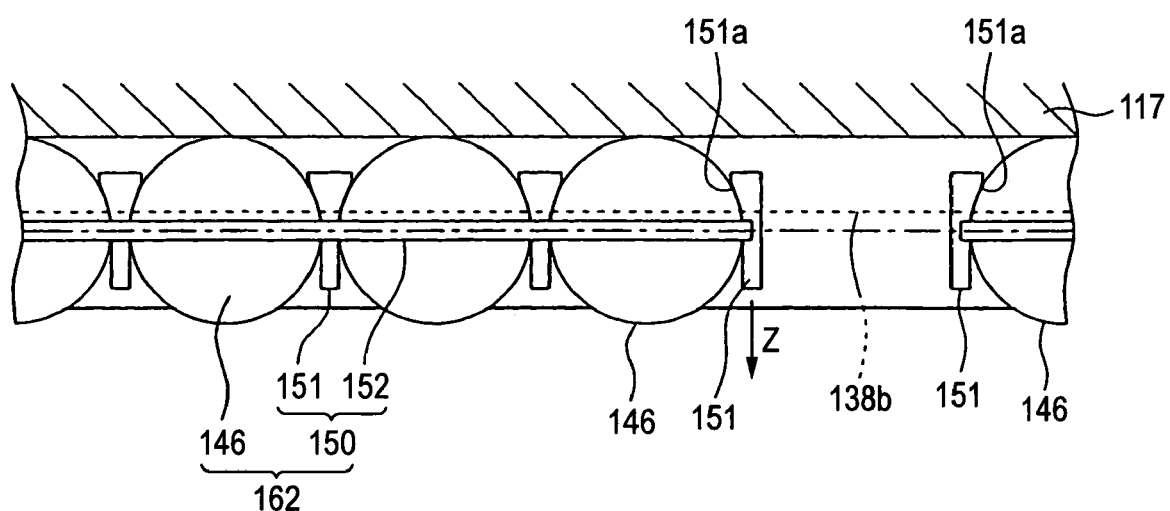
FIG. 28 is a view for explaining the operation of the linear guide according to the sixth embodiment.
Figure 28:
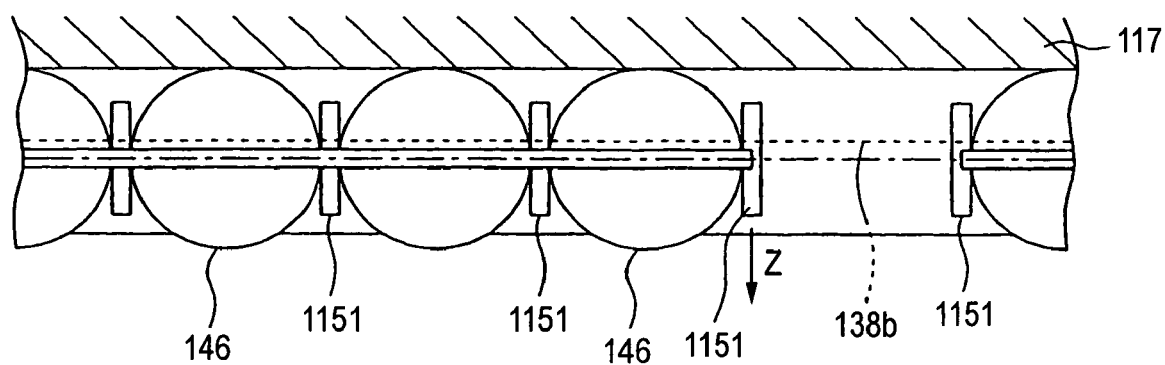

In accordance with the linear guide apparatus 110, the rolling element accommodating belt 150 is formed in the terminating shape so that the spacers 151 located at the ends of the terminating shape have also the slopes 151*a*, respectively, like the other spacers 151. Therefore, as seen from FIG. 28(*a*), the respective slopes 151*a* of the spacers 151 located at both ends abut on the balls 146. Thus, the spacers 151 located at both ends are engaged in the endless circulation path 128 so that they are not movable toward the outer diameter side of the endless circulation path 128 (the direction of a downward arrow Z). On the other hand, as seen from an comparative example of FIG. 28(*b*), in the configuration of the rolling element accommodating belt provided with only the spacers 151 each having not the slope abutting on the ball 146, the spacers 151 at the ends will move toward the outer diameter side of the endless circulation path 128 (the direction of a downward arrow Z in FIG. 28(*b*)). In this way, in accordance with this embodiment, even when the slider 116 is pulled out from the guide rail 112, the spacers 151 at both ends prevent the string of rolling elements 162 from dropping out from the slider 116 so that the tip of the rolling element accommodating belt 150 will not fly out from the opening of the endless circulation path 128. Accordingly, the linear guide apparatus 110 can be handled more easily.

Figure 29:
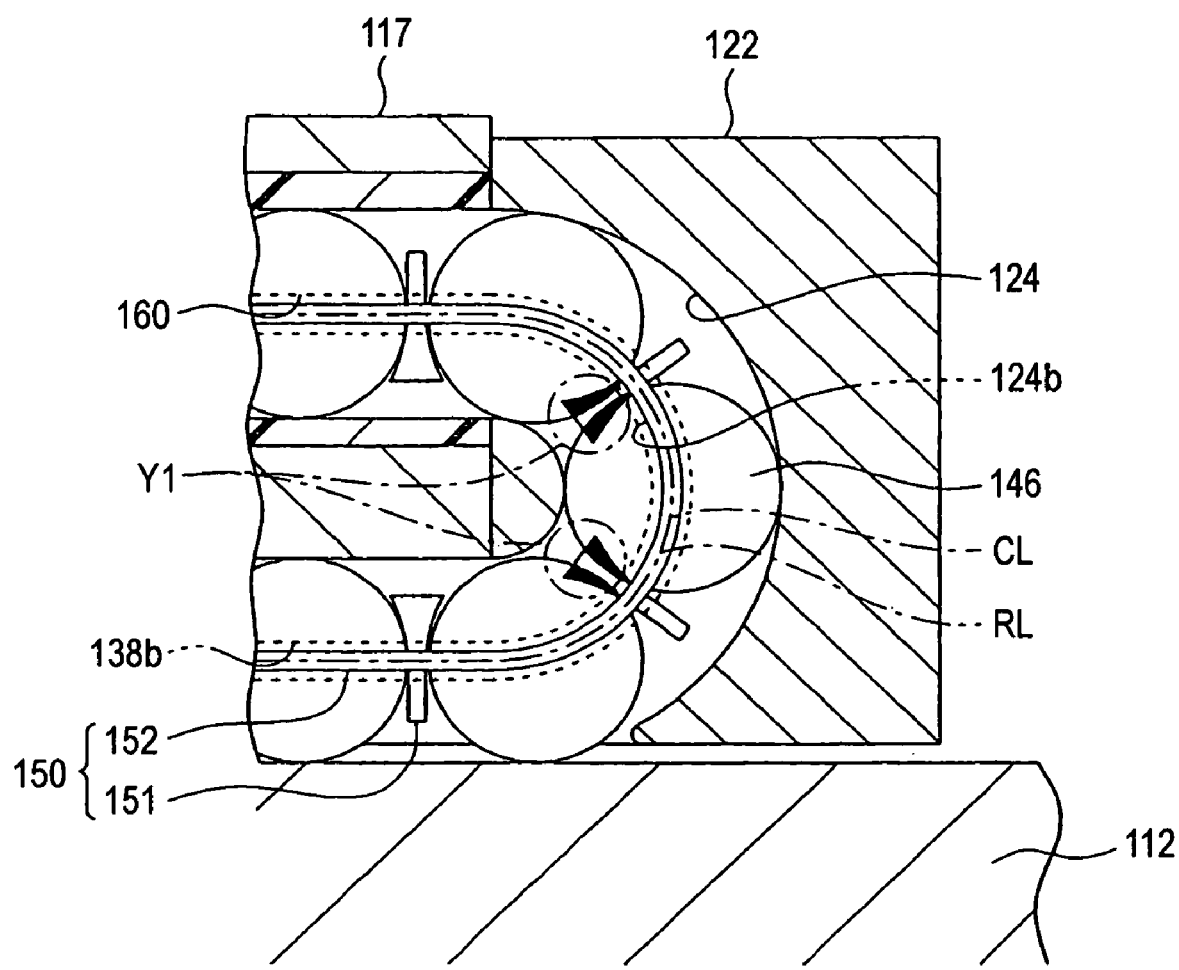
FIG. 29 is a view for explaining the operation of the linear guide according to the sixth embodiment.

In accordance with the linear guide apparatus 110, the guide groove 124*b* within the direction converting path 124 of the endless circulation path 128 is formed to circulate the coupling arm 152 near the inner diameter side of the endless circulation path 128 with respect to the center locus CL of the ball 146. Now, as seen from a comparative example of FIG. 29, if the coupling arm is circulated along the center locus CL of the ball 146, assuming that there is no deformation in the respective areas, interference between the spacer 151 and the ball 146 occurs in a black zone within a circle indicated by symbol Y1. On the other hand, as seen from FIG. 26, in accordance with the configuration of this embodiment, when the rolling element accommodating belt 150 curves in the direction converting path 124, the spacers 151 adjacent to each other within the direction converting path 124 can be opened largely. Thus, the distance between the adjacent spacers 151 is increased so that a clearance for displacing the ball 146 outwardly in the radial direction is generated. As a result, the interference between the spacers 151 and the ball 146 in the direction converting path 124 can be preferably restricted. Accordingly, the rolling element accommodating belt 150 of the linear guide apparatus 110 can be circulated more smoothly.

Further, in accordance with the linear guide apparatus 110, the spacers 151 provide relief portions 151*e* at the regions opposite to the balls 146 accommodated in the ball accommodating portions 155 at the ends on the inner peripheral side of the endless circulation path 128, respectively.

Figure 30:
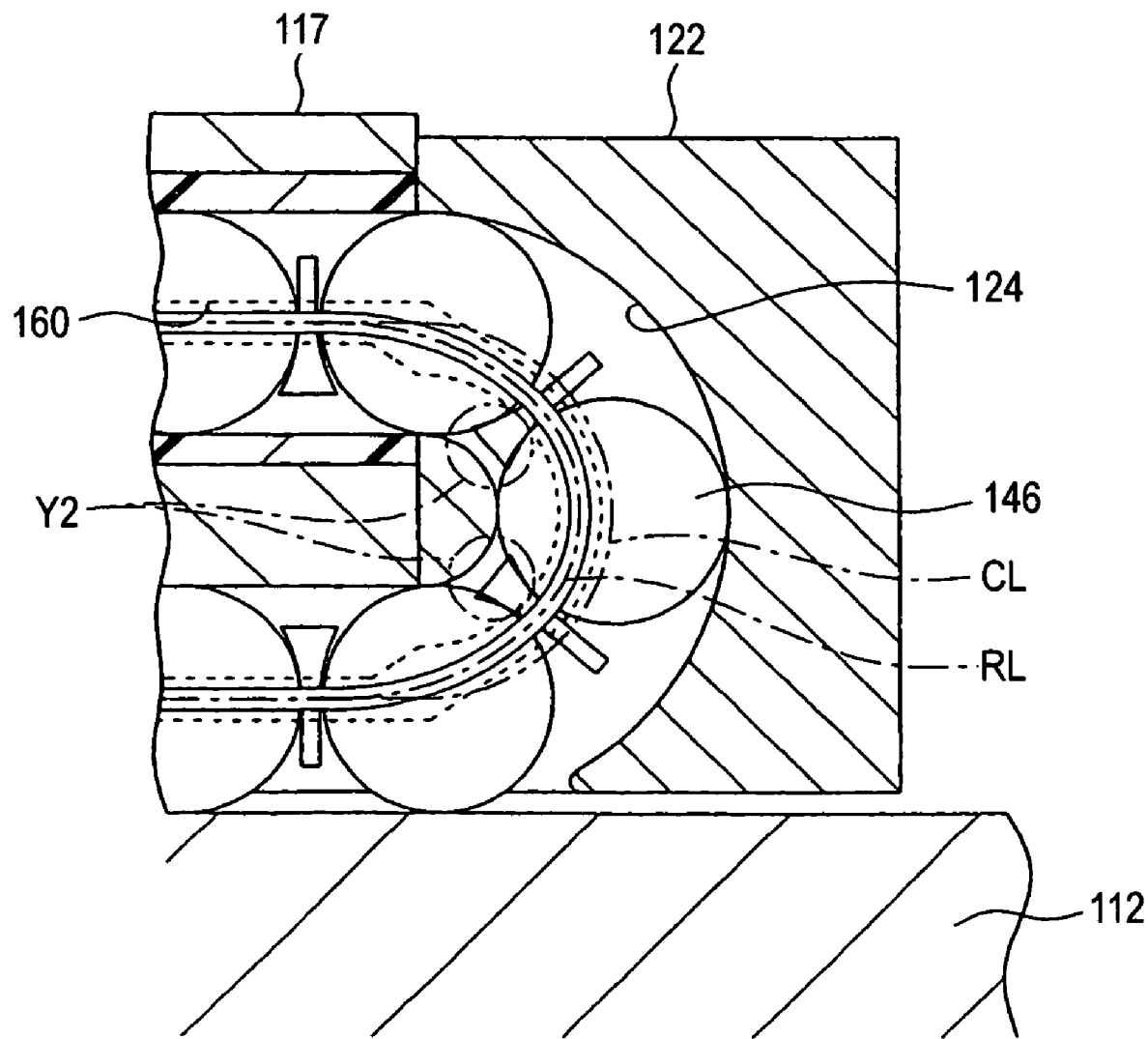
FIG. 30 is a view for explaining the operation of the linear guide according to the sixth embodiment.

Now, as seen from a comparative example of FIG. 30, where the rolling element accommodating belt 150 curves in the direction converting path 124 so that the distance between the adjacent spacers 151 is decreased on the inner peripheral side of the direction converting path 124, assuming that there is no deformation in the respective areas, slight interference between the spacers 151 and the ball 146 occurs in the area where the spacers 151 and the ball 146 are opposite on the inner peripheral side (black zone within a circle indicated by symbol Y2). On the other hand, as seen from FIG. 26, in accordance with the configuration of this embodiment, when the rolling element accommodating belt 150 curves in the direction converting path 124, even if the distance between the adjacent spacers 151 is decreased on the inner peripheral side of the direction converting path 124, the interference therebetween can be restricted by the relief portions 151*e* formed in the regions where the spacers 151 and the ball 146 are opposite on the inner peripheral side. Thus, the rolling element accommodating belt 150 of the linear guide apparatus 110 can be circulated more smoothly.

It should noted that the rolling element return path should not be limited to the structure described previously, but may be the structure as shown in FIG. 25(*b*). Specifically, in place of the circulating tube 130, a member 130A having a nearly crescent shape in its section is inserted in the through-hole 132 formed in the slider body 117, thereby providing the rolling element return path 120. Thus, each the guide grooves 160 is composed of the through-hole 132 and the nearly crescent-shaped member 130A. In this configuration, as compared with the configuration using the circulating tube described above, the diameter of the through-hole can be easily reduced. Thus, the slider body can be made thick to this degree, the rigidity of the slider body can be enhanced. As a result, the liner guide with high rigidity can be provided.

Seventh Embodiment

Next, an explanation will be given of the linear guide apparatus according to a seventh embodiment of this invention. In this embodiment, the configuration is the same as the sixth embodiment except that the structure of the rolling element accommodating belt is partially different. Therefore, only the difference on the rolling element accommodating belt will be explained, and the other will be not be explained.

Figure 31:
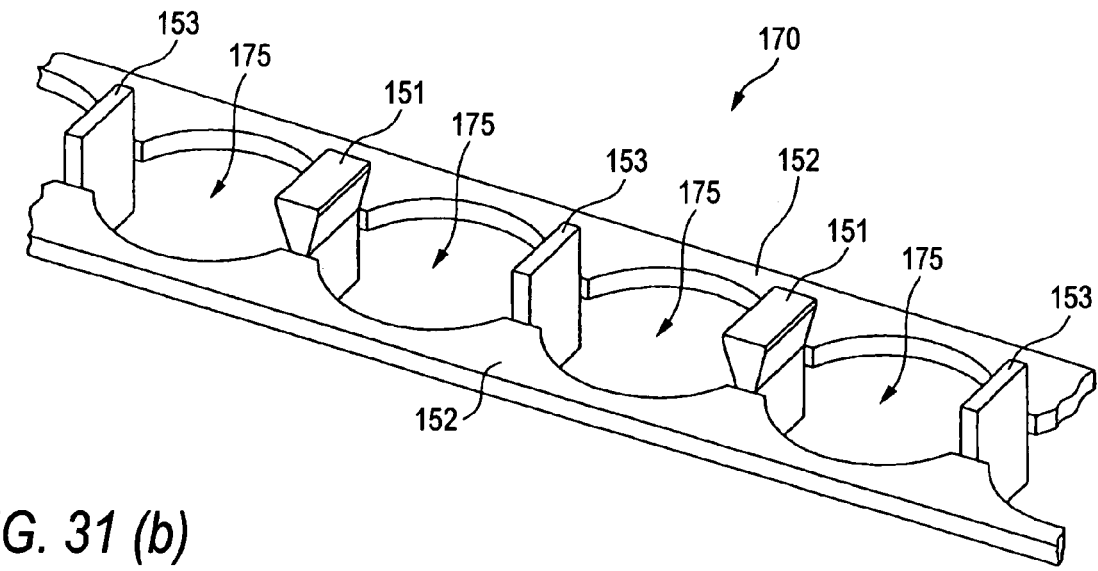
FIG. 31 is a view for explaining the seventh embodiment of a linear guide apparatus according to this invention.
Figure 31:
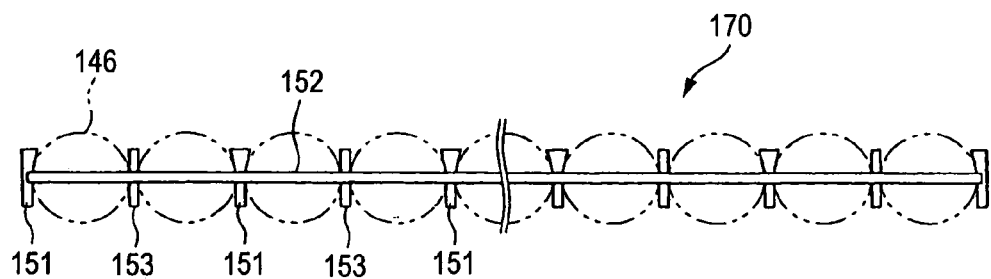
Figure 31:
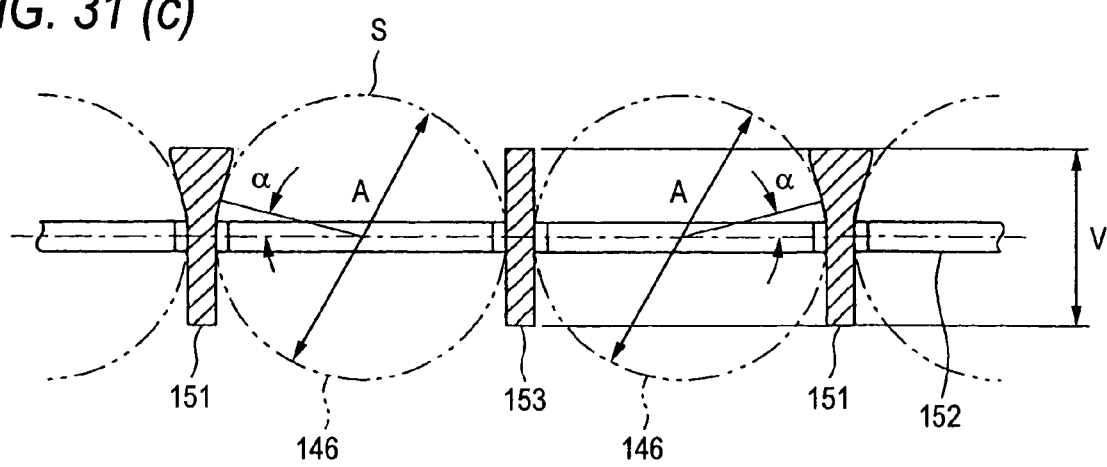

As seen from FIG. 31, a rolling element accommodating belt 170 is different from the rolling element accommodating belt 150 according to the sixth embodiment in that it has two kinds of spacers.

One of the two kinds of spacers is similar to the above spacer 151. The other spacer 153 is different from the spacer 151 in that its front shape is nearly rectangular. Namely, the front shape of the spacer 153 has a fixed width on both sides in the front/back direction of the coupling arms 152. The spacer 153 is thin and plate-like so that it extends, with the same width as that of the upper bottom of the trapezoidal shape described above, toward both sides in the front/back direction.

These spacers 151 and spacers 53 are alternately arranged in the arrangement direction of the balls 146. These spacers 151, 153 are coupled by the coupling arms 152 at their nearly central positions on both sides in the width direction. The rolling element accommodating portions 175 are defined by the spacers 151, 153 and the coupling arms 152. The rolling element accommodating belt 170, as in the sixth embodiment, is mounted in the linear guide with the upper side of the figure being located in the inner peripheral side of the endless circulation path 128.

Figure 32:
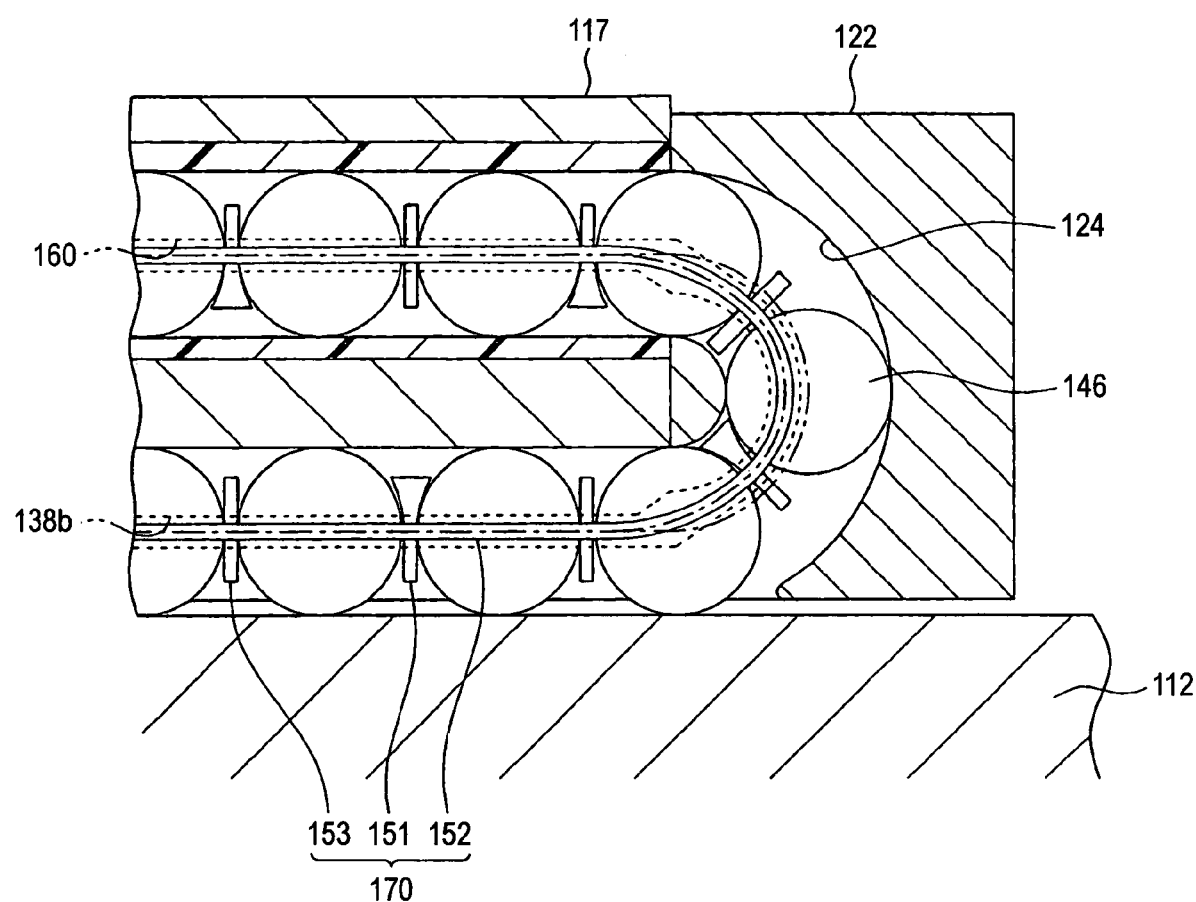
FIG. 32 is a view for explaining the operation of the linear guide according to the seventh embodiment.

In such a configuration also, as in the sixth embodiment, the balls 146 accommodated in the respective ball accommodating portions 175 are removable toward the outer diameter side of the endless circulation path 128 so that their drop-out is permitted. In addition, the increased width shape of each the spacers 151 is located on the inner peripheral side of the endless circulation path 128. Thus, since the slope 151a of each the spacers 151 abuts on the ball 146, the spacers 151 are not movable toward the outer diameter side of the endless circulation path 128. Further, as seen from FIG. 32, the spacer 153 is only slightly movable toward the outer diameter side of the endless circulation path 128 because the spacers 151 on both sides thereof abut on the balls 146. For this reason, as in the sixth embodiment, the movement of the coupling arms 152 toward the outer diameter side of the endless circulation path 128 is restricted, thereby preventing the coupling arms of the rolling element accommodating belt 170 from rubbing the side walls of the guide grooves. Further, since drop-out of the balls 146 accommodated in the rolling element accommodating portions 175 is also permitted on the one side in the front/back direction of the coupling arms 152 (lower side in FIG. 31(b)), the balls 146 can be easily mounted in the rolling element accommodating belt 170. Accordingly, there is provided the linear guide capable of presenting the same operational advantage as in the sixth embodiment.

Next, an explanation will be given of the linear guide apparatus according to the eighth embodiment of this invention. In this embodiment, the configuration is the same as the embodiments described above except that the structure of the rolling element accommodating belt is partially different. Therefore, only the difference on the rolling element accommodating belt will be explained, and the other will be not be explained.

Figure 33:
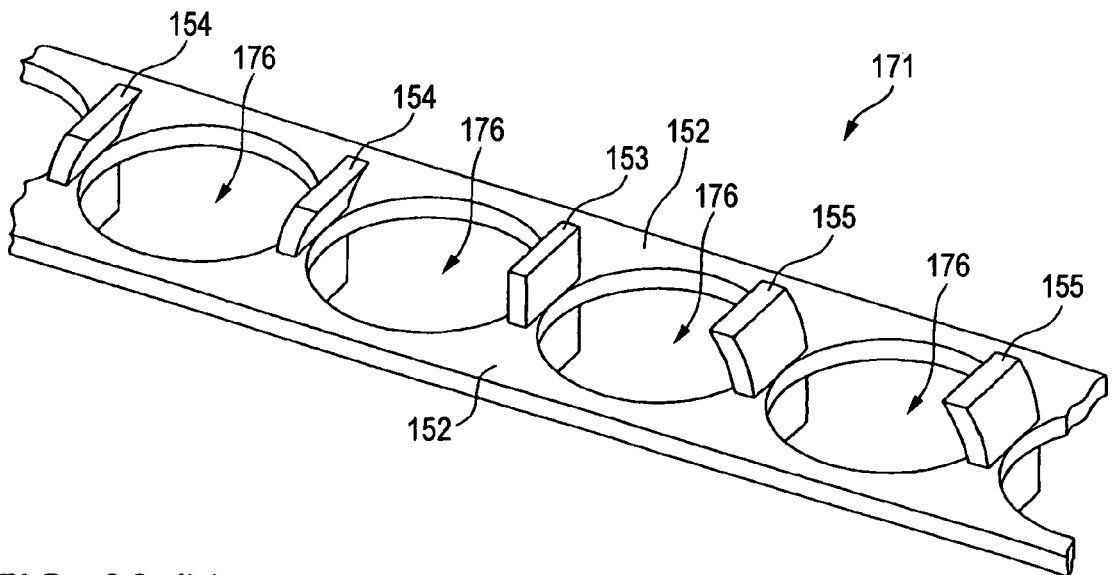
FIG. 33 is a view for explaining the eighth embodiment of a linear guide apparatus according to this invention.
Figure 33:
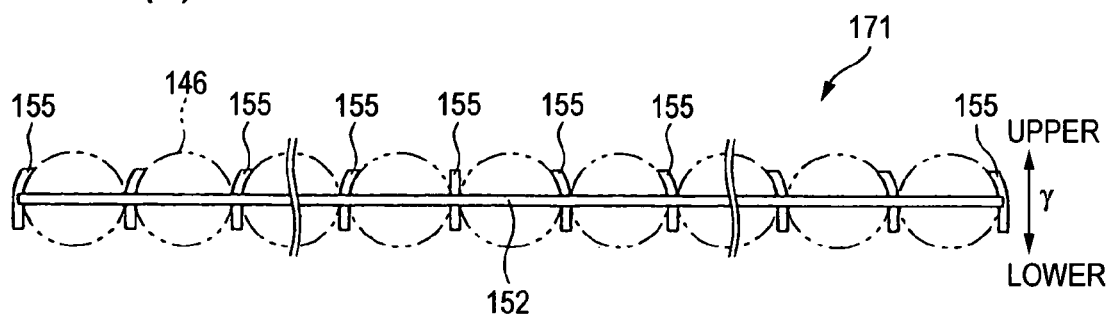
Figure 33:
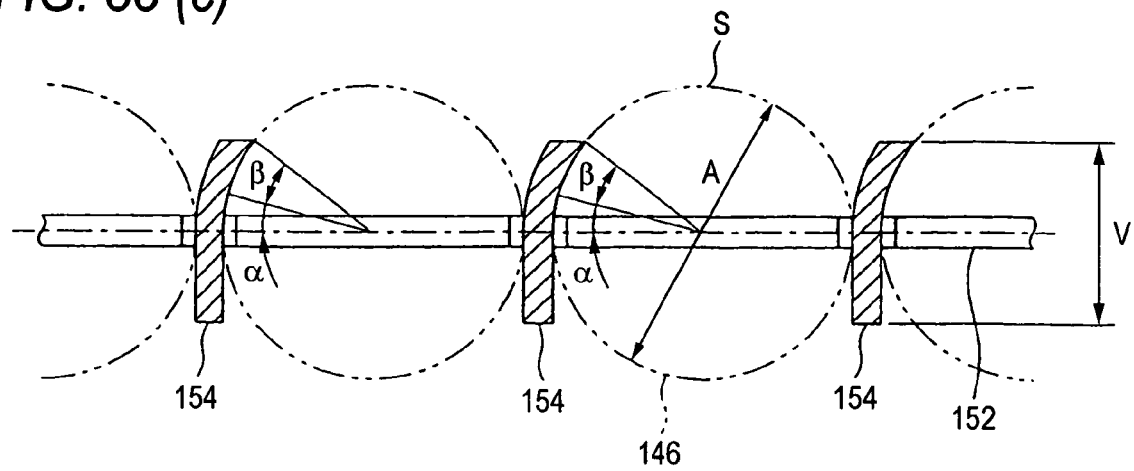

As seen from FIG. 33, a rolling element accommodating belt 171 is different from the rolling element accommodating belts according to the embodiments described above in that it has three kinds of spacers.

A spacer 153 of the three kinds of spacers is similar to the spacer in the above seventh embodiment in which its front shape is nearly rectangular. The spacer 153 is provided at only one point of the nearly central position of the spacers of the entire rolling element accommodating belt 171. The other two kinds of spacers 154, 155, as seen from FIG. 33(b), are arranged in plurality, respectively, on both sides of the spacer 153 at the one point. Both these spacers 153, 154, 155 are thin and plate-like. In this embodiment, the thickness of each spacer is 0.44 mm.

The spacers 154, 155 are formed so as to be curved, in their one side (upper side in FIG. 33(b)) in the front/back direction of the coupling arms 152, against the spacer 153 located at the above one point. This curved shape, as shown in an enlarged manner in FIG. 33(c), provides an abutting face which curves from the vicinity of the predetermined angle α in the sixth embodiment so as to follow the surface of the ball 146 and abuts on the ball 146 within a range of angle β. In FIG. 33(c), although only the shape of the spacer 154 is illustrated, that of the spacer 155 is also the same except its curving direction is opposite. The rolling element accommodating belt 171, as in the sixth embodiment, is mounted in the linear guide with the upper side of the figure being located in the inner peripheral side of the endless circulation path 128.

In such a configuration also, as in the embodiments described above, the balls 146 accommodated in the respective ball accommodating portions 176 are removable toward the outer diameter side of the endless circulation path 128 so that their drop-out is permitted. Further, the spacers 154, 155 are not movable toward the outer diameter side of the endless circulation path 128 because their abutting faces abut on the balls 146. The spacer 153 located at the one point is also movable only slightly toward the outer diameter side of the endless circulation path 128 because the spacers 154, 155 on both sides thereof abut on the balls 146. Accordingly, there is provided the linear guide capable of presenting the same operational advantage as in the sixth embodiment.

Figure 34:
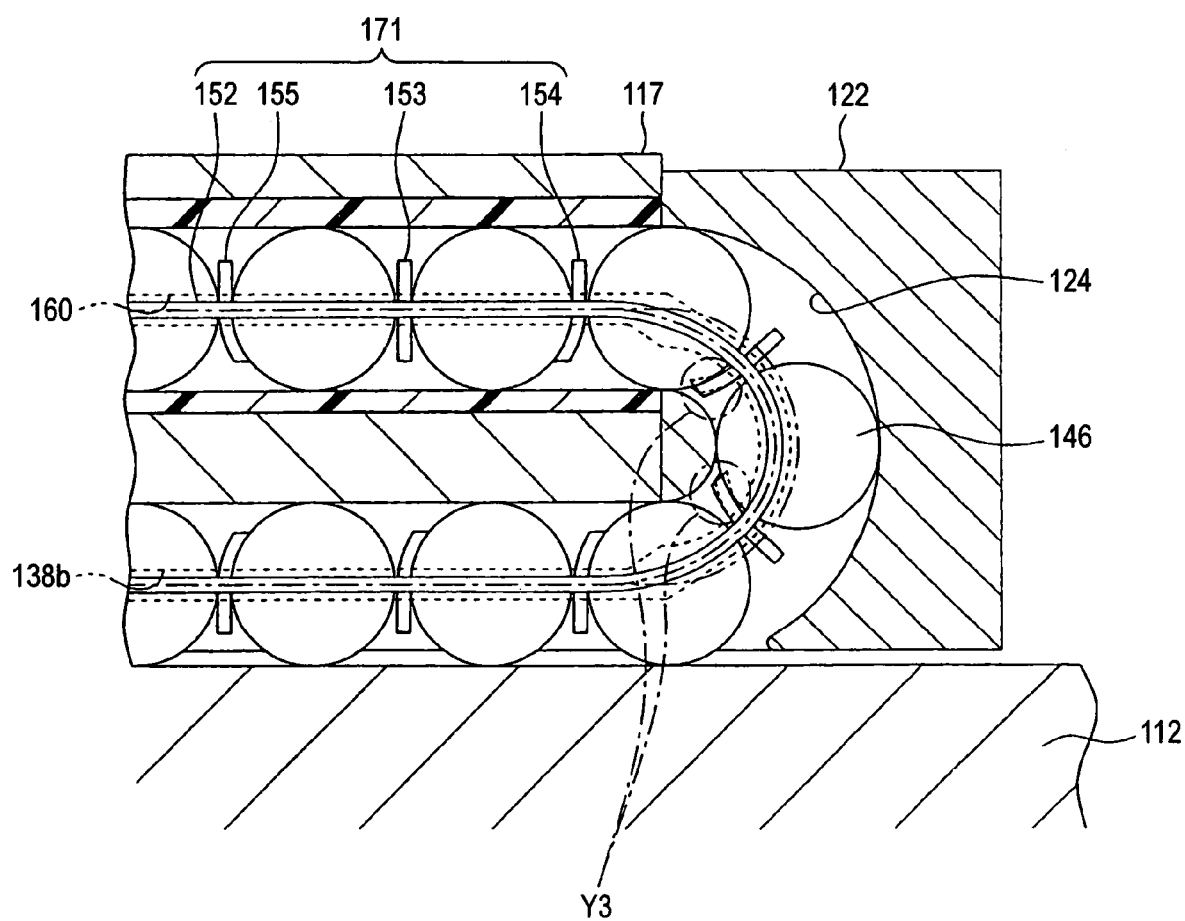
FIG. 34 is view for explaining the operation of the linear guide according to the eighth embodiment.

Further, in accordance with this eighth embodiment, the front shape of each the spacers 153, 154, 155 is thin and plate-like in its portion located nearer to the inner periphery than the coupling arms. For this reason, as seen from FIG. 34, when the distance between the adjacent spacers on the inner peripheral side of the direction converting path 124, even if the spacers and the ball 146 interferer with each other in the regions (regions indicated by symbol Y3) where the spacers and the ball 146 are opposite to each other on the inner peripheral side, the spacers are thin and plate-like so that they can be easily bent. As a result, the rolling element accommodating belt 171 of the linear guide can be smoothly circulated. In the region indicated by symbol Y3 in FIG. 34, the image that interference occurs when the spacers are not deformed is illustrated in two-dot chain lines.

Next, an explanation will be given of the linear guide apparatus according to the ninth embodiment of this invention. In this embodiment, the configuration is the same as the embodiments described above except that the structure of the rolling element accommodating belt is partially different. Therefore, only the difference on the rolling element accommodating belt will be explained, and the other will be not be explained.

Figure 35:
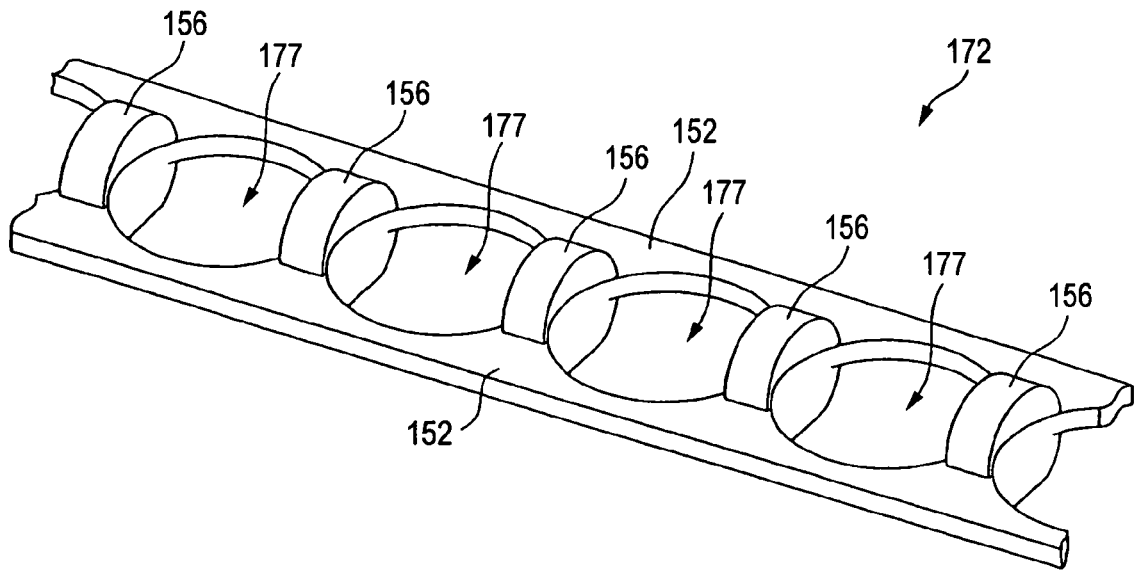
FIG. 35 is a view for explaining the ninth embodiment of a linear guide apparatus according to this invention.
Figure 35:
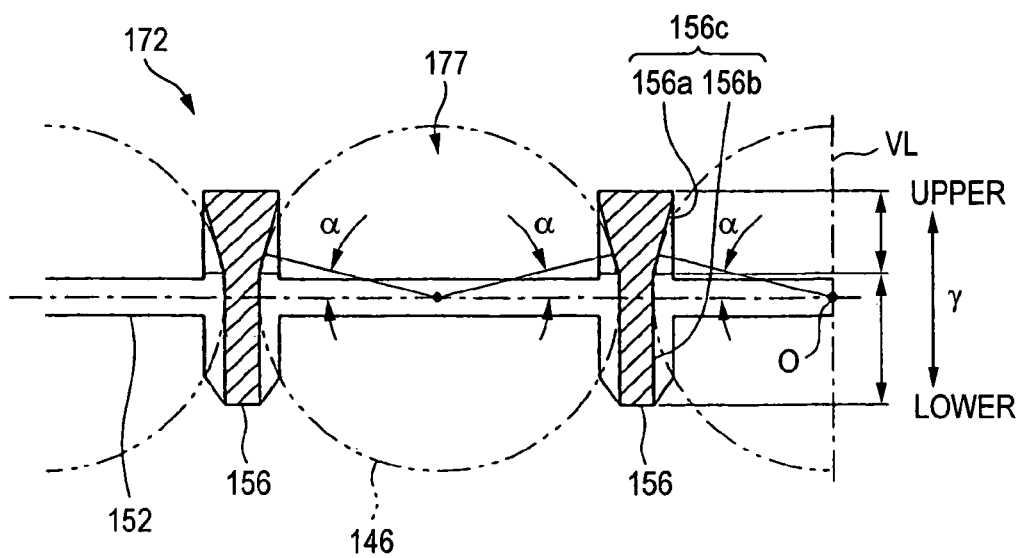

As seen from FIG. 35, a rolling element accommodating belt 172 has a circular shape when viewed from the arrangement direction of spacers 156. The rolling element accommodating belt 172 is different from the rolling element accommodating belt 150 in that the rolling element contact face 156*c* of each the spacers 156 is a combination of curves.

In an illustrated example, the face corresponding to the abutting face described previously (151*a* in FIG. 23(*c*)) is formed by a conical face 56*a* abutting on the ball 146 at the point of angle α with respect to the axis of a vertical straight line VL passing the center O of the ball 146 to be accommodated. The face corresponding to the side described previously (151*b* in FIG. 23(*c*)) is formed by a cylindrical face 156*b* having a diameter slightly larger than that of the ball 146 to be accommodated with respect to the axis of a vertical straight line VL. The rolling element accommodating belt 172, as in the sixth embodiment, is mounted in the liner guide, with the upper side in the figure being located on the inner peripheral side of the endless circulation path 128.

In such a configuration also, as in the embodiments described above, the balls 146 accommodated in the respective ball accommodating portions 177 are removable toward the outer diameter side of the endless circulation path 128 so that their drop-out is permitted. This facilitates mounting of the balls 146 into the rolling element accommodating belt 177. Further, the spacers 156, since their curved abutting faces abut on the balls 146, are not movable toward the outer diameter side of the endless circulation path 128. Therefore, the coupling arms 152 of the rolling element accommodating belt 177 will not rub the side walls of the guide grooves.

Further, in accordance with the ninth embodiment, the movement of the spacers 156 of the rolling element accommodating belt 172 in the lateral direction (width direction of the rolling element accommodating belt 172 or the vertical direction to paper face in FIG. 35(*b*)) is also restricted by the balls 146. For this reason, the swing of the rolling element accommodating belt 172 owing to the circulation of itself can be further reduced, thereby giving smoother movement thereof.

As understood from the description hitherto made, in accordance with the embodiments described above, there is provided a rolling element accommodating belt and linear guide which can facilitate the operation of mounting the balls 146 in the rolling element accommodating belt and prevent the coupling arms from rubbing the side walls of the guide grooves.

The linear motion guide device according to this invention should not be limited to the embodiments described above, but may be modified in various manners as long as it does not depart from the spirit of the invention.

Figure 36:
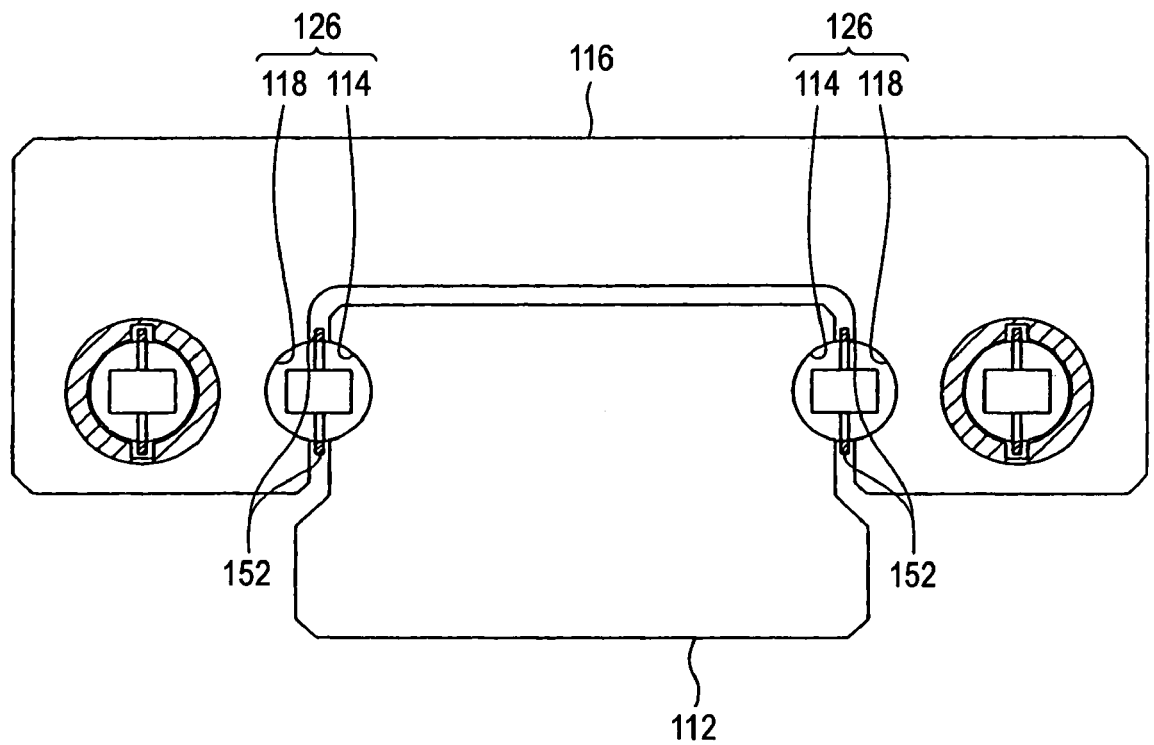
FIG. 36 is a view for explaining a modification of the liner motion guiding device according to this invention.

For example, in the embodiments described above, in the lower rolling element string guide member 140, the side wall 138*c* was provided on only the one side in the thickness direction of the coupling arm 152 so that the guide groove 138*b* is opened toward the guide rail 112. However, without being limited to such a configuration, as shown in FIG. 36, the guide groove in the rolling element track path 126 may not be provided on both sides of the coupling arm 152. In such a configuration also, in accordance with the rolling element accommodating belt according to the embodiments described above, the spacers do not move toward the outer diameter side of the endless circulation path 128 so that the fly-out of the rolling element accommodating belt can be prevented. In addition, since the space for forming the guide groove can be reduced, the groove depth of the rolling element guiding face of the guide rail can be increased.

Figure 37:
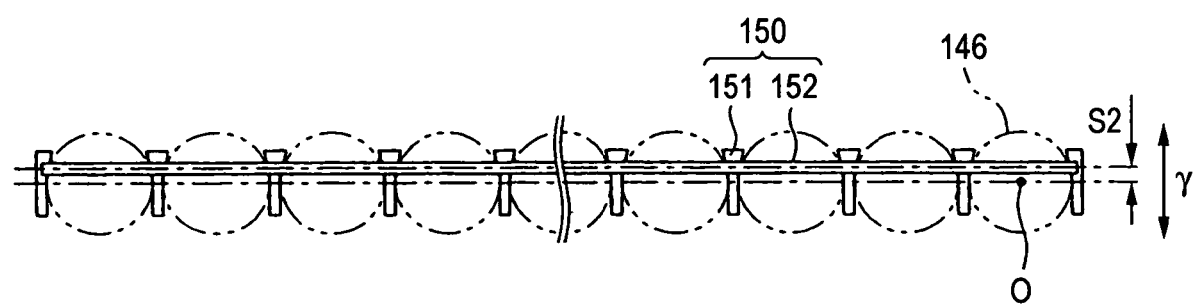
FIG. 37 is a view for explaining another modification of the liner motion guiding device according to this invention.
Figure 38:
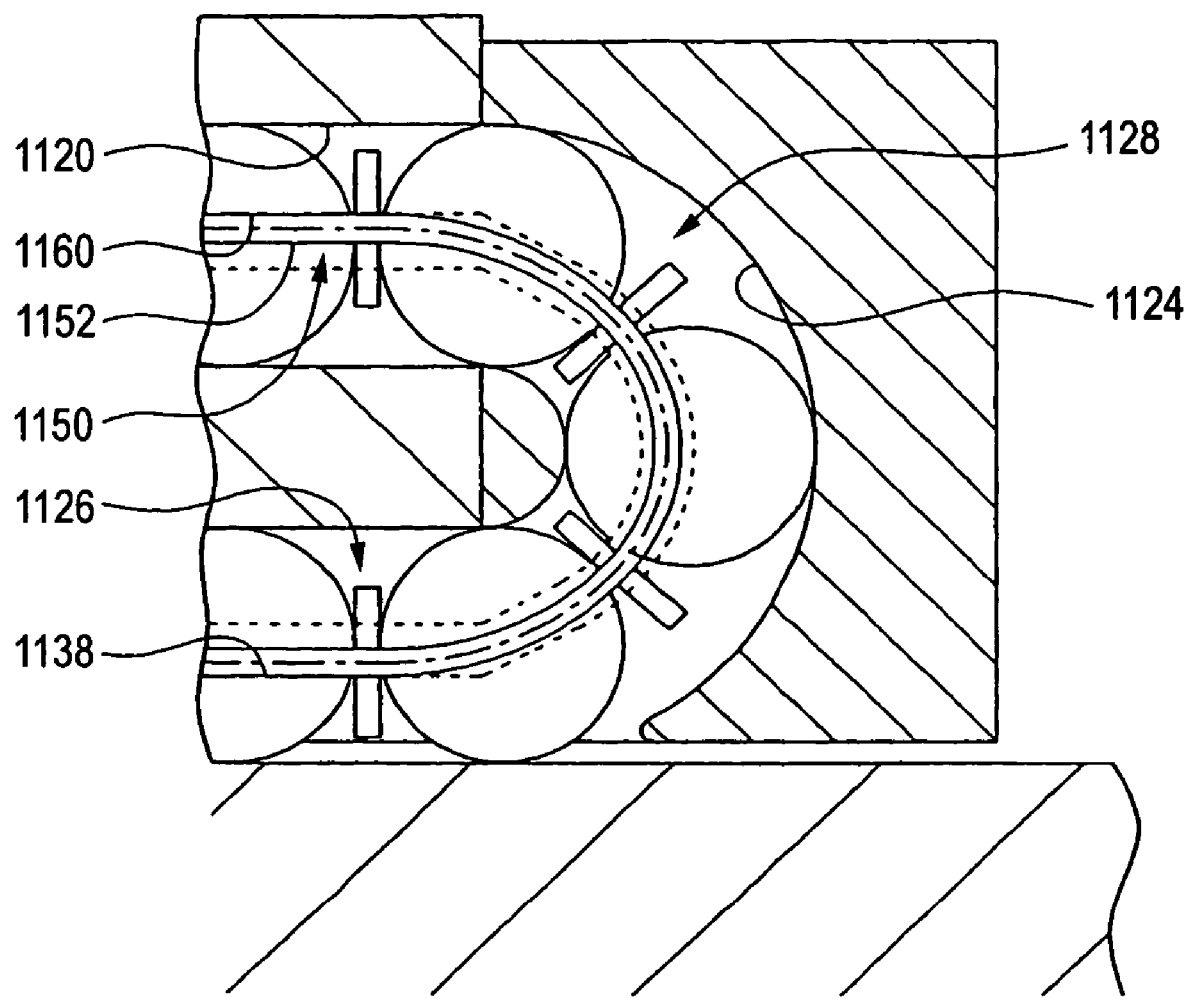
FIG. 38 is a view for explaining an example of the rolling element accommodating belt according to a prior art.

Further, in the embodiments described above, the locus RL drawn by the center in the width direction of the coupling arm 152 nearly agrees with the center locus CL of the balls 146. However, without being limited to such a configuration, as seen from FIG. 37, the coupling position of the coupling arm 152 may be located at a position displaced by an offset quantity S2 toward the inner diameter side of the endless circulation path 128. Correspondingly, the guide groove may be formed near the inner periphery in the linear portion of the endless circulation path 128 also. However, in this case, as seen from FIG. 27(*c*), since the coupling arms 152 are coupled near the inner diameter side of the endless circulation path from the center O of the ball 146 by the offset quantity S2, the groove depth W2 of the load rolling element guiding face 118 is shallower by the degree corresponding to the offset quantity S2 than the groove depth W1 in the embodiments described above. For this reason, in order to keep large the contact length between the balls and the rolling element guiding face and increase the load capacity of the linear guide, the configuration in the embodiments described above is preferred.

Further, the above various embodiments was explained with reference to the linear guide apparatus 110 having the balls 146 as rolling elements. However, this invention should not be limited to such a liner guide but may be also applied to a roller guide having rollers as the rolling elements.

Tenth Embodiment

Now referring to the drawings, an explanation will be given of a tenth embodiment and its modifications of a rolling element accommodating belt for a linear guide apparatus and the linear guide apparatus according to the invention.

Figure 39:
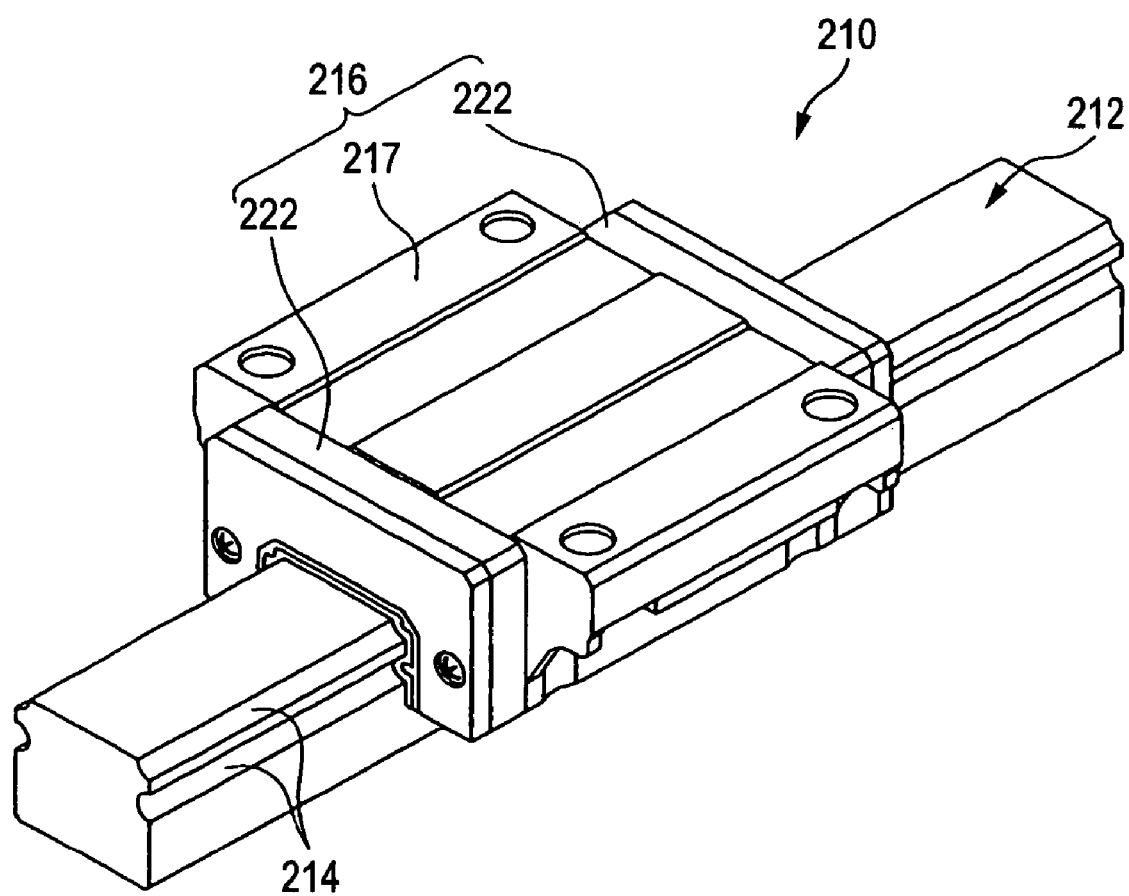
FIG. 39 is a perspective view of a linear guide according to an embodiment of a linear guide apparatus provided with a rolling element accommodating belt therefor according to this invention.
Figure 40:
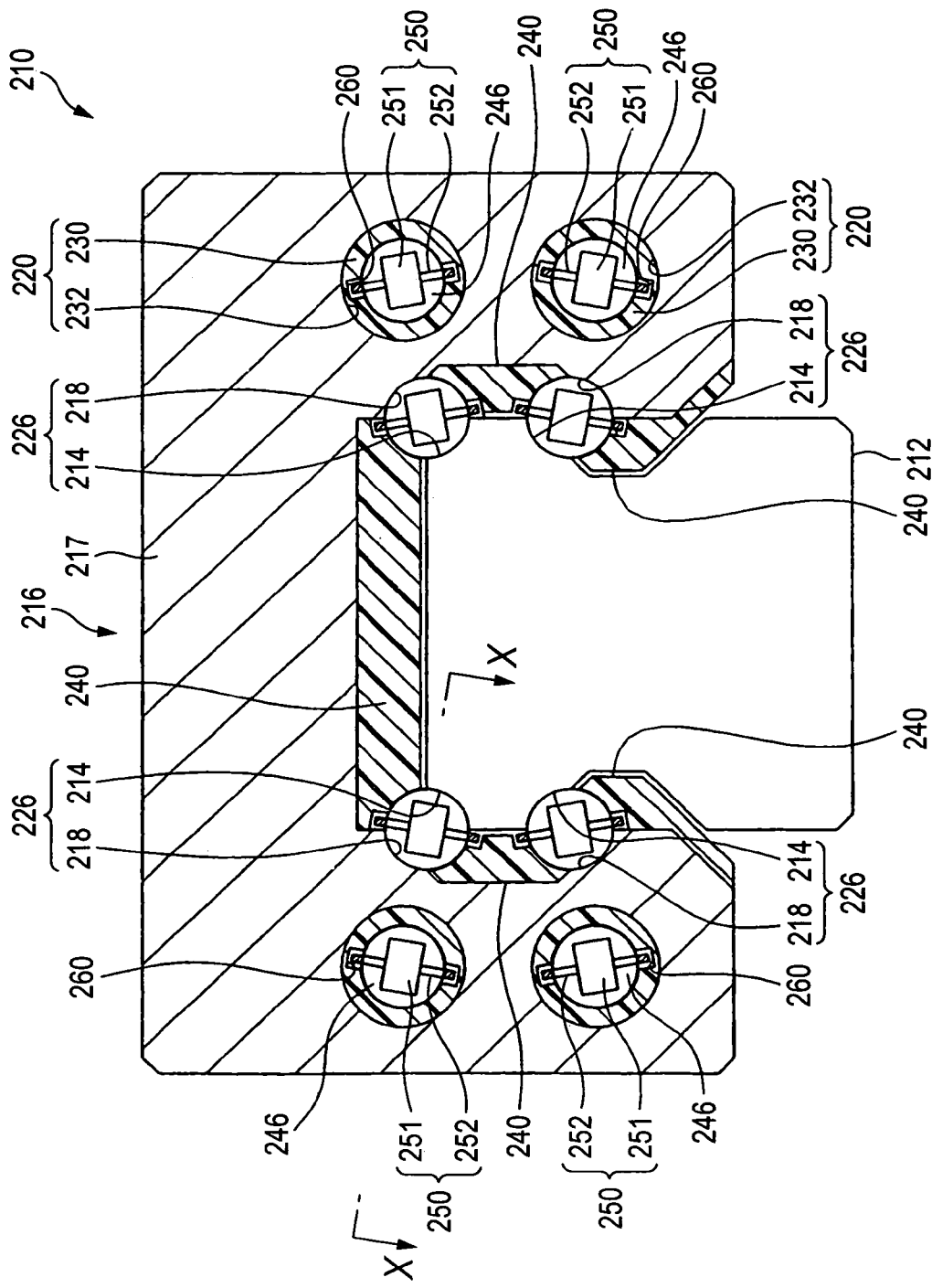
FIG. 40 is a view for explaining the cross section of a slider of the linear guide in FIG. 39.
Figure 41:
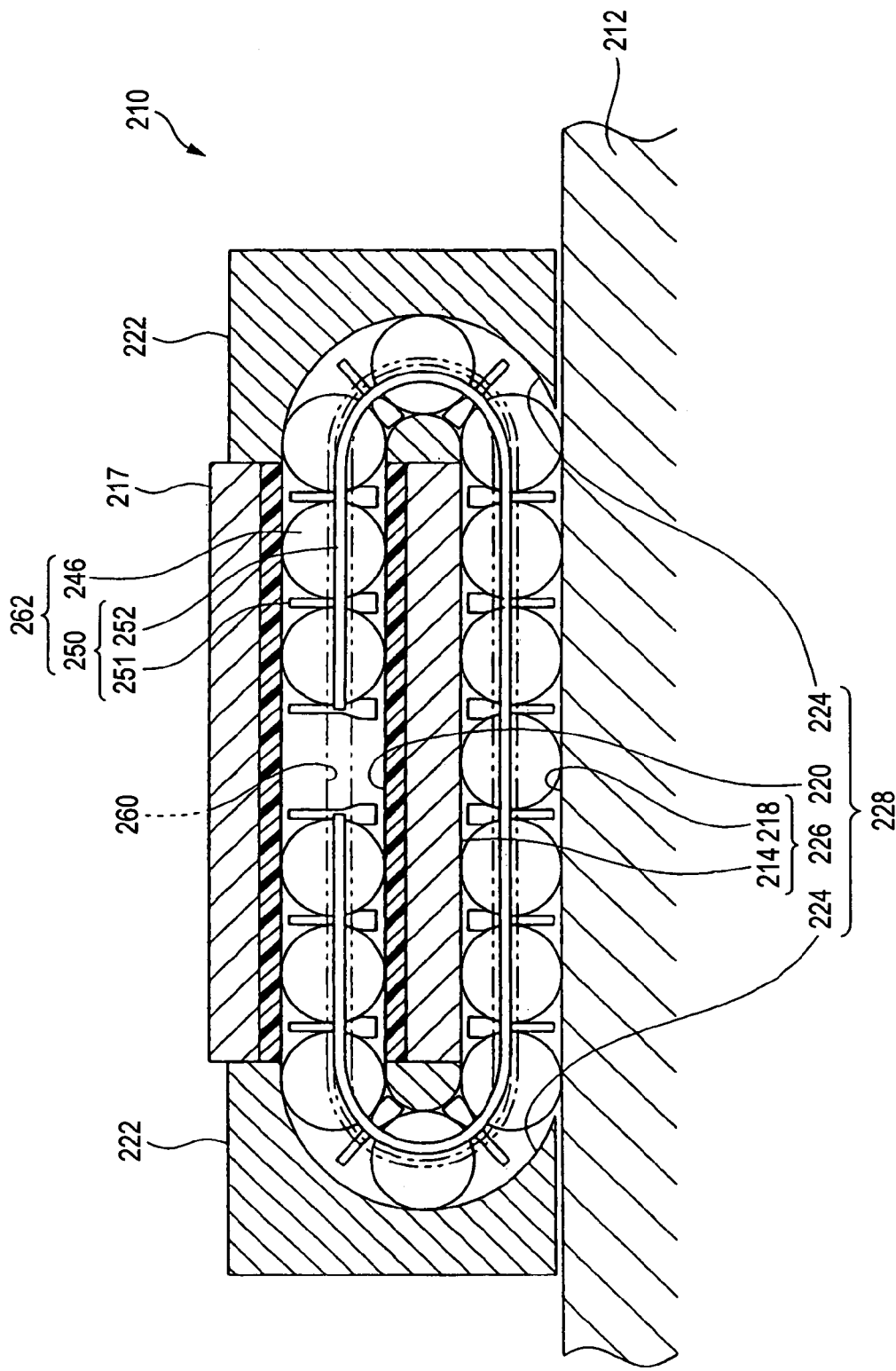
FIG. 41 is a sectional view of the linear guide taken in line X-X in FIG. 40.

FIG. 39 is a perspective view of a linear guide according to an embodiment of a linear guide apparatus provided with a rolling element accommodating belt for use therein according to this invention. FIG. 40 is a view for explaining the cross section of a slider of the linear guide in FIG. 39. FIG. 41 is a sectional view taken in line X-X in the linear guide in FIG. 40.

As seen from FIGS. 39 and 40, a linear guide apparatus 210 includes a guide rail 212 having rolling element guiding faces 214 and a slider 216 which straddles the guide rail 212 so that the slider is movable relatively to the guide rail 212.

The guide rail 212 is formed in a square sectional shape, and has four strips of rolling element guiding faces 214, two for each of both sides which are formed linearly in the longitudinal direction.

The slider 216, as seen from FIG. 39, includes a slider body 217 and end caps 222 mounted at both ends in an axial direction of the slider body 217. The axially continuous shapes of the slider body 217 and end caps 222 are both nearly U-sectional.

The slider body 217, as seen from FIG. 40, has total four load rolling element guiding faces 218 nearly semicircular in section opposite to the respective rolling element guiding faces 214 of the guide rail 212, which are formed inside both nearly U-shaped sleeves of the slider body 217. As seen from FIG. 41, the end caps 222 have a pair of direction converting paths 224 which communicate to both ends of the load rolling element guiding face 218. Further, as seen from FIGS. 40 and 41, the slider body 217 has rolling element return paths 220 each of which is formed inside the sleeve to be in parallel to the load rolling element guiding face 218 and made as a through-hole circular in section, the rolling element return path 220 communicating to the pair of direction converting paths 224.

As seen from FIG. 41, the space sandwiched between the rolling element guiding face 214 of the guide rail 212 and the opposite load rolling element guiding face 218 of the slider body 217 constitutes a rolling element track path 226. Total four endless circulation paths 228 are formed so that each of them is circularly continuous by the pair of direction converting paths 224, rolling element return path 220 and rolling element track path 226.

Further, as seen from FIG. 41, a plurality of balls 246 serving as the rolling elements are loaded within each endless circulation path 228. The plurality of balls 246 within the endless circulation path 228 constitute a string of rolling elements (rolling element string) 262 as well as the rolling element accommodating belt 250. Incidentally, as seen from FIG. 40, coupling arms 252 hanging over in the width direction within the endless circulation path 228 are guided on both sides in the width direction by guide grooves 260 formed in the endless circulation path 228 of the slider 216.

Next, the rolling element accommodating belt 250 will be explained in detail.

Figure 42:
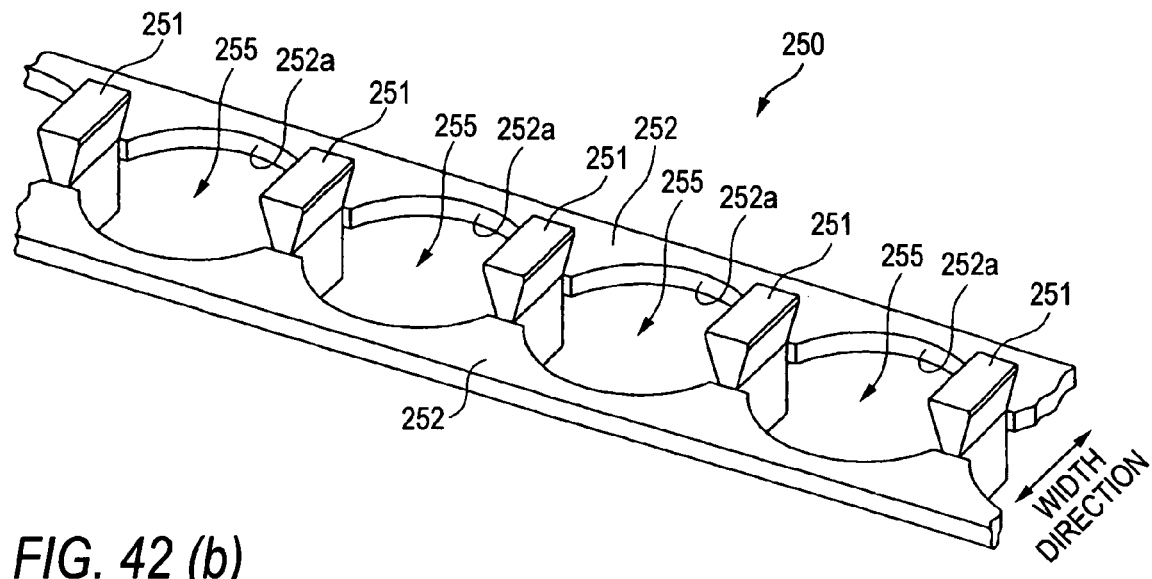
FIG. 42(*b*) is a front view of FIG. 42(*a*)
Figure 42:
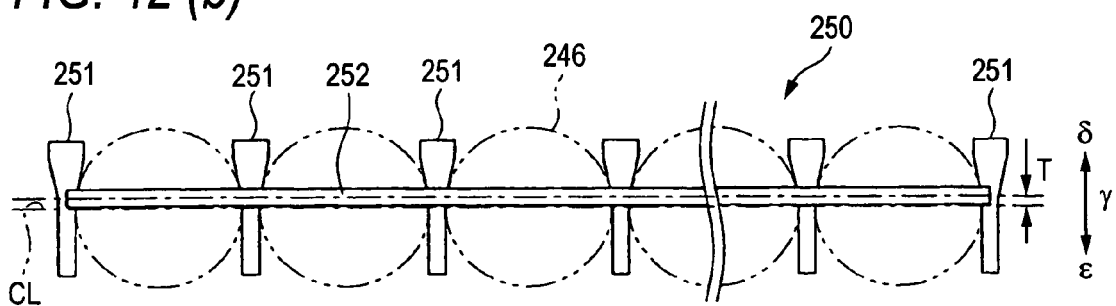
Figure 42:
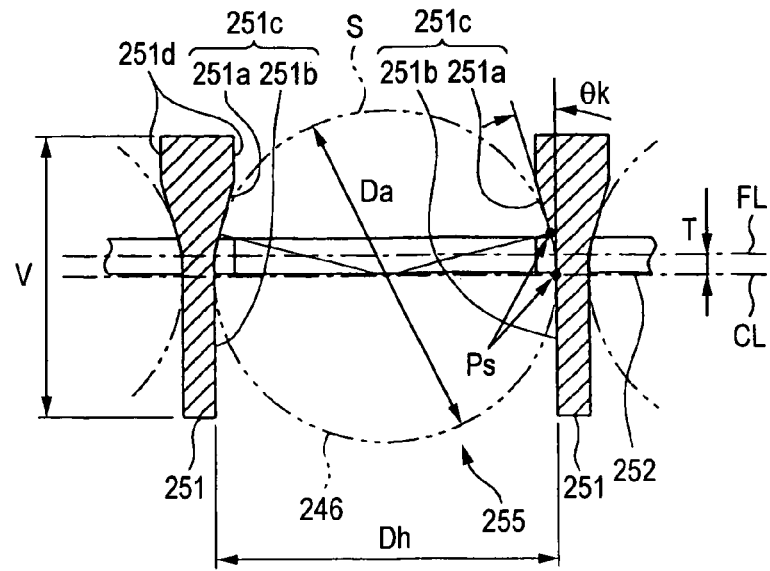

FIG. 42 is views for explaining the rolling element accommodating belt; FIG. 42(*a*) is a partially enlarged perspective view of the rolling element accommodating belt in its developed state, FIG. 42(*b*) is a front view of the rolling element accommodating belt of FIG. 42(*a*), and FIG. 42(*c*) is a partially enlarged sectional view of a ball accommodating portion in FIG. 42(*b*).

The rolling element accommodating belt 250 is formed in a terminating shape and as seen from FIGS. 41 and 42(*a*), has spacers 251 each intervening between the adjacent balls 246 within the endless circulation path 228 and belt-like coupling arms 252 which couple the spacers 251 with one another on both sides in the width direction of the endless circulation path 228. These spacers 251 and coupling arms 252 are integrally formed of a flexible resin material.

The coupling arms 252, as seen from FIG. 42, have ball accommodating hole 252*a* each opening in an annular shape in their front/back direction (thickness direction). The inner diameter Dh of the ball accommodating hole 252*a* is slightly larger than the diameter Da of the ball 246 to be accommodated (see FIG. 42(*c*)). The portions defined by the spacers 251 and the coupling arms 252 on both sides of the ball accommodating holes 252*a* serves a plurality of rolling element accommodating portions 255. The balls 246 are individually accommodate at predetermined intervals in the rolling element accommodating portions 255. Thus, the rolling element accommodating belt 250 is constructed so that the balls 246 are aligned in the alignment direction in the endless circulation path 228 as a string of rolling elements 262 and held in a rollable state.

Now, as seen from FIG. 40, the shape of each of the spacers 251 when viewed in the arrangement direction of the balls 246 is a rectangle. The short sides of the rectangle are provided in nearly parallel to the width direction of the belt-like coupling arms 252. The respective spacers 251 are coupled by the coupling arms 252 on both sides in the width direction of the longer sides of the rectangles. As seen from FIG. 42(*c*), the respective spacers 251 are coupled at the position of a center line FL in the thickness direction of the coupling arm 252, deflected by an offset quantity T toward the inner diameter side of the endless circulation path 228 with respect to the line CL connecting the centers of the balls 246 in the arrangement direction. The thickness of the coupling arm 252 coupling the adjacent spacers 251 is slightly smaller than the groove width of the guide groove 260 and made thin within a range capable of keeping a necessary and sufficient strength. Thus, the coupling arm 252 of the rolling element accommodating belt 250 can be slidably engaged in the guide groove 260.

Further, the front shape of each spacer 251 is uniform in the width direction of the rolling element accommodating belt. As shown in an enlarged manner in FIG. 42(*c*), the width of the spacer 251 increases toward the end on the one side (upper side of the figure) in the front/back direction of the coupling arm 252 and is fixed on the other side (lower side in the figure) thereof.

More specifically, on the upper side in the figure, the spacer 251 has a nearly trapezoidal shape with left and right faces formed so as to extend linearly toward the ends. Thus, with its portion coupled by the coupling arms 252 being an upper bottom and its lower bottom opposite thereto being an end, the width gradually increases toward the end. On the other hand, on the lower side in the figure, the spacer 251 has a thin and plate-like nearly rectangular shape increasing toward the lower side in the width equal to that of the upper bottom of the nearly trapezoidal shape. In this front shape, the height V of the spacer 251 is lower than the diameter Da of the ball 246.

The spacer 251 has a pair of rolling element contact faces 251*c* which are abutting faces abutting on the spherical face S serving as the rolling face of the ball 246. Namely, the rolling element contact face 251*c* is composed of two flat face segments inclusive of a side segment 251*b* which is a nearly rectangular shape segment of the spacer 251 and a slope segment 251*a* which is a slope segment of the nearly trapezoidal shape of the spacer 251.

The side segments 251*b* are formed, at both ends of each the rolling element accommodating portions 255, so as to be oriented toward the arrangement direction of the balls 246 successive in the endless circulation path 228. The opposite distance Dh between the side segments 251*b* of the adjacent spacers 251 is equal to the inner diameter (diameter) Dh of the ball accommodating hole 252*a*. Thus, the side segments 251*b* are constructed to permit the movement of the ball 246 accommodated between the pair of opposite rolling element contact faces 251*c* in each rolling element accommodating portion 255, toward the outer diameter side of the endless circulation path 228.

The slope segments 251*a* are slopes abutting on the ball 246 at a position of a predetermined inclination angle θk with respect to the arrangement direction. Thus, the slope segments 251*a* are formed to restrict the movement of the ball 246 accommodated between the pair of opposite rolling element contact faces 251*c* in each rolling element accommodating portion 255, toward the inner diameter side of the endless circulation path 228 (the predetermined angle θk will be later described in detail).

At the end on the upper side in FIG. 42(*c*), each spacer is provided with chamferings 251*d* serving as relief segments formed at areas where the slope segment 251*a* of the rolling element contact face 251*c* is opposite to the ball 246, thereby providing gaps between itself and the balls 246.

Of the above pair of rolling element contact faces 251*c*, the one rolling element contact face 251*c* is oriented toward the one of the adjacent balls 246, whereas the other rolling element contact face 251*c* is oriented toward the other of the adjacent balls 246 so as to be opposite to the above rolling element contact face 251*c*. Between the pair of rolling element contact faces 251*c*, the ball 246 can be held while being rollably supported between the adjacent spacers 251. The rolling element accommodating belt 250 is formed in a terminating shape. Between the spacers 251 located at both ends of the terminating shape, as seen from FIG. 41, the ball 246 not accommodated in the ball accommodating hole 252*a* is inserted. Thus, as seen from FIG. 42(*b*), the outward oriented faces of the spacers 251 located at both ends also constitute the above rolling element contact faces 251*c*.

Now, the predetermined slope angle θk of the above slope segment 251*a* is set on the basis of the following considerations.

Figure 43:
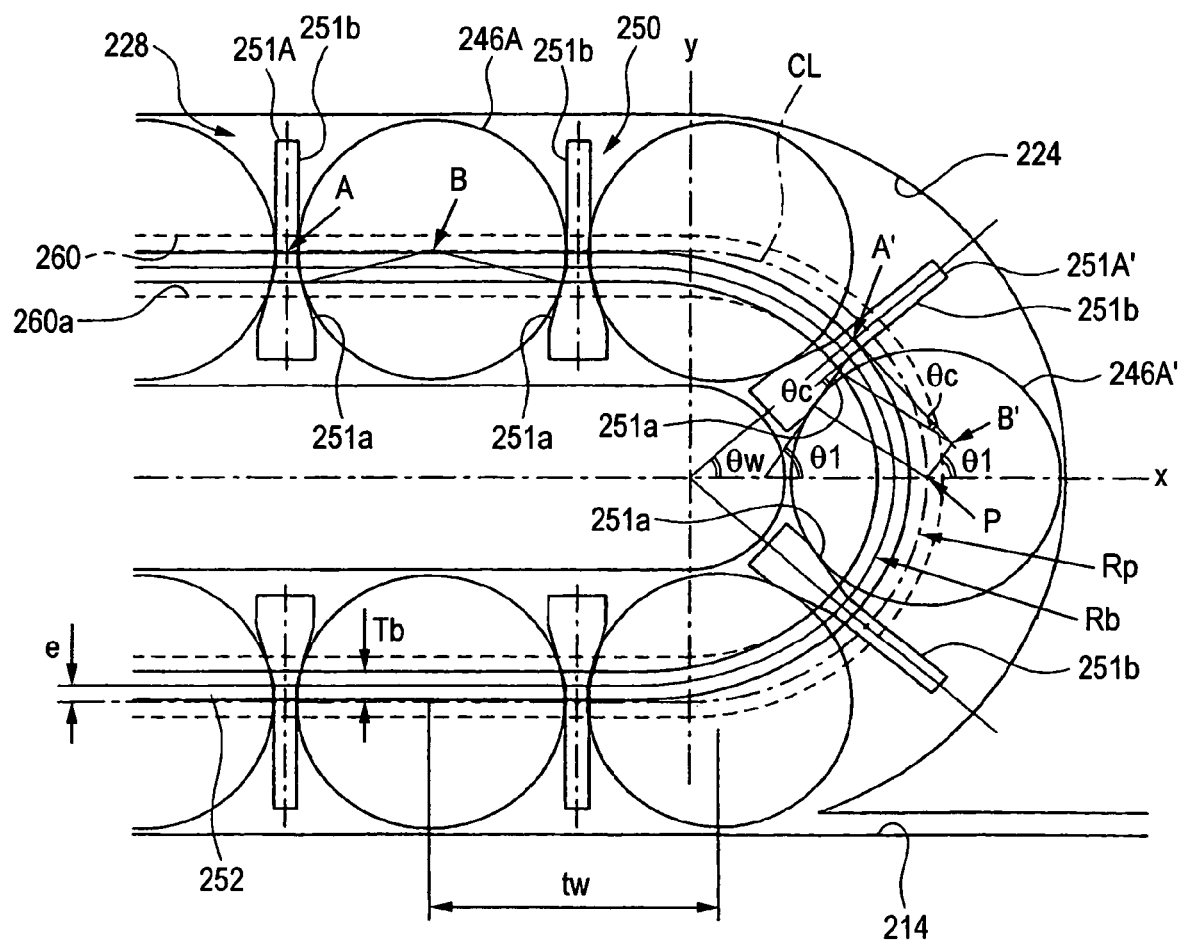
FIG. 43 is a view showing a direction converting path in a linear guide shown in FIG. 41.

In FIG. 43, the portion of a direction converting path 224 in a state where the rolling element accommodating belt 250 is mounted in the endless circulation path 228 is shown in an enlarged manner.

As seen from FIG. 43, "A" refers to an intersecting point (hereinafter referred to as "spacer center") of the center line CL connecting the respective centers of the balls 246A and the center in the width direction of the spacer 251 (the corresponding spacer is illustrated as a spacer 251A); and "B" refers to a point apart from the spacer center A by half of the pitch of the balls 246 on the center line CL. When the ball 246A is located at a ball 246A' at the center of the direction converting path 224, the above points A, B are shifted to points A', B'(the corresponding spacer is illustrated as a spacer 251A'), respectively.

In this case, in the direction converting path 224, the sizes of the spacer and the guide groove are determined so that the spacer 251A' and the ball 246A' do not interfere with each other.

Now, as seen from FIG. 43, an xy coordinate system is defined with an x-axis being located on the center of the entire width of the endless circulation path 228 and a y-axis being located on the interface between the linear portion of the endless circulation path 228 and the curved portion of the direction converting path 224. In this case, at the center of the direction converting path 224, assuming that the angle formed by the spacer centers A of the adjacent two spacers is $2\theta w$ (rad), the following Equation (2) holds.

$$2\theta w \cdot Rb = tw$$
$$\therefore \theta w = tw/2Rb \quad (2)$$

The above term tw represents the distance (mm) between the centers of the adjacent balls 246 when the rolling element accommodating belt 250 is developed, and is equal to the distance between the adjacent spacer centers A when the rolling element accommodating belt 250 is developed. The term Rb represents the curvature of radius (mm) of the center line of the rolling element accommodating belt 250 when the rolling element accommodating belt 250 curves along the wall 260a on the inner peripheral side of the guide groove 260 at the center of the direction converting path 224. Since the position of the rolling element accommodating belt 250 is controlled by the wall 260a on the inner peripheral side of the guide groove 260, the curvature of radius of the center line of the rolling element accommodating belt 250 will not become smaller than the above curvature of radius Rb.

Further, assuming that the thickness of the coupling arm of the rolling arm accommodating belt 250 is tb, and the radius of the wall 260a on the inner peripheral side of the guide groove 260 is Rn, Rb=Rn+tb/2.

Now, on the above xy coordinate system, when the ball 246A is located at the ball 246A' at the center of the direction converting path 224, the coordinates of points A', B' are expressed by the following Equation (3) and Equation (4).

The coordinates of point A': $((Rb+e)\cos \theta w, (Rb+e)\sin \theta w)$ (3)

The coordinates of point B': $((Rb+e)\cos \theta w+(tw/2)\sin \theta w, (Rb+e)\sin \theta w-(tw/2)\cos \theta w)$ (4)

The coordinates of the center P of the ball 246A' at this position is as follows. The coordinates of point P: (Rp, 0)

Figure 44:
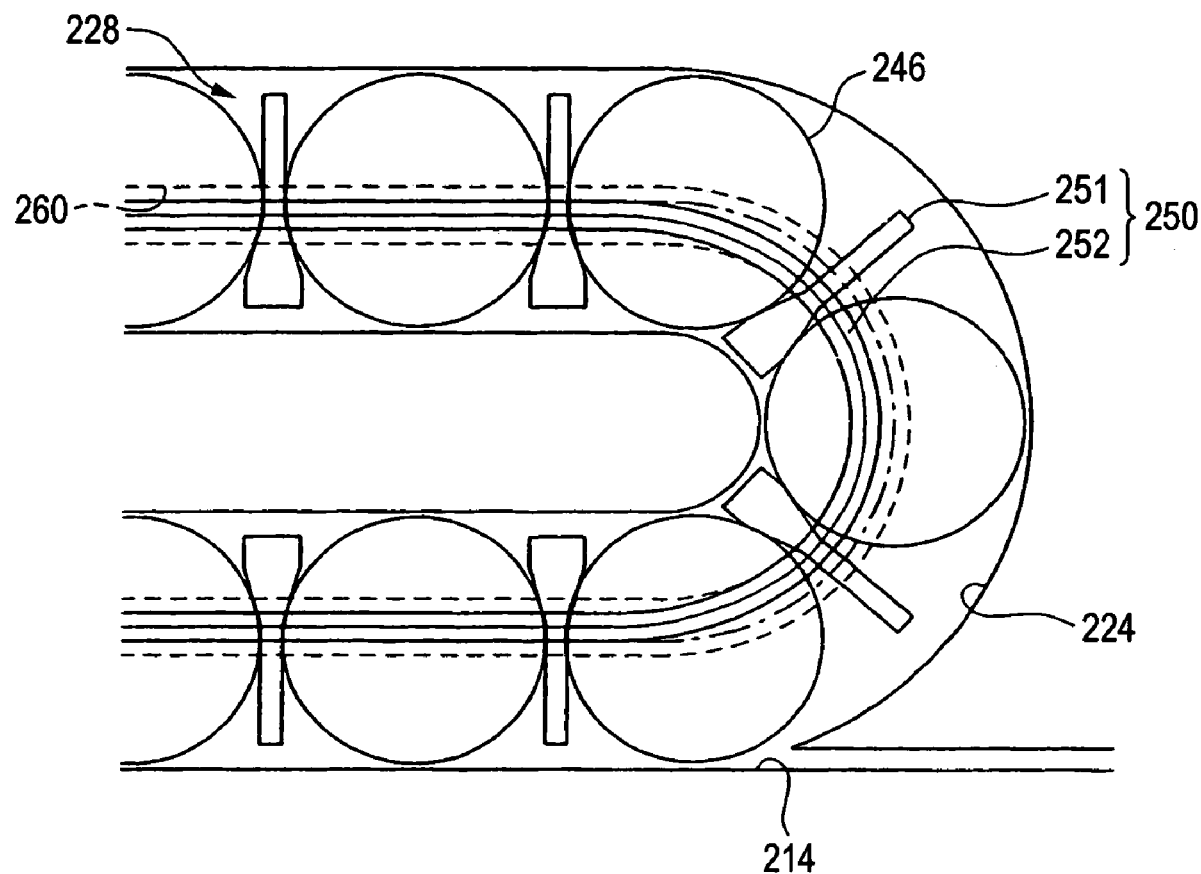
FIG. 44 is a view for explaining the operation of the linear guide according to this invention.

In the direction converting path 224 also, in order to assure the smooth rolling of the ball 246, it is preferable that the gap between the ball 246 and the spacer 251 is assured to the degree or more when the rolling element accommodating belt 250 does not curve. Now, in order to make the gap between the ball 246 and the spacer 251 equal to that when the rolling element accommodating belt 250 does not curve, as seen from FIG. 44, the angle formed by the x-axis and the slope segment 251a of the spacer 251 may be equal to the angle $\theta 1$ formed by the x-axis and line segment PB'. In this case, the angle $\theta c$ formed by the direction perpendicular to the developing direction of the rolling element accommodating belt 250 and the slope segment 251a of the spacer 251 can be expressed by the following Equation (5):

$$\theta c = \theta 1 - \theta w = \tan^{-1}(((Rb+e)\sin \theta w-(tw/2)\cos \theta w/((Rb+e)\cos \theta w+(tw/2)\sin \theta w-Rp)))-\theta w \quad (5)$$

Therefore, in order that the gap between the ball 246 and the spacer 251 is not smaller than that when the rolling element accommodating belt 250 does not curve, it can be seen that the angle $\theta k$ formed by the direction perpendicular to the developing direction of the rolling element accommodating belt 250 and the slope segment 251a of the spacer 251 may satisfy the following Equation (1):

$$\theta k \leq \theta c = \tan^{-1}(((Rb+e)\sin \theta w-(tw/2)\cos \theta w/((Rb+e)\cos \theta w+(tw/2)\sin \theta w-Rp)))-\theta w \quad (1)$$

For this reason, in this embodiment, the respective dimensions are set as follow. The diameter of the ball 246, Da=4.76 mm; the inner diameter of the ball accommodating hole 252a, Dh=4.8 mm; the gap between the ball 246 and the spacer 251 when the rolling element accommodating belt 250 is developed, S=0.02 mm; the distance between the adjacent balls 246, tw=5.2 mm; the inclination angle for the direction perpendicular to the arrangement direction within the endless circulation path 228, $\theta k=10°$; the curvature of radius of the central locus of the ball 246 at the center of the direction converting path 224, Rp=4.2 mm; the curvature of radius of the central line of the rolling element accommodating belt 250 when the rolling element accommodating belt 250 curves along the wall 260a on the inner peripheral side of the guide groove 260 at the center of the direction converting path 224, Rb=3.6 mm; and the distance from the center of the ball 246 to the center line of the rolling element accommodating belt 250, e=0.3 mm when the rolling element accommodating belt 250 is developed.

By substituting the above respective dimensions in Equation (5), $\theta c=13.3°$ can be acquired. In this embodiment, since the inclination angle $\theta k=10°$, Equation (1) is satisfied.

With the side segment 251b being oriented toward the outer diameter side of the endless circulation path 228 and the slope segment 251a being oriented toward the inner diameter side of the endless circulation path 228. Thus, the movement of the ball 246 arranged between the pair of rolling element contact faces 251c is permitted toward the outer diameter side of the endless circulation path 228 and restricted toward the inner diameter side of the endless circulation path 228.

Namely, the rolling element accommodating belt 250 is mounted in the endless circulation path 228 so that the side constituting the nearly trapezoidal shape of each the spacers 251 is oriented toward the inner diameter side of the endless circulation path 228 as shown in FIG. 41. In the rolling element accommodating belt 250 thus mounted into the endless circulation path 228, the rolling element accommodating portions 255 are mounted so that the other side (lower side in FIG. 42(c)) of each the spacers 251 defining the rolling element accommodating portions 255 is oriented toward the outer periphery of the circulating path 228.

Next, an explanation will be given of the operational advantage of the linear guide apparatus 210.

In accordance with the linear guide apparatus 210, since the respective spacers 251 intervene between the balls 246, the balls 246 are not brought into direct contact with each other. Thus, occurrence of noise or abrasion owing to the rubbing of the balls 246 against each other is prevented. Further, since the spacers 251 are coupled with one another by the coupling arms 252 so as to constitute the rolling element accommodating belt 250, the respective balls 246 can be moved by the rolling element accommodating belt 250 while keeping a predetermined distance therebetween and keeping the stable rolling of the string of rolling elements 262 within the endless circulation path 228.

Further, in accordance with the linear guide apparatus 210, in the rolling element accommodating belt 250, each the spacers 251 has the slope segment 251a which is a flat face so that its inclination angle for the direction perpendicular to the arrangement direction within the endless circulation path is fixed. Thus, the contact portion between the slope segment 251a and the ball 246 provides not a plane-contact but a point-contact. Particularly, in accordance with this linear guide apparatus 210, the mutual contact between the spacer 251 and the ball 246 is given at two points indicated by symbol Ps in FIG. 42(c). Since the side segment 251b is also a flat face, the contact at each the two points is the point-contact. Thus, the contact area can be reduced. Accordingly, even if lubricant exists between the spacers 251 and the balls 246, its shearing resistance is reduced so that the friction when the ball 246 rolls can be alleviated. Thus, it is possible to restrain the sliding resistance of the linear guide apparatus 210 from being increased and to improve the operability thereof.

Meanwhile, in the direction converting path 224, the rolling element accommodating belt 250 manufactured essentially in a linear shape is likely to restore its initial state to approach the outer periphery. When the rolling element accommodating belt 250 approaches the outer periphery, the coupling arm 252 forcibly rubs against the wall on the outer peripheral side of the guide groove 260 so that it may wear. However, in accordance with this embodiment, since the rolling element accommodating belt 250 is provided with the slope segments 251a, even if the rolling element belt 250 approaches the outer periphery in the direction converting path 224, the ball 246 is first brought into contact with the slope segment 251a. Thus, it is possible to prevent the coupling arm 252 of the rolling element accommodating belt 250 from rubbing against the wall on the outer peripheral side of the guide groove 260. It should be noted that since the rolling element accommodating belt 250 is likely to approach the outer periphery, the friction between the coupling arm 252 and the wall on the inner peripheral side of the guide groove 260 is small, there is little fear of abrasion.

Further, in accordance with the linear guide apparatus 210, the rolling element accommodating belt 250 is formed in the terminating shape and the spacers 251 located at the ends of the terminating shape also have the slope segments 251a similarly to the other spacers 251. Therefore, the slope segments 251a of the spacers 251 located at both ends abut on the ball 246 to restrict the movement of the ball 246 toward the inner diameter side of the endless circulation path 228. Thus, the spacers 251 located at both ends are engaged in the endless circulation path 228 so that they are not movable toward the outer diameter side of the endless circulation path 228. As a result, even when the slider 216 is pulled out from the guide rail 212, the tip of the rolling element accommodating belt 250 will not fly out from the opening of the endless circulation path 228. Accordingly, the linear guide apparatus 210 can be handled more easily.

Figure 46:
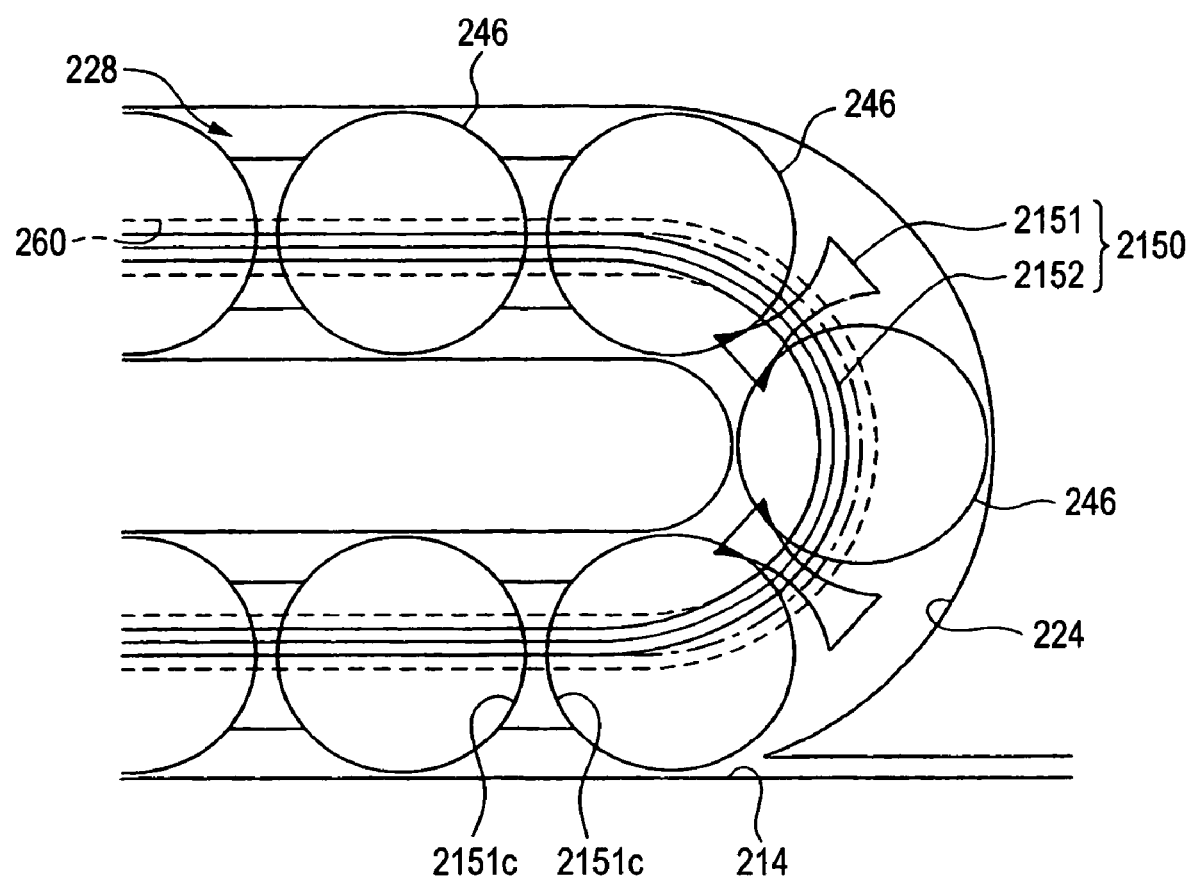
FIG. 46 is a view for explaining a rolling element accommodating belt in a conventional linear guide apparatus, which illustrates the direction converting path in a section along the arrangement direction of rolling elements.

Further, in the rolling element accommodating belt 250, the distance Dh between the side segments 251b of the adjacent spacers 251 is slightly larger than the diameter Da of the ball 246 so that the gaps between the ball 246 and the adjacent spacers 251 are assured. Further, in the areas where the slope segments 251a of the rolling element contact face 251c are opposite to the ball 246, the chamferings 251d serving as the relief segments are formed to provide the gaps between the spacer 251 and the balls 246. Therefore, the interference of the spacer 251 with the ball 246 is restricted. Namely, unlike the prior art illustrated in FIG. 46, the ball 246 and the spacer 251 do not interfere with each other. As a result, excessive force will not be applied to the coupling arms 252 of the rolling element accommodating belt 250 and the circulating resistance will not be increased.

Each of the rolling element accommodating portions 255 permits drop-out of the ball 246 on the side of the opposite side segments 251b. In addition, in the developed state of the rolling element accommodating belt 250, the side permitting the drop-out of the ball 246 exists on only one side. Thus, in order to mount the balls 246 in the rolling element accommodating portions 255, the balls 246 have only to be placed on the rolling element accommodating portions 255 from the side of the side segments 251b. As a result, the efficiency of accommodating the ball 246 between the spacers 251 can be improved so that a troublesome operation such as mounting the balls 246 in the rolling element accommodating portions 255 by pushing is not required. Accordingly, the operation of mounting the balls 246 in the rolling element accommodating belt 250 can be facilitated.

Further, in accordance with the linear guide apparatus 210, the slope segments 251a of the rolling element accommodating belt 250 have the predetermined inclination angle θk within the range defined by the above Equation (1). For this reason, the gap between the spacer 251 and the ball 246 in the direction converting path 224 can be assured to the degree equal to or more than the gap in the extended state of the rolling element accommodating belt 250. Thus, increase in the friction due to contact between the spacer 251 and the ball 246 is restricted so that the mutual interference between the spacer 251 and the ball 246 in the direction converting path 224 is alleviated, thereby permitting smooth circulation of the rolling element accommodating belt 250. If the predetermined inclination angle θk exceeds the range defined by Equation (1), when the distance between the adjacent spacers 251 becomes small in the direction converting path 224, the spacer 251 and the ball 246 are likely to interfere with each other.

As understood from the description hitherto made, in accordance with the linear guide apparatus 210 having the rolling element accommodating belt 250, increase in the friction due to contact between the spacers 251 and the balls 246 can be restrained.

The rolling element accommodating belt according to this invention and the linear guide apparatus having this belt should not be limited to the embodiments described above, but may be modified in various manners as long as they do not depart from the spirit of the invention.

For example, in the above embodiment, the liner motion guiding device according to this invention was explained with reference to the linear guide apparatus 210 using the balls 246 as the rolling elements. However, the linear guide apparatus according to this invention should not be limited to such a configuration but may be also applied to a liner guide using rollers as the rolling elements.

Further, for example, in the above embodiment, the spacers 251 were explained with reference to an example in which their rolling element contact faces 251c permit the movement of the ball 246 abutting thereon toward the outer diameter side of the endless circulation path 228. However, the spacers are provided to restrict the movement of the ball toward the outer periphery also of the endless circulation path 228. However, in order to facilitate mounting of the rolling elements in the rolling element accommodating belt, it is preferable that the rolling element contact faces of the spacer are formed to permit the movement of the rolling element abutting thereon toward the outer diameter side of the endless circulation path.

Further, in the above embodiment, the spacers 251 were explained with reference to an example in which their rolling element contact face 251c is composed of two flat face segments inclusive of the slope segment 51a and the side segment 251b. However, without being limited to such a configuration, the rolling element contact face may have a curved face. However, in order to form the contact portion between the rolling element contact face and the rolling element as not the plane-contact but e.g. the point-contact or line-contact so as to reduce the contact area, thereby restricting increase in the friction due to contact between the spacer and the rolling element, it is preferable that the rolling element contact face may have a face with a predetermined angle for the direction perpendicular to the arrangement direction in the endless circulation path.

Figure 45:
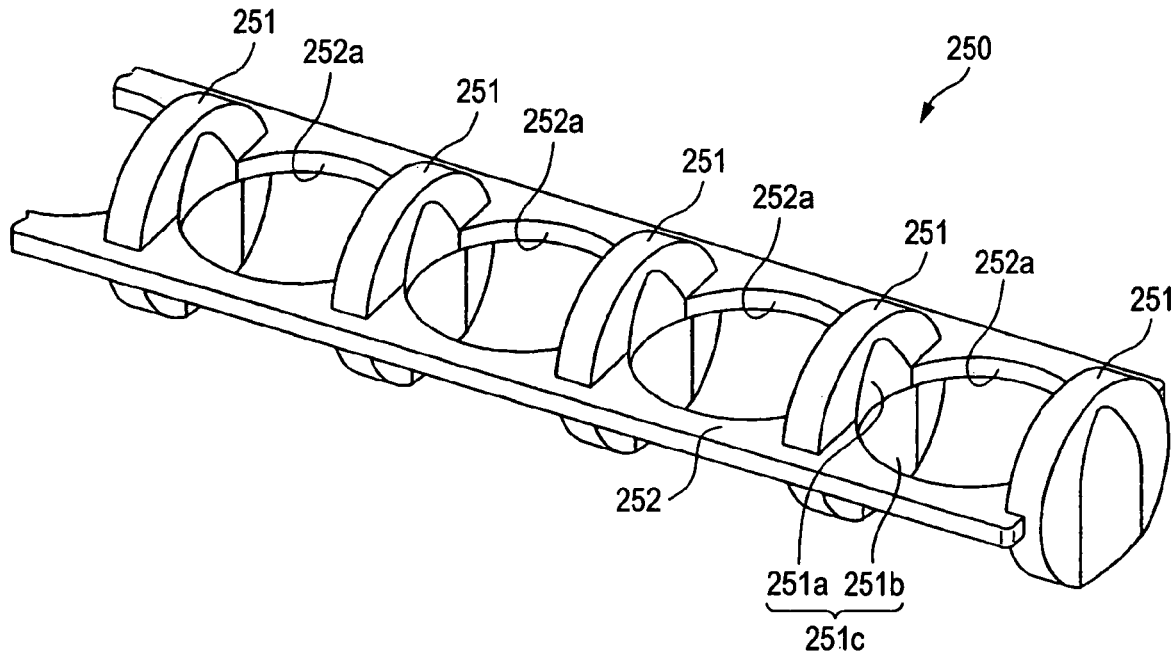
FIG. 45(*a*) is a perspective view of a modification of a rolling element accommodating belt for a linear guide apparatus according to this invention.
Figure 45:
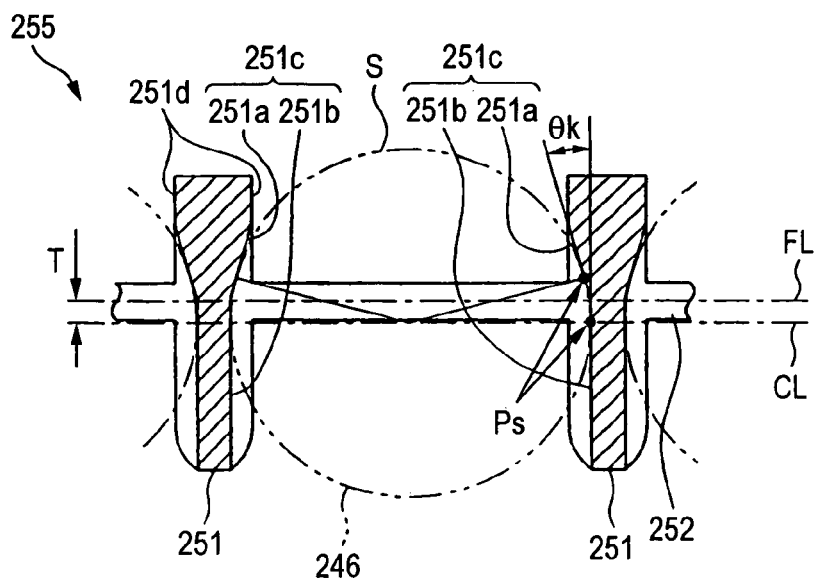

The concrete examples are illustrated in FIG. 45 as a modification of the above embodiment.

As seen from FIG. 45, in this modification, only the shape of the pair of rolling element contact faces 251c of each of the spacers 251 is different from that in the above embodiment. Specifically, the slope segment 251a is formed of a concave conical face and the side segment 251b is formed of a concave cylindrical face. Both the axial lines of the concave conical face and the concave cylindrical face agree to the direction perpendicular to the arrangement direction in the endless circulation path 228. Therefore, in this modification, the slope segment 251a of the concave conical face of the rolling element contact face 251c gives a constant angle for the direction perpendicular to the arrangement direction within the endless circulation path 228. Thus, the slope segment 251a of the concave conical face provides a contact portion with the rolling element which is not the plane-contact but the line-contact, thereby presenting the same operational advantage as in the slope segment in the above embodiment. Particularly, the slope segment 251a of the concave conical face forms the line contact with the rolling element so that the contact portion with the rolling element can be given also in the width direction of the rolling element accommodating belt. Thus, the movement of the rolling elements can be restricted in the width direction also. For this reason, where the rolling elements are the balls, such a configuration is preferred to restrict rattling of the rolling elements during circulation. Accordingly, if the configuration according to the modification is adopted, since the rattling of the rolling elements can be restricted while smoothly circulating the rolling element accommodating belt, the operability of the linear guide apparatus 210 can be improved.

As long as this invention is constructed so that increase in the friction due to contact between the spacer and the rolling element can be restricted, for example, the contact portion between the rolling element contact face and the rolling element may be formed to give the face contact. However, in this case, it is preferable that the spacers 251 are constructed so that their rolling element contact face 251c gives the face in contact, at least two points, with the ball 246 abutting thereon, and the movement of the ball 246 abutting thereon toward the inner diameter side of the endless circulation path 228 is restricted by slope segments which have an inclination satisfying the range defined by Equation (1). This is because in accordance with such a configuration, as previously described in detail, increase in the friction due to contact between the spacer and the rolling element particularly in the direction converting path can be restricted.

Eleventh Embodiment

Now referring to the drawings, an explanation will be given of an eleventh embodiment and its modifications of a rolling element accommodating belt and a linear guide apparatus according to the invention.

Figure 47:
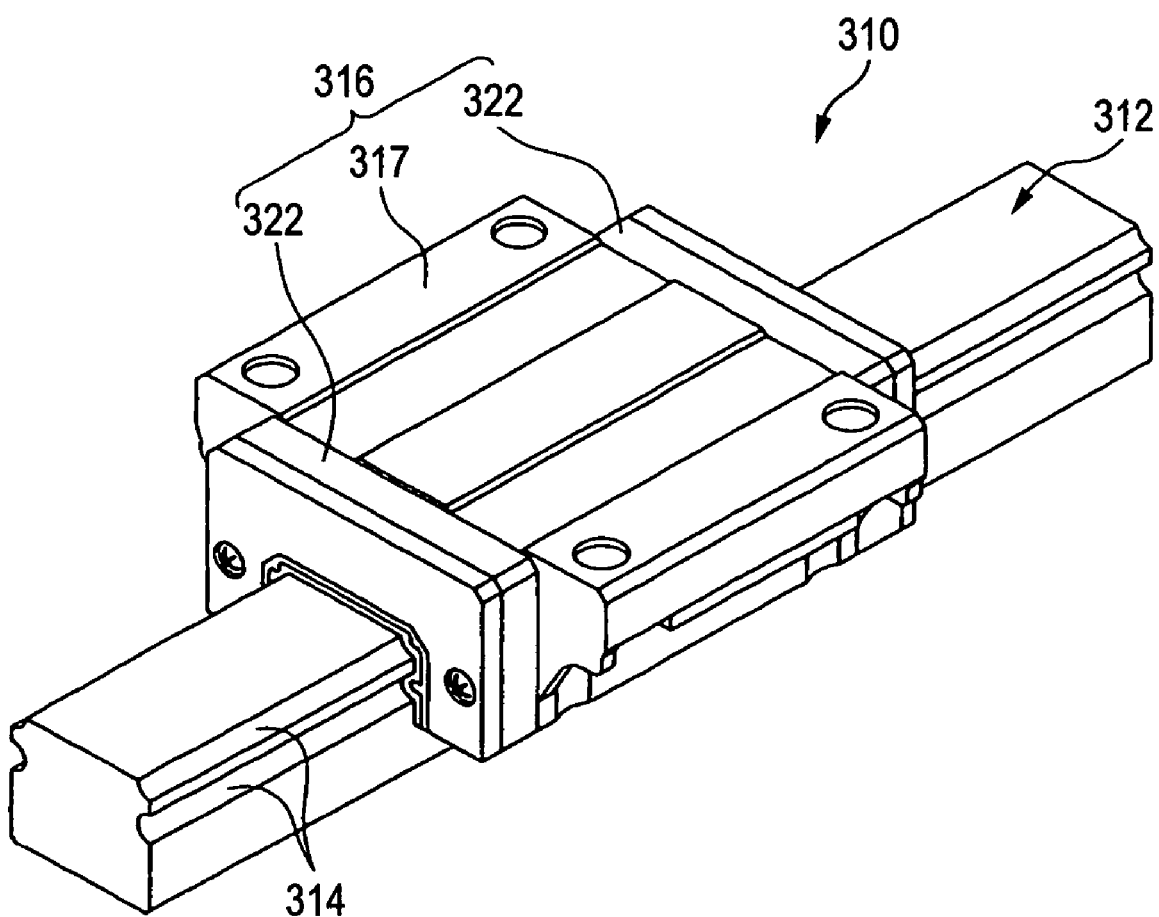
FIG. 47 is a perspective view of a linear guide according to an embodiment of a linear guide apparatus provided with a rolling element accommodating belt therefor according to this invention.
Figure 48:
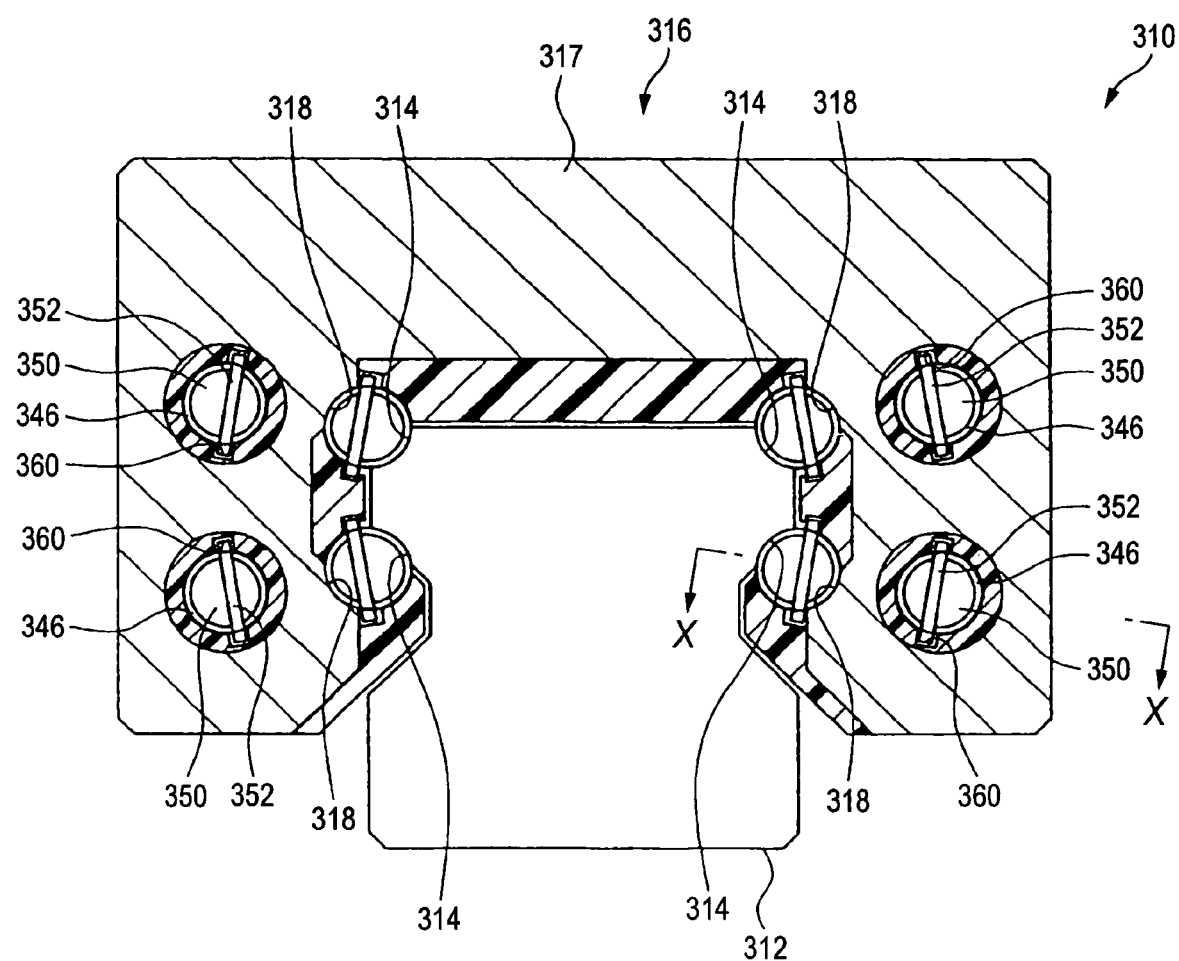
FIG. 48 is a view for explaining the cross section of a slider of the linear guide in FIG. 47.
Figure 49:
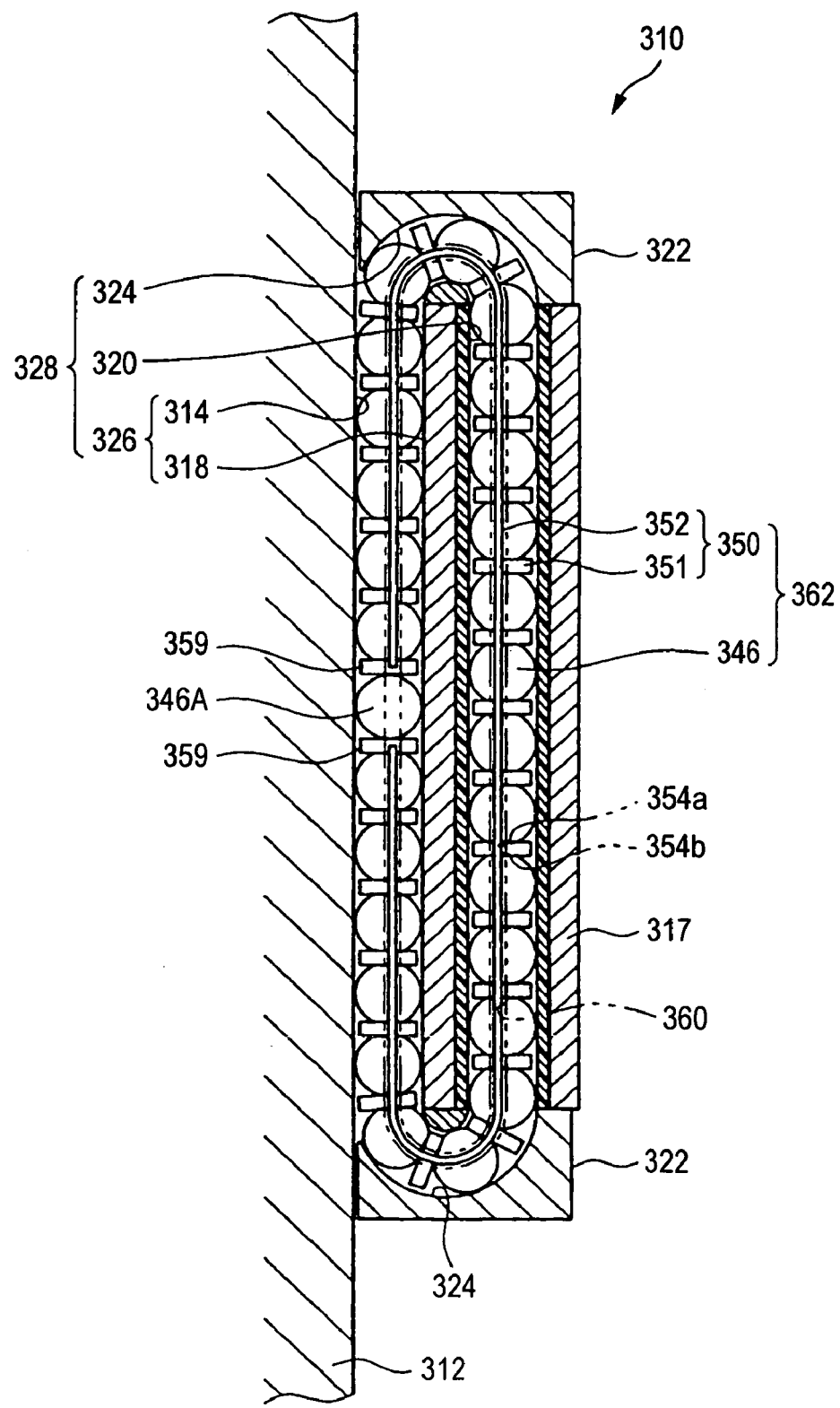
FIG. 49 is a sectional view of the linear guide taken in line X-X in FIG. 48.

FIG. 47 is a perspective view of a linear guide according to the first embodiment of a linear guide apparatus provided with a rolling element accommodating belt according to this invention. FIG. 48 is a view for explaining the cross section of a slider of the linear guide in FIG. 47. FIG. 49 is a sectional view taken in line X-X in the linear guide in FIG. 48.

As seen from FIGS. 47 and 48, a linear guide apparatus 310 includes a guide rail 312 having rolling element guiding faces 314 and a slider 316 which straddles the guide rail 312 so that the slider is movable relatively to the guide rail 312.

The guide rail 312 is formed in a square sectional shape, and has four strips of rolling element guiding faces 314, two for each of both sides which are formed linearly in the longitudinal direction.

The slider 316, as seen from FIG. 47, includes a slider body 317 and end caps 322 mounted at both ends in an axial direction of the slider body 317. The axially continuous shapes of the slider body 317 and end caps 322 are both nearly U-sectional.

The slider body 317, as seen from FIG. 48, has total four load rolling element guiding faces 318 nearly semicircular in section opposite to the respective rolling element guiding faces 314 of the guide rail 312, which are formed inside both nearly U-shaped sleeves of the slider body 317. As seen from FIG. 49, the end caps 322 have a pair of direction converting paths 324 which communicate to both ends of the load rolling element guiding face 318. Further, as seen from FIGS. 48 and 49, the slider body 317 has rolling element return paths 320 each of which is formed inside the sleeve to be in parallel to the load rolling element guiding face 318 and made as a through-hole circular in section, the rolling element return path 320 communicating to the pair of direction converting paths 324.

As seen from FIG. 49, the space sandwiched between the rolling element guiding face 314 of the guide rail 312 and the opposite load rolling element guiding face 318 of the slider body 317 constitutes a rolling element track path 326. Total four endless circulating paths 328 are formed so that each of them is circularly continuous by the pair of direction converting paths 324, rolling element return path 320 and rolling element track path 326.

Further, as seen from FIG. 49, a plurality of balls 346 serving as the rolling elements are loaded within each endless circulating path 328. The plurality of balls 346 within the endless circulating path 328 constitute a string of rolling elements (rolling element string) 362 as well as the rolling element accommodating belt 350. Incidentally, as seen from FIG. 48, coupling arms 352 hanging over in the width direction within the endless circulating path 328 are guided on both sides in the width direction by guide grooves 360, formed in the endless circulating path 328 of the slider 316.

Next, the rolling element accommodating belt 350 will be explained in detail.

Figure 50:
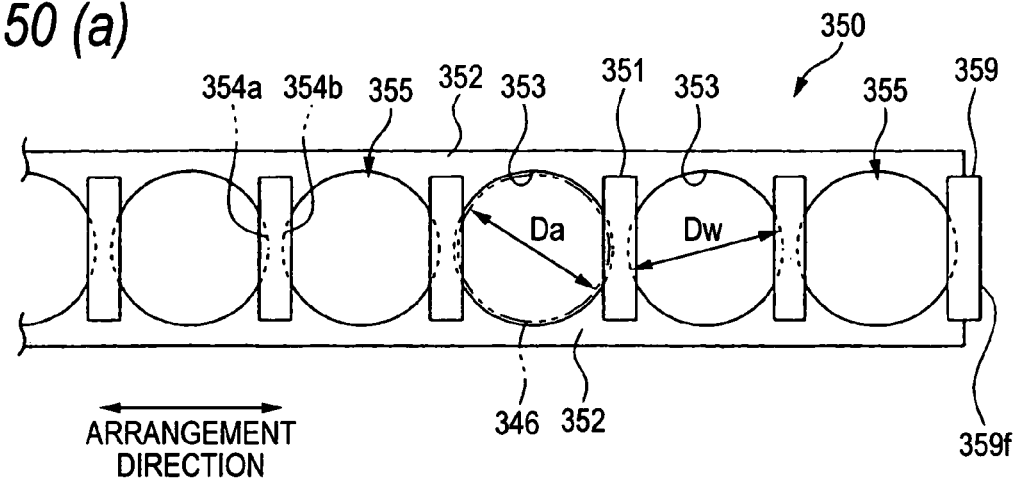
FIG. 50(*a*) is a partially enlarged perspective view of the rolling element accommodating belt in a developed and enlarged state.
Figure 50:
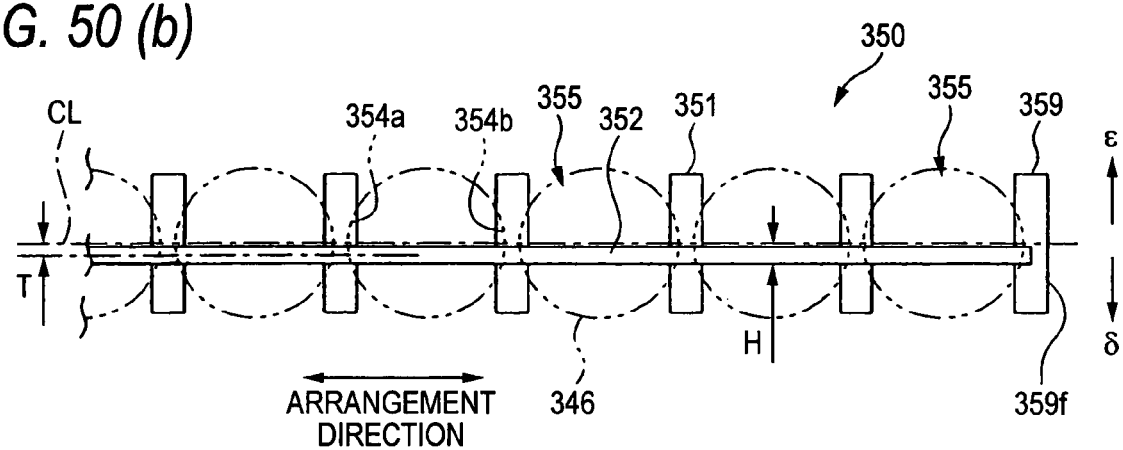
Figure 50:
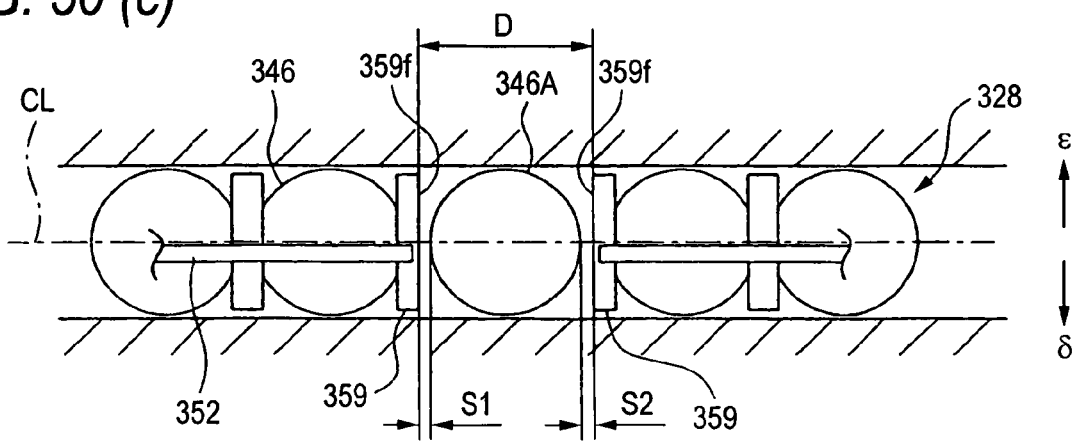

FIG. 50 is views for explaining the rolling element accommodating belt; FIG. 50(a) is a partially enlarged plan view of the rolling element accommodating belt in its developed state, FIG. 50(*b*) is a front view of the rolling element accommodating belt of FIG. 50(*a*), and FIG. 50(*c*) is a enlarged view of both ends opposite to each other within the endless circulating path 328.

The rolling element accommodating belt 350 is formed in a terminating shape and as seen from FIGS. 49 and 50, has spacers 351 each interposed between the adjacent balls 346 within the endless circulating path 328 and partitioning each ball 346 in a revolving direction, and spacers 359 located at both ends of the rolling element accommodating belt 350. Namely, the spacers 359 are spacers located at both ends of the rolling element accommodating belt 350 formed in the terminating shape. The spacers other than the spacers 359 are the spacers 351.

These spacers 351, 359 are coupled with each other by a pair of coupling arms 352 on both sides in the width direction of the endless circulating path 328. These spacers 351 and coupling arms 352 are integrally formed of synthetic resin material (e.g. polyester-series elastomer and polyurethane) by injection molding.

Now, the position where the respective spacers 351, 359 are coupled with one another by the pair of coupling arms 352 is deflected by an offset quantity T toward the inner periphery of the endless circulating path 328 in using with respect to the line CL connecting the centers of the balls 346 (see FIG. 50(*b*)). The thickness of the coupling arm 352 coupling the adjacent spacers 351 is slightly smaller than the groove width of the guide groove 360 and made thin within a range capable of keeping a necessary and sufficient strength. Thus, the coupling arm 352 of the rolling element accommodating belt 350 can be engaged in the guide groove 360 while being slid therein.

The coupling arms 352, as seen from FIG. 50(*a*), have ball accommodating hole 353 each opening in an annular shape in their front/back direction (in the direction perpendicular to paper face in the figure). The respective ball accommodating holes 353 are arranged in the longitudinal direction of the rolling element accommodating belt 350. Their inner diameter Dw is slightly larger than the diameter Da of the ball 346 to be accommodated.

On the other hand, both the spacers 351, 359 are formed of a short cylindrical column member. As seen from FIG. 48, their shape when viewed in the arrangement direction of the balls 346 is annular, and their outer diameter is smaller than the outer diameter of the ball 346. The axial direction of the short cylindrical column members agrees with the longitudinal direction of the rolling element accommodating belt 350.

These spacers 351, 359 are arranged apart from each other by a predetermined interval on both sides of each the ball accommodating holes 353, and coupled with one another by the pair of coupling arms 352 on both sides of the endless circulating path 328. Thus, in this rolling element accommodating belt 350, the portions defined between the adjacent spacers and by the ball accommodating holes 353 constitute a plurality of rolling element accommodating portions 355 for individually accommodating the balls 346.

Further, each the spacers 351, 359 has a pair of rolling element contact faces 354*a*, 354*b* in slidable-contact with the outer periphery of the ball 346. The pair of rolling element contact faces 354*a*, 354*b* are formed at the center of the faces oriented toward the accommodated ball 346 of both end faces of the short cylindrical column member of each the spacers 351, 359. Each the contact faces 354*a*, 354*b* has a concave curved face (concave spherical face) which follows the curve of the ball 346. The inner diameter formed by the opposite curved faces is equal to the inner diameter Dw of the ball accommodating hole 353. Of the pair of rolling element contact faces 354*a*, 354*b*, the one rolling element contact face 54*a* is oriented toward one of the adjacent balls 346 whereas the other rolling element contact face 54*b* is oriented toward the other of the adjacent balls 346, opposite to the one rolling element contact face 54*a*. The ball 346 accommodated in each the rolling element accommodating portions 355 is restrained in any orientation between the pair of rolling element contact faces 354*a*, 354*b* while being rollably supported. Thus, since the balls 346 are individually accommodated apart from each other by a predetermined interval in the respective rolling element accommodating portions 355, the rolling element accommodating belt 350 permits the balls 346 to be aligned as a string of rolling elements 362 in the arrangement direction of the balls within the endless circulating path 328, and to be held while being rolled.

Now, the rolling element accommodating belt 350 is configured, as seen from FIG. 50(*c*), so that both ends thereof, i.e. the spacers 359 located at the ends are opposite in a non-contact state within the endless circulating path 328 and a ball 346A not accommodated in the rolling element accommodating portion 355 can be mounted between both opposite spacers 359. Further, each the spacers 359, as seen from FIG. 50(*c*), has an abutting face 359*f* abutting on the ball 346A accommodated between both ends and having a flat face.

The abutting faces 59*f* are oriented toward the arrangement direction of the balls 346 successively arranged within the endless circulating path 328, and their opposite distance Dh within the endless circulating path 328 is slightly larger than the diameter of the ball 346A. Thus, the abutting faces 59*f* provide gaps (S1, S2 in the figure) between themselves and the ball 346A accommodated between the opposite abutting faces 59*f* and so permit the ball 346A to slightly move in the arrangement direction thereof.

In short, in the linear guide apparatus 310, as seen from FIG. 49, the rolling element accommodating belt 350 is mounted with its side deflected by the above offset quantity T being oriented toward the inner periphery of the endless circulating path 328. In addition, between the spacers 359 located at both ends of the rolling element accommodating belt 350, the ball 346A not accommodated in the ball accommodating portion 355 is inserted.

Next, an explanation will be given of the operational advantage of the linear guide.

In accordance with the linear guide apparatus 310, since the spacer 51 intervenes between the balls 346, the balls 346 are not brought into direct contact with each other, occurrence of noise or abrasion due to rubbing of the balls 346 against each other is prevented. Further, since the spacers 351 are coupled with one another by the coupling arms 352 to constitute the rolling element accommodating belt 350, the balls 346 can be moved with their stable rolling kept within the endless circulating path 328 as a string of rolling elements 62 by the rolling element accommodating belt 350 while a predetermined interval therebetween being kept.

Further, in accordance with the linear guide apparatus 310, both ends (spacers 359) of the rolling element accommodating belt 350 are opposite to each other in their mutual non-contact state within the endless circulating path 328 and between both opposite spacers 359, the ball 346A not accommodated in the rolling element accommodating portion 355 is mounted. For this reason, it is possible to restrain the number of balls undergoing load within the endless circulating path 328 from being reduced when both ends of the rolling element accommodating belt are located on the rolling element track path 326 in which the balls undergo load. As a result, as compared with the linear guide where the ball is not located between both ends, it is possible to prevent or restrain the load capacity or rigidity of the linear guide apparatus 310 from being lowered.

Further, in accordance with the linear guide apparatus 310, since the abutting face 359f of each of both opposite spacers 359 on the ball 346A has the flat face, the contact portion between the abutting face 359f and the ball 346A provides not a plane-contact but a point-contact and hence the contact area can be decreased. For this reason, in accordance with the linear guide apparatus 310, even if the rolling element accommodating belt 350 gives extension in the longitudinal direction owing to heat generated by the friction with the balls due to circulation within the endless circulating path 328, the degree of the ball 346A arranged between both spacers 359 being forcibly held down can be alleviated. Further, even if lubricant exists between the spacers 359 and the ball 346A, its shearing resistance is reduced so that the friction when the ball 346A rolls can be alleviated. Thus, it is possible to restrain the sliding resistance of the slider 316 from being increased and to improve the operability thereof.

Further, in accordance with the linear guide apparatus 310, when the ball 346A is mounted between both spacers 359 of the rolling element accommodating belt 350, both spacers 359 provide gaps (S1, S2 in the figure) between themselves and the ball 346A in the arrangement direction of the balls. For this reason, even if extension of the rolling element accommodating belt 350 is generated, increase in the friction due to the mutual contact between both spacers 359 and the ball 346A can be suppressed. Particularly, even where great extension of the rolling element accommodating belt 350 is generated under a severe using environment with a great change in temperature, increase in the friction due to the mutual contact between the ends and the ball can be preferably restricted.

As described above, in accordance with the linear guide apparatus 310 provided with the rolling element accommodating belt 350, even if extension in the longitudinal direction of the rolling element accommodating belt is generated, it is possible to restrain the smooth rolling of the ball 346A arranged between both spacers 359 from being hindered and the sliding resistance of the slider 316 from being increased.

It should be noted that the rolling element accommodating belt according to this invention and the linear guide apparatus provided with the same should not be limited to the embodiments described above, but may be modified in various manners as long as it does not depart from the spirit of the invention.

For example, in the embodiment described above, the linear guide apparatus according to this invention was explained with reference to the linear guide apparatus 310 having the balls 346, 346A as rolling elements. However, this invention should not be limited to such a liner guide but may be also applied to a linear guide having rollers as the rolling elements. For example, where the rollers are employed as the rolling elements, the contact portion between the abutting face (abutting face 359f in the above embodiment) and the roller gives not the plane-contact but a line-contact. However, in this case also, there are provided the same operational advantage as in the above embodiment that the contact area can be reduced so that the friction when the roller rolls is alleviated, and increase in the sliding resistance of the slider can be restricted, thereby improving the operability of the slider.

Further, for example, in the above embodiment, the rolling element accommodating belt 350 was explained with reference to an example in which when the ball 346A is mounted between both spacers 359, both spacers 359 provide the gaps (S1, S2) between themselves and the ball 346A in the arrangement direction of the balls. However, without being such an example, as illustrated as a first modification in FIG. 51(a), the rolling element accommodating belt 350 may be provided in a length in which both spacers 359 provide almost no gap between themselves and the ball 346A to be accommodated. However, even if extension of the rolling element accommodating belt 350 is generated, in order to more preferably suppress increase in the friction due to the mutual contact between both spacers 359 and the ball 346A, it is preferable that the rolling element accommodating belt 350 is provided in the length in which both spacers 359 provide the gaps (S1, S2) between themselves and the ball 346A in the arrangement direction of the balls.

Further, for example, in the above embodiment, each the rolling element accommodating portions 355 was explained with reference to an example in which it rollably supports the accommodated ball 346 and restrains the ball in any orientation. Without being limited to such a configuration, the rolling element accommodating portion may be formed to have an orientation permitting the accommodated ball to move. For example, the rolling element accommodating portion 355 may be formed to permit the movement of the accommodated ball 346 toward the one side of the endless circulating path 328 and restrict it toward the other side thereof.

Figure 51:
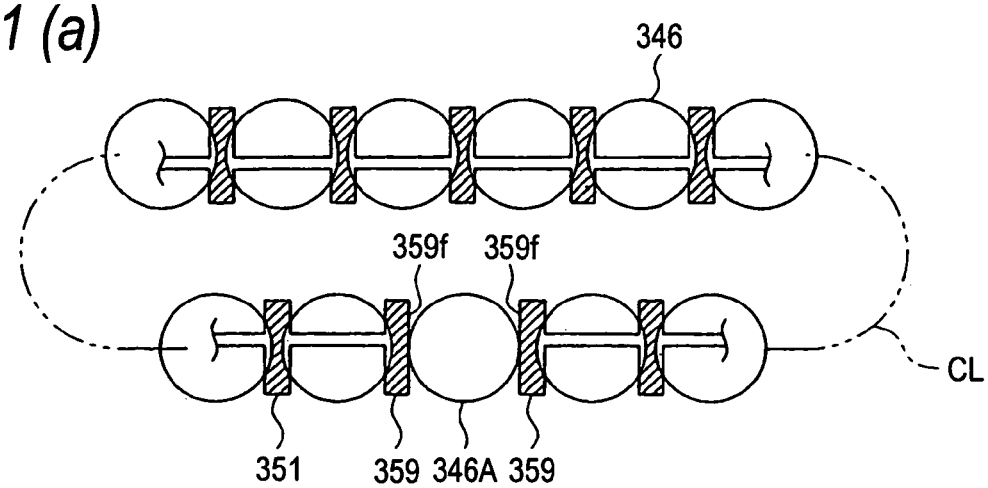
FIG. 51(*a*) shows a first modification of the rolling element accommodating belt.
Figure 51:
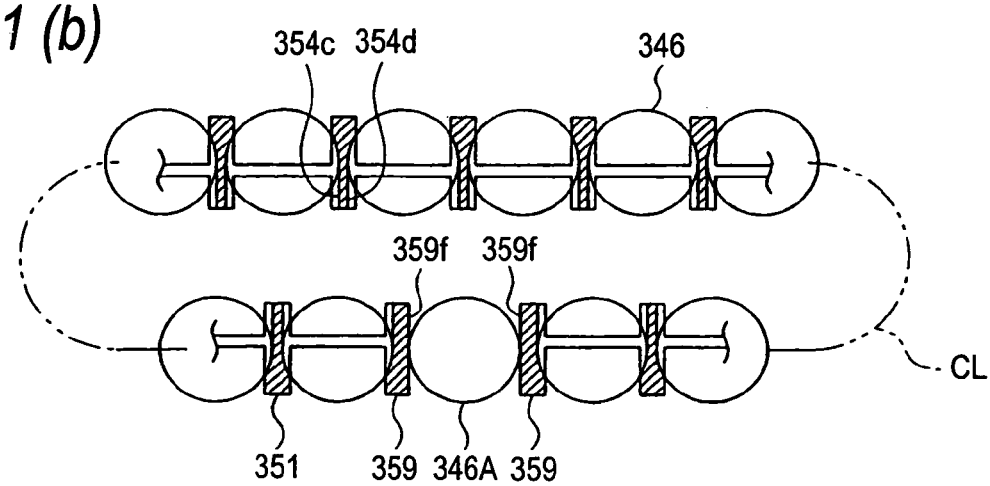
Figure 51:
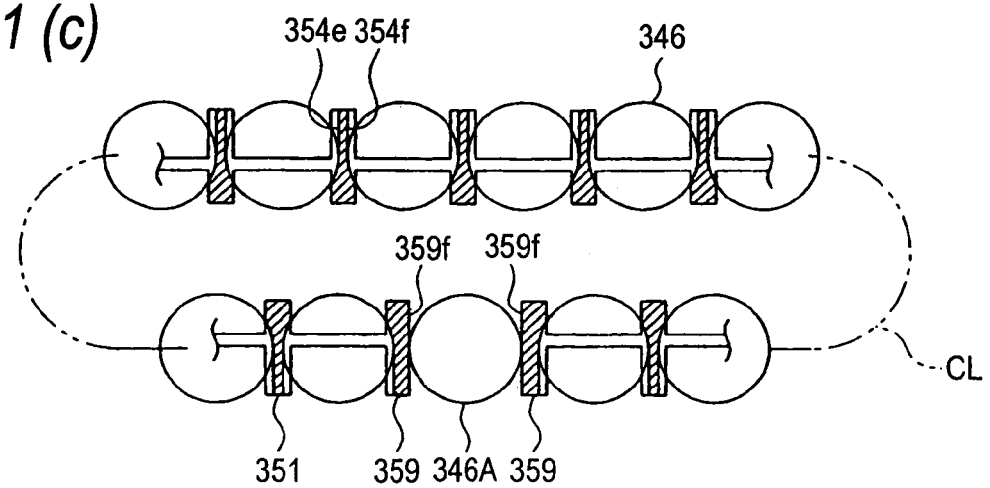

For example, a second modification of the rolling element accommodating belt 350 is illustrated in FIG. 51(b). This rolling element accommodating belt 350 is provided with a pair of rolling element contact faces 354c, 354d in place of the above pair of rolling element contact faces 354a, 354b. Each these rolling element contact faces 354c, 354d has a concave curved face in sliding-contact with the accommodated ball. However, this concave curved face is thin on the inner diameter side of each spacers 351, 359 in the direction of inner/outer periphery of the endless circulating path 328 so that the ball is removable toward the inner diameter side. The outer diameter side thereof is formed in the same face as in the above embodiment and so restricts the movement of the ball toward the outer diameter side.

In accordance with the configuration of the second modification illustrated in FIG. 51(b), for example, in the operation of mounting the balls 346 in the rolling element accommodating belt 350, the balls 346 can be easily mounted from the side permitting the movement of the ball 346 so that the efficiency of mounting or removing the balls can be improved. Further, when the rolling element accommodating belt 350 is mounted in the slider 316, the rolling element accommodating belt 350 holds the balls 346 toward the outer periphery in the direction of the inner/outer periphery of the endless circulating path 328. For this reason, even when the slider 316 is taken out from the guide rail 312, drop-out of the balls 346 is prevented. Accordingly, in the linear guide apparatus having the holder, the holding force for the rolling elements can be further improved, thereby facilitating handling of the guiding device.

Further, for example, a third modification of the rolling element accommodating belt 350 is illustrated in FIG. 51(c). This rolling element accommodating belt 350 is provided with a pair of rolling element contact faces 354e, 354f in place of the above pair of rolling element contact faces 354a, 354b. Each these rolling element contact faces 354e, 354f are different from the second modification shown in FIG. 51(b) in only that they are oriented reversibly in the direction of the inner/outer periphery of the endless circulating path 328. In short, the pair of rolling element contact faces 354e, 354f are formed so as to permit the removal of the ball toward the outer periphery of the endless circulating path 328 and restrict the movement of the ball toward the inner periphery thereof.

In accordance with the configuration of the third modification illustrated in FIG. 51(c), for example, in the operation of mounting the balls 346 in the rolling element accommodating belt 350, the balls 346 can be easily mounted from the side permitting the movement of the ball 346 so that the efficiency of mounting or removing the balls can be improved. Further, when the rolling element accommodating belt 350 is mounted in the slider 316, the rolling element accommodating belt 350 holds the balls 346 toward the outer periphery in the direction of the inner/outer periphery of the endless circulating path 328. For this reason, the meandering of the rolling element accommodating belt 350 is restricted, thereby restricting frictional changes. The configuration according to this modification is also preferable to alleviate the mutual interference between the spacer 351 and the ball 346 in the direction converting path 324.

Figure 52:
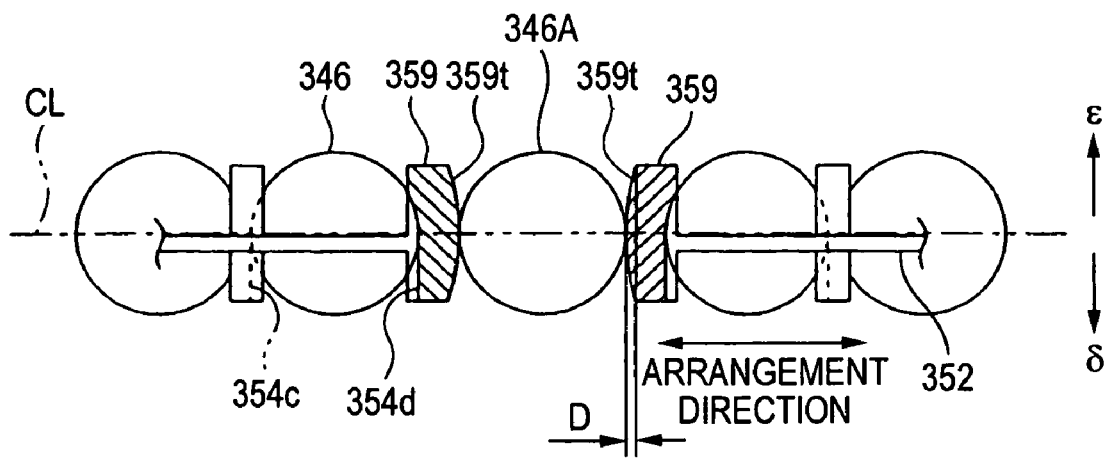
FIG. 52(*a*) shows a fourth modification of the rolling element accommodating belt.
Figure 52:
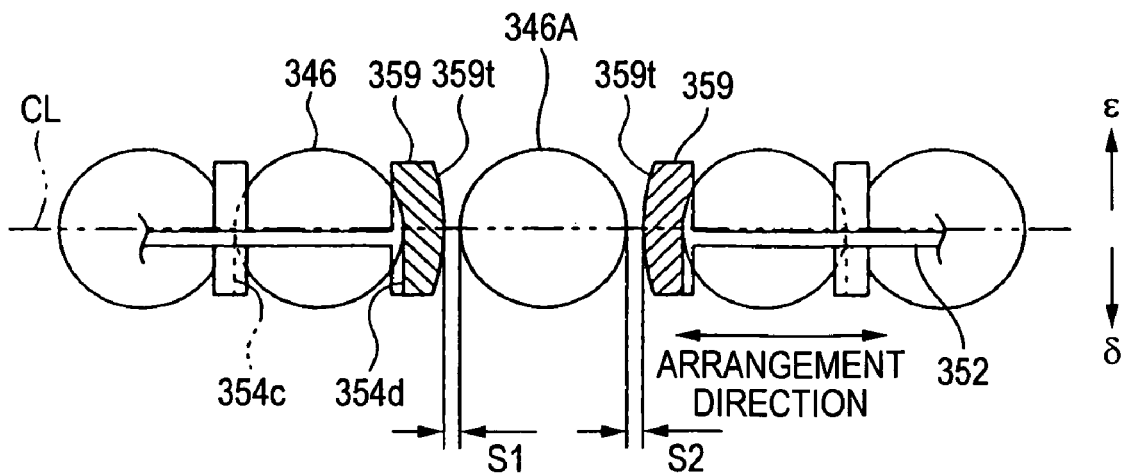

Further, for example, in the rolling element accommodating belt 350 according to the above embodiment, the abutting face 359f of each of both spacers 359 has a flat face. However, the rolling element accommodating belt according to this invention should not be limited to such a configuration. For example, FIG. 52 illustrates its modification. Each of the abutting faces illustrated has a convex curved face in place of the flat face.

Specifically, as seen from the fourth modification illustrated in FIG. 52(a), the abutting face 359t of each of both spacers 359 is formed of a convex curved face of a convex sphere. The convex curved face has a quantity of projection D of 0.3 mm in the arrangement direction of the balls 346. Now, it is assumed that the diameter of the ball 346 is about 5 mm. In this modification, each spacer has the pair of rolling element contact faces 354c, 354d as illustrated in FIG. 51(b).

It is preferable that the quantity of projection D is within a range from 0.2 mm to $\frac{1}{10}$ of the diameter Da of the ball 346. Specifically, when the rolling element accommodating belt is extended so that the rolling element is pushed against the abutting face, the abutting face is elastically deformed. In this case, if the quantity of projection is smaller than 0.2 mm, the abutting face is elastically deformed so that the contact area is larger than in the state of a desired point-contact or line-contact. This is insufficient in order to make the state of mutual contact more preferable. On the other hand, if the quantity of projection exceeds $\frac{1}{10}$ of the diameter of the rolling element, the interval between both opposite ends becomes wide so that the load capacity or rigidity of the linear guide apparatus is correspondingly reduced. Thus, in order to reduce the contact area between the abutting face and the rolling element and restrict reduction in the load capacity of the linear guide apparatus, in the configuration in which the abutting face has the convex curved face, it is preferable that the quantity of projection of the convex curved face in the arrangement direction is within the range from 0.2 mm to $\frac{1}{10}$ of the diameter of the rolling element.

In accordance with such a configuration, since the contact portion between the abutting face 359t and the ball 346A can give not the plane-contact but the point-contact more surely, the contact area can be made as small as possible as compared with the case of the plane-contact.

Particularly, if the abutting face is formed as the convex curved face, even if the rolling element accommodating belt 350 is extended in the longitudinal direction so that the ball 346A is pushed against the abutting face 359t, both spacers 359 at the ends are likely to drift in a radial direction of the endless circulating path 328. Thus, it is possible to further alleviate the degree of the ball 346A arranged between the spacers 359 being forcibly held down and further restrain the sliding resistance of the slider 316 from being increased.

Also in the configuration in which the abutting face is formed as the convex curved face in place of the flat face, as seen from the fifth modification shown in FIG. 52(b), it is needless to say that both opposite spacers 359 can provide the gaps (S1, S2) between themselves and the ball 346A accommodated in the arrangement direction of the balls. This fifth modification is different from the fourth modification in only that the gaps (S1, S2) exit in the arrangement direction of the balls.

Now referring to the drawings, an explanation will be given of twelfth and thirteenth embodiments of the linear guide apparatus according to this invention.

Twelfth Embodiment

Figure 53:
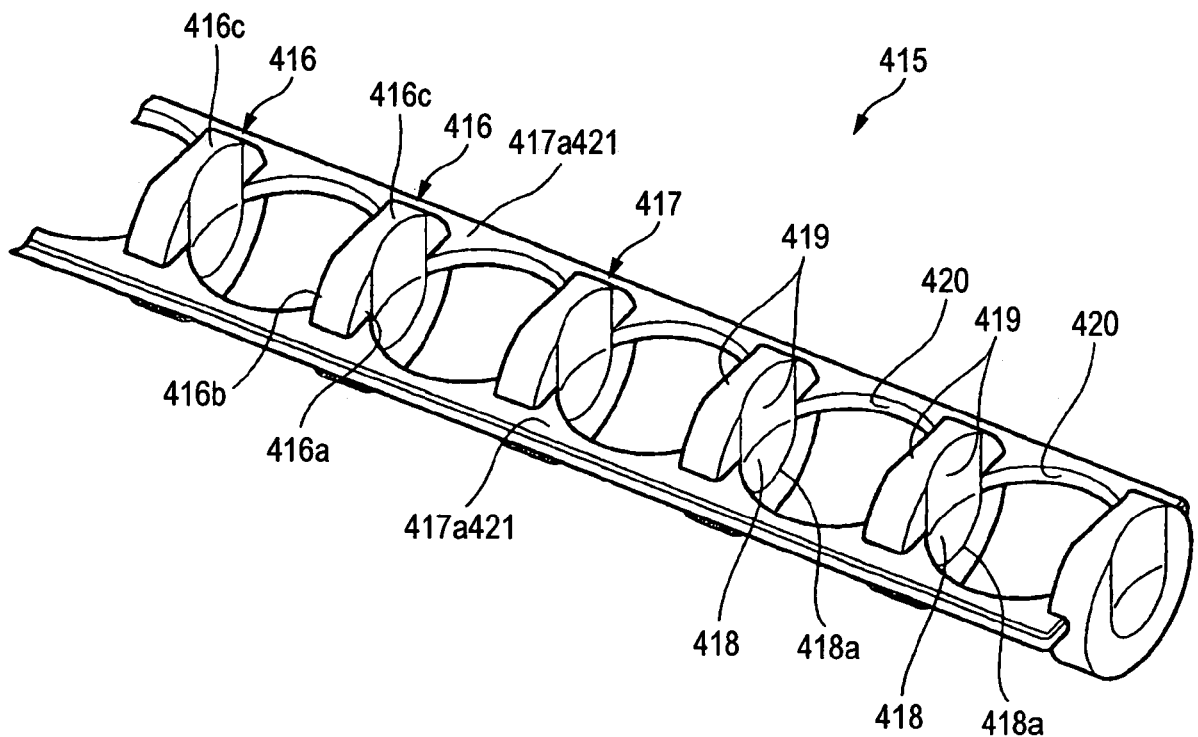
FIG. 53 is a perspective view of a belt holder in the twelfth embodiment.
Figure 54:
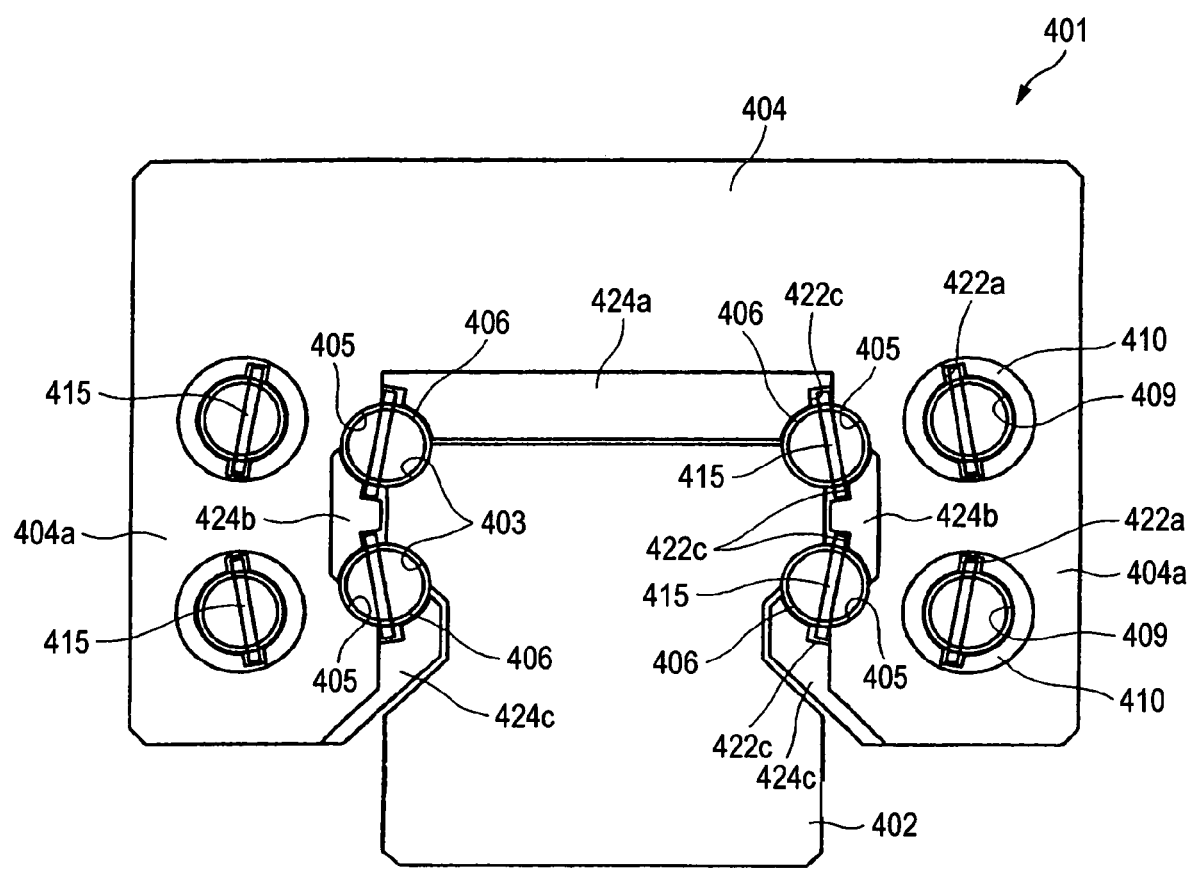
FIG. 54 is a front view of the assembled state of a slider in the twelfth embodiment.
Figure 55:
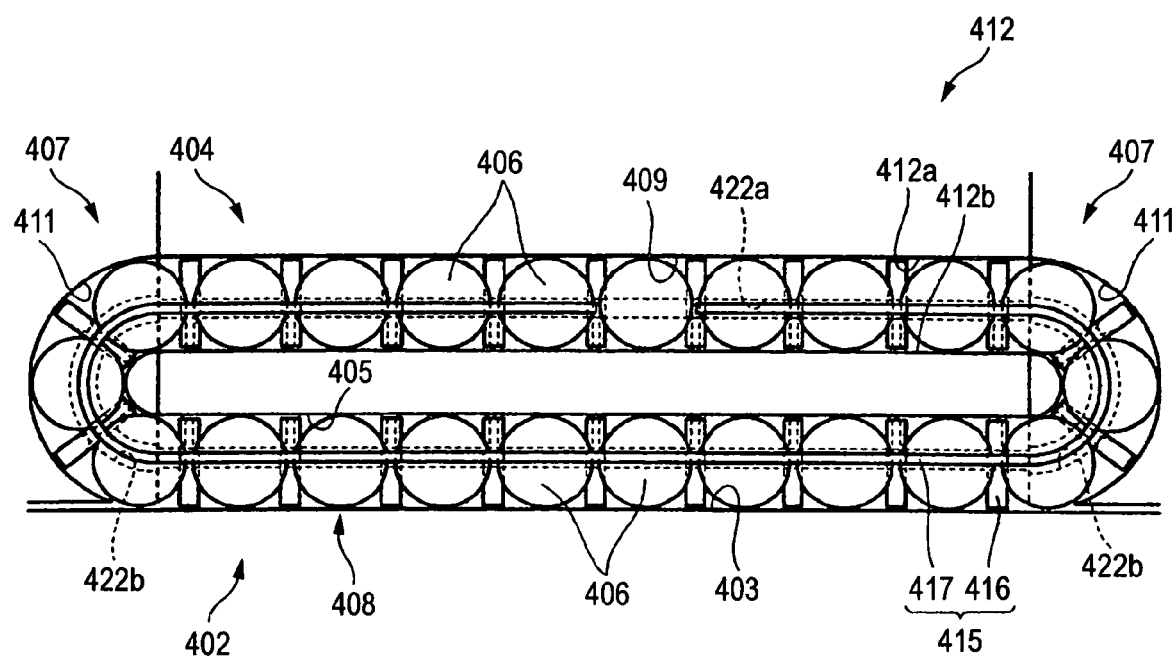
FIG. 55 is a view showing the circulation path in the twelfth embodiment.
Figure 56:
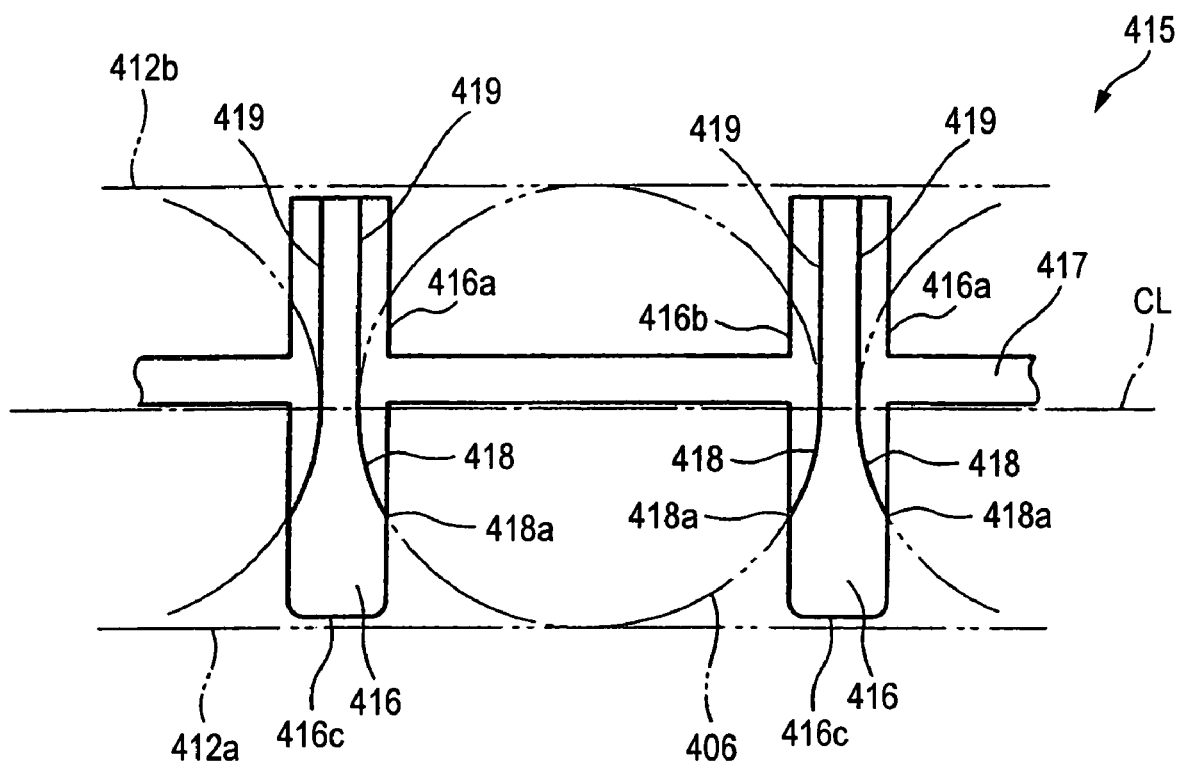
FIG. 56 is an enlarged sectional view of a belt holder in the twelfth embodiment.

FIG. 53 is a perspective view of a belt holder in the twelfth embodiment. FIG. 54 is a front view of the assembled state of a slider in the twelfth embodiment. FIG. 55 is a view for explaining a circulation path in the twelfth embodiment. FIG. 56 is an enlarged sectional view of the belt holder in the twelfth embodiment.

FIG. 54 is illustrated in the state where end caps have been removed.

In FIGS. 54 and 55, reference numeral 401 denotes a linear guide apparatus.

Reference numeral 402 denotes a rail of the linear guide apparatus 401, which is formed of a lengthy rod-like member made of steel such as alloy steel. On the rail side surfaces on both sides of the rail, rail track grooves 403 each having a nearly-arc section are formed which serve as rail rolling-element guide faces along the longitudinal direction.

Reference numeral 404 denotes a slider which is formed of a saddle-like member having a nearly U-shape section and made of steel such as alloy section. Inside both sleeve walls 404a thereof, slider track grooves 405 each having a nearly-arc section are formed oppositely to the rail track grooves 403. The slider track grooves 405 serve as slider rolling-element guide faces.

Reference numeral 406 denotes one of balls serving as rolling element. The ball is formed of a globe made of steel such as alloy steel.

Reference numeral 407 denotes one of end caps made of a metallic material or resin material.

The end caps 407 are arranged at the front and rear ends of the slider 404 in its moving direction (hereinafter referred to as slider moving direction) as shown in FIG. 55.

Between the slider track grooves 405 and the rail track grooves 403 arranged oppositely to each other, load paths 408 are formed on which the balls 406 roll. The load paths 408 serve to support the load of the slider 404 moving on the rail 402.

Reference numeral 409 denotes one of return paths. Each the return paths is an annular sectional through-hole having an inner diameter approximately equal to the diameter of each ball 406, which is provided in each of cylindrical-column-like sleeves 410 made of resin material; the sleeves 410 are fit in each of through-holes which pass through the slider 404 in the slider direction and provided in the thick-wall portion of both sleeve walls 404a of the slider 404. Each the return paths is formed to correspond to each the slider track grooves 405.

At the connecting portion between the sleeve 410 and each the end caps 407 at both ends, a convex segment and a concave segment (not shown) are provided so that a guide portion 421 is engaged in a state positioned so as to incline at a predetermined angle.

Reference numeral 411 denotes one of direction converting paths provided in the end caps 407. Each the direction converting paths is a curved path having a circular section for connecting the load path 408 and the return path 409 of the slider 404. The direction converting path 411 has a function of guiding the balls 406 to convert their circulating direction.

The load path 408 and the return path 409 are coupled with each other by the direction converting path 411. Thus, a circulation path 412 is formed on which the balls 406 circulate with the movement of the slider 404, and which is similar to a track for athletic sports.

Reference numeral 415 denotes one of belt holders. The belt holders 415 are manufactured by a molding means such as injection molding using a resin material. As seen from FIGS. 55 and 56, each belt holder 415 is composed of spacers 416, a coupling belt 417 for coupling the spacers 416 in a direction of the line connecting the respective centers of the balls 406 (hereinafter referred to as a center coupling line CL), and others. The spacers 416 serve to separately hold the balls 406 in order to prevent the adjacent balls 406 from being brought into contact with each other while they circulate along the circulation path 412.

Each the spacers 416 is a disk-shaped member having a diameter smaller than that of the ball 406. On both front end face 416a and rear end face 416b of the center coupling line CL of the spacer, a spherical concave face 418 and an arc concave face 418 are formed. The spherical concave face 418 serves as a sliding-contact face formed on the side of the outer periphery 412a of the circulation path 412, having a center on the center coupling line CL and a radius larger than the radius of the ball 406. The arc-concave face 419 serves as a rolling-element insertion guiding face formed on the side of the inner periphery 412b of the circulation path 412. The arc-concave face 419 connects an outer peripheral face 416c which is an outer surface of the spacer 416 to the spherical concave face 418. The arc-concave face 419 has a radius approximately equal to that of the spherical concave face 418.

The outer peripheral face 416c of the spacer 416 is formed so as to provide a radius larger than the edge 418a of the spherical concave face 418. Therefore, a part of the front end face 416a and the rear end face 416b is left between the edge 418a of the spherical concave face 418 and the outer peripheral face 416c so that the apex angle at the edge 418a is 90° or more.

As seen from FIG. 55, the coupling belt 417 is a belt-like member having a plurality of pockets 420 for accommodating the balls 406. As seen from FIG. 56, the coupling belt 417 couples the spacers 416 on the side of the inner periphery 412b of the circulation path 412 with respect to the center coupling line CL. Both sides 417a of the coupling belt 417 along the center coupling line CL serve as guide portions 421 when the belt holder 415 circulates on the circulation path 412 while holding the balls 406.

Reference numerals 422a, 422b, 422c denote guide grooves each having a square section formed along the circulation path 412. They serve as the guide portions 421 for the coupling belt 417 of the belt holder 415 moving on the circulation path 412.

As seen from FIGS. 54 and 55, each the guide grooves 422a is formed along the return path 409 of the slider 404, and each the guide grooves 422b is formed along the direction converting path 411 of the end cap 407 so as to have a width larger than that of the guide groove 422a.

The guide grooves 422c are formed along the slider moving direction by recesses at both ends of a first holding member 424a, which is plate-like, attached to the inside of the slider 404 and the corresponding inner faces of the slider 404; recesses at the apex on the side of the rail 402 of a second holding member 424b, which has a nearly triangular section, and the corresponding side faces of the rail 402; and recesses at the end of a third holding member 424c, which is nearly dogleg-section, and the corresponding inner faces of the slider 404. The guide grooves 422c has a width approximately equal to that of the guide grooves 422a.

At the connecting portions between the first, second and third holding members 424a, 424b, 424c and the end caps 407 at both ends, the concave segment and convex segment (not shown) are provided so that these holding members 424 are secured at predetermined positions inside the slider 404.

The above circulation path 412 is filled with a predetermined amount of lubricant (e.g. grease). The belt holder 415 which holds a plurality of balls 406 by the spacers 416 is arranged with its guide portions 421 of the coupling belt 417 being fit in the respective guide grooves 422. The belt holder 415 reciprocatably supports the load applied to the slider 404 when the balls 406 circulating on the circulation path 412 with the movement of the slider 404 roll between the rail track groove 403 and the slider track groove 405 which constitute the load path 408.

An explanation will be given of the operation of the configuration described above.

The balls 406 loaded in the circulation path 412 are accommodated in the pockets 420 formed in the coupling belt 417 of the belt holder 415 with the guide portions 421 being guided by the guide grooves 422. Each the balls 406 is fit between the spherical concave faces 418 of the front and rear spacers 416 in the circulating direction so that its spherical surface is held. As the slider 414 moves, the balls 406 move to circulate along the circulation path 412 in a state where the mutual contact therebetween and drop-out from the load path 408 are prevented.

When the ball 406 having rolled in sliding contact with the spherical concave face 418 in the load path 408 reaches the direction converting path 411, as seen from FIG. 55, the contact point between the ball 406 and the spacer 416 is shifted toward the inner periphery 412b of the circulation path 412 owing to the inclination of the spacer 416 so that the ball 406 moves in sliding contact with the arc concave face 419. When the ball 406 reaches the return path 409, it moves in sliding contact with the spherical concave face 418 again.

As described above, since the spacer 416 in this embodiment is provided with the arc concave faces 419 on the side of the inner periphery 412b of the circulation path 412, the ball 406 can be moved smoothly in the direction converting path 411.

Further, since the arc concave face 419 connects the spherical concave face 418 with the outer peripheral face 416c so as to provide a gutter, by dropping the balls 406 in the gutter, they can be easily accommodated in the pockets 420 of the coupling belt 417. This improves the capability of mounting the balls 406 in the belt holder 415.

The balls 406 loaded in the circulation path 412 are accommodated in the pockets 420 formed in the coupling belt 417 of the belt holder 415 with the guide portions 421 being guided by the guide grooves 422. Each the balls is fit between the spherical concave faces 418 of the front and rear spacers 416 in the circulating direction so that its spherical surface is held. As the slider 404 moves, the balls 406 move to circulate along the circulation path 412 in a state where the mutual contact therebetween and drop-out from the load path 408 are prevented.

When the ball 406 having rolled in sliding contact with the spherical concave face 418 in the load path 408 reaches the direction converting path 411, as seen from FIG. 55, the contact point between the ball 406 and the spacer 416 is shifted toward the inner periphery 412b of the circulation path 412 owing to the inclination of the spacer 416 so that the ball moves in sliding contact with the arc concave face 419. When the ball 406 reaches the return path 409, it moves in sliding contact with the spherical concave face 418 again.

As described above, in accordance with this embodiment, each the spacers coupled by the coupling belt of the belt holder has the spherical concave face with which the ball is to be in sliding contact on the side of the outer periphery of the circulation path, and the outer peripheral face of the spacer is formed to be larger than the edge of the spherical concave face. This prevents the balls from dropping out toward the rail when the slider is removed, thereby improving the workability of the mounting operation of the rail and others. Further, the apex angle at the edge of the spherical concave face is 90° or more so that no thin-wall portion is formed. This prevents the thin-wall portion from being deformed and a chipped area from occurring in resin molding. Thus, a predetermined shape can be easily formed.

On the side of the inner periphery of the circulation path, since the spacer is provided with the gutter-like arc concave face connecting the spherical concave face to the outer peripheral face of the spacer, the ball can be moved smoothly in the direction converting path. In addition, the balls can be easily accommodated in the pockets of the coupling belt. This improves the capability of manufacturing the linear guide apparatus.

In this embodiment, in FIG. 56, on the side of the inner periphery 412b of the circulation path 412 the corner of the outer surface 416c of the spacer 416 is illustrated as a right angle. However, as seen from FIG. 57, a chamfering 426 may be formed at the corner between the outer peripheral face 416c of the spacer 416 on the side of the inner periphery 412b and the front end face 416a or the rear end face 416b. In this way, when external force is applied to the corner of the outer peripheral face 416c of the spacer 416 on the side of the inner periphery 412b, its deformation or breakage can be prevented.

Figure 57:
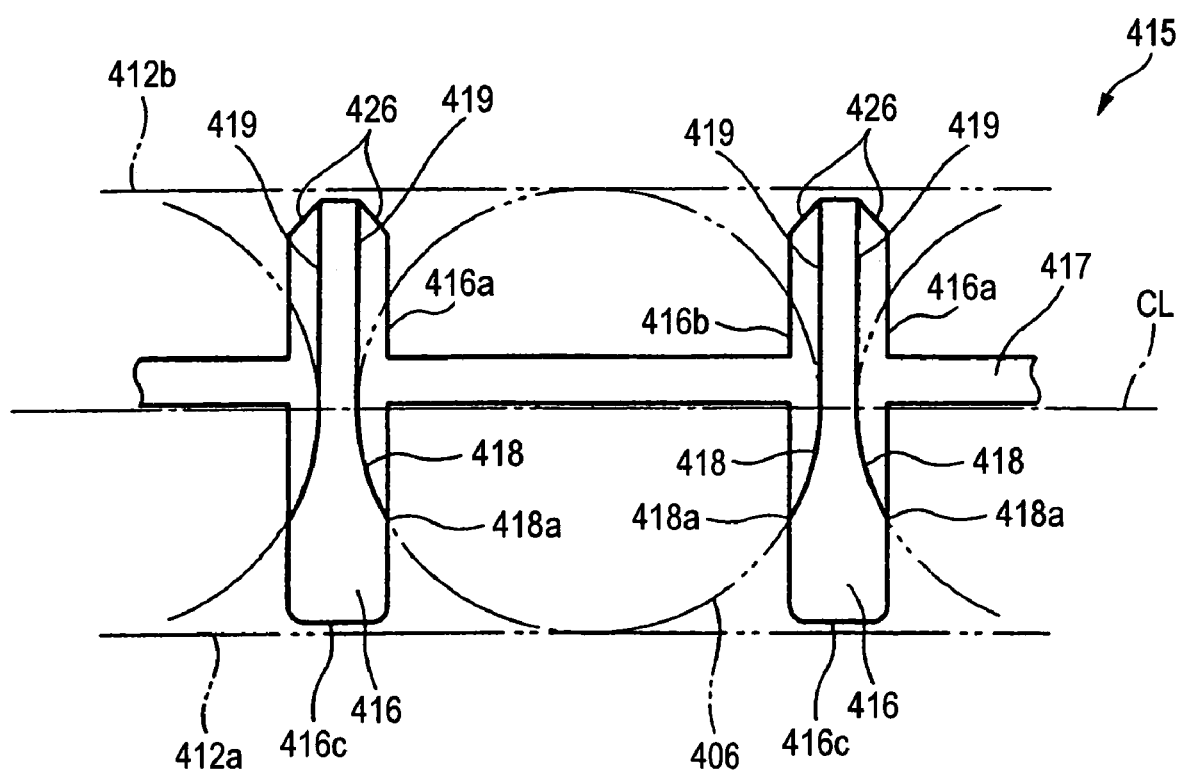
FIG. 57 is an enlarged sectional view of another format in the twelfth embodiment.
Figure 58:
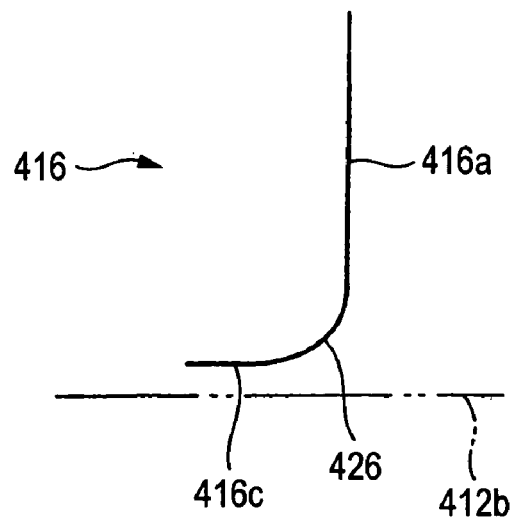
FIG. 58 is a view for explaining another chamfering shape of a spacer on the side of the inner periphery of a circulation path in the twelfth embodiment.
Figure 58:
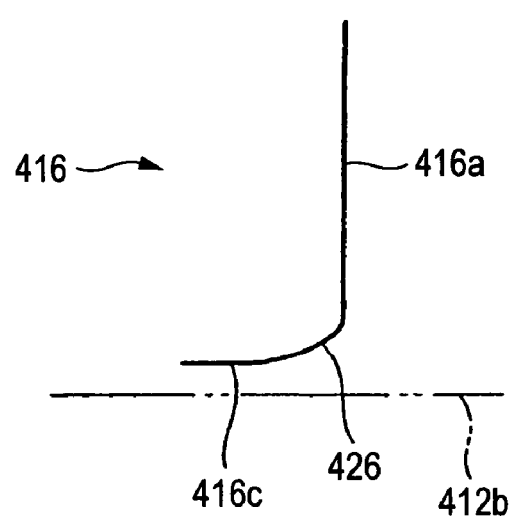
Figure 58:
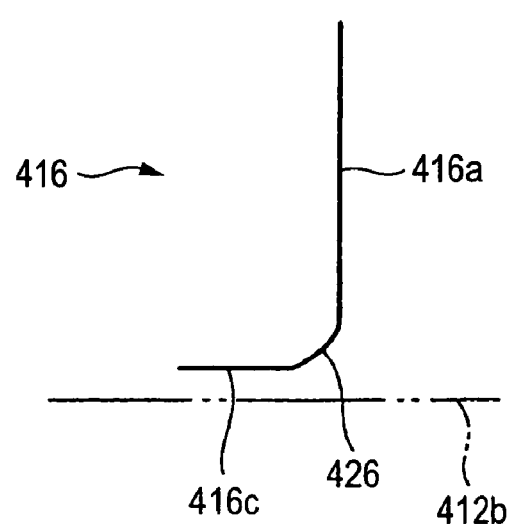

The chamfering 426 shown in FIG. 57 is a planar C-chamfering. However, the chamfering 426 may have a curve as shown in FIG. 58. FIG. 58(a) shows an example in which the curve of the chamfering 426 is formed of the arc face of an ¼ arc. FIG. 58(b) shows another example in which the curve is formed of the arc face smoothly connecting to only the outer peripheral face 416c. FIG. 58(c) shows still another example in which the curve is formed of the arc face which is connected at an angle to the outer peripheral face 416c and the front end face 416a or rear end face 416b. Among them, the chamfering 426 in which its curve is formed of the arc face of an ¼ arc and smoothly connected to the outer peripheral face 416c and the front end face 416a or rear end face 416b can prevent the deformation of the corner most effectively.

In this embodiment, a part of the front end face 416a and the rear end face 416b is left as a face between the edge 418a of the spherical concave face 418 and the outer peripheral face 416c of the spacer 416 on the side of the inner periphery 412b of the circulation path 412. However, as seen from FIG. 59, a slope 428 which slopes toward the center in the thickness direction of the spacer 416 may exist between the edge 418a and the outer peripheral face 416c. In such a structure also, the apex angle at the edge 418a or the apex angle of the corner of the outer peripheral face 416c can be set at 90° or more, thereby preventing resin from being likely to reach there in resin molding and so the chipped area from occurring.

Figure 59:
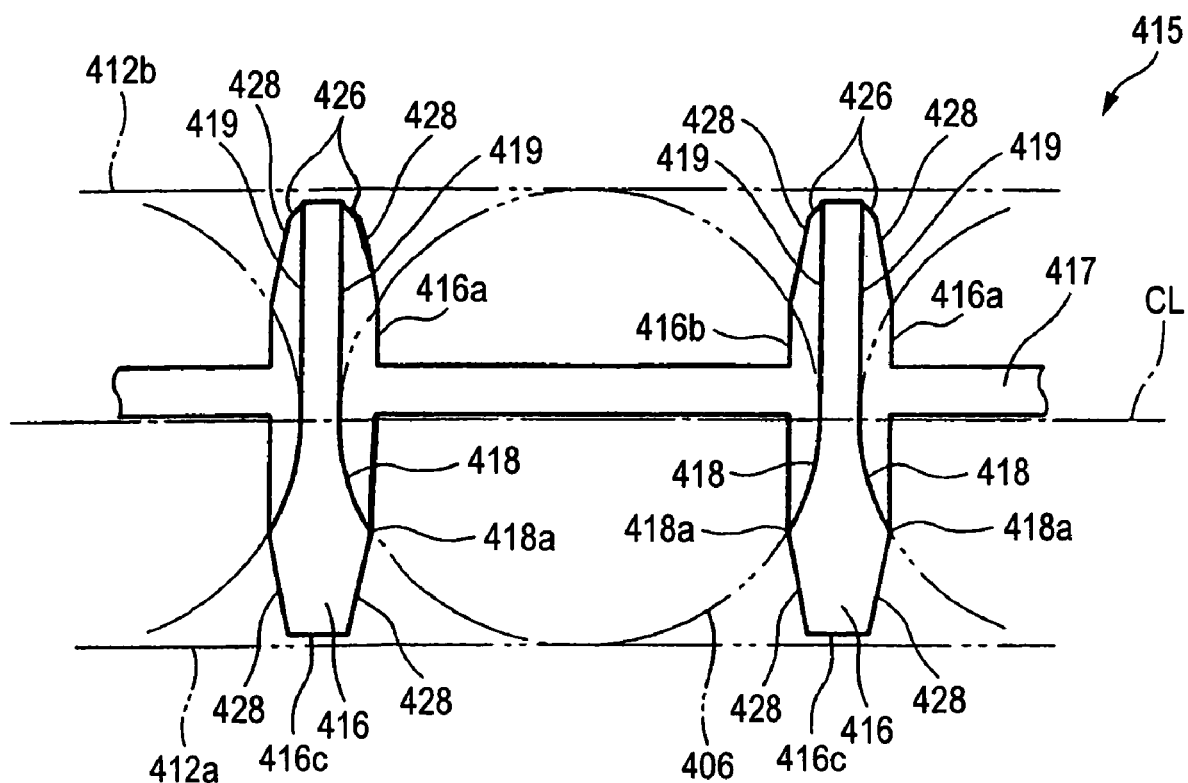
FIG. 59 is an enlarged sectional view of another format of the spacer in the twelfth embodiment.

Further, in the example of FIG. 59, since on the side of the inner periphery 412b of the circulation path 412, the chamfering 426 is formed at the corner of the outer peripheral face 416c of the spacer 416, when external force is applied to the corner, its deformation or breakage can be prevented.

This embodiment was explained with reference to the linear guide using balls as rolling elements. However, this invention can be also applied to the linear guide apparatus using rollers as the rolling elements. In this case, the rail rolling-element guide face and the slider rolling-element guide face which constitute the load path are constructed by a rail track face on which the rollers roll and a slider track face; the sliding-contact face of the spacer is formed as an arc face with which the roller is in sliding-contact; and the rolling-element insertion guide face is formed as a face communicating to the arc face. In such a configuration, the same effect as described above can be obtained.

Thirteenth Embodiment

Figure 60:
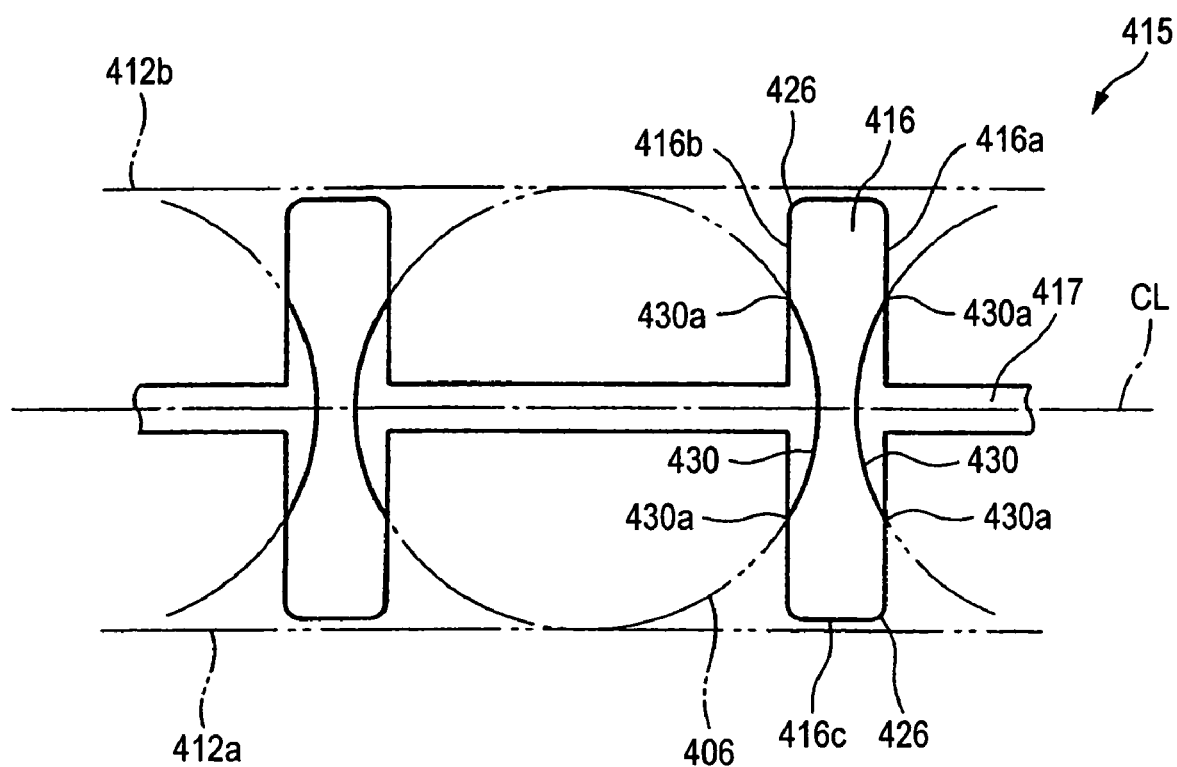
FIG. 60 is an enlarged sectional view of a belt holder in the thirteenth embodiment.

FIG. 60 is an enlarged sectional view of the belt holder according to the thirteenth embodiment.

In this embodiment, like reference symbols refer to like parts in the twelfth embodiment.

The belt holder 415 according to this embodiment, as in the twelfth embodiment, includes the spacers 416 and coupling belt 417. However, it should be noted that the twelfth embodiment in that at the corner of the outer peripheral face 416c of the spacer 416, the chamfering 426 which is a curved face is formed over the entire circumference and the coupling belt 417 couples the spacers 416 with one another on the center coupling line CL.

Reference numeral 430 denotes a spherical concave face corresponding to the spherical concave face 418 in the twelfth embodiment. The spherical concave face 430 is formed also on the side of the inner periphery 412b of the circulation path 412 with respect to the symmetrical line of the central coupling line CL. As in the twelfth embodiment, a part of the front end face 416a and the rear end face 416b is left between the edge 430a and the outer peripheral face 416c so that the apex angle at the edge 430a is 90° or more.

In such a configuration, the belt holder 415 has a symmetrical shape on both sides of the outer periphery 412a and inner periphery 412b of the circulation path 412 with respect to the symmetrical line of the center coupling line CL.

The belt holder according to this embodiment is configured to prevent the balls 406 from dropping out on both sides of the outer periphery 412a and inner periphery 412b of the circulation path 412. Therefore, in mounting the balls 406, the balls 406 must be accommodated in the pockets 420 by pushing. However, there is no thin-wall area owing to the apex angle at the edge 430a of the spherical concave face 430 being 90° or more. Thus, in mounting the ball 406, the spacer 416 will not be deformed not broken.

As described above, in this embodiment, on the side of the outer periphery of the circulation path, each the spacers coupled by the coupling belt of the belt holder has the spherical concave face with which the ball is in sliding-contact, and the outer peripheral face of the spacer is formed to be larger than the edge 418a of the spherical concave face. Therefore, in removing the slider, the drop-out of the ball toward the rail can be prevented, thereby improving the workability of the operation of mounting the rail. Further, since the apex angle at the edge of the spherical concave face is 90° or more, no thin-wall area exist. Thus, it is possible to prevent the thin-wall area from being deformed and the chipped area from being occurring, As a result, the predetermined shape can be easily formed.

Further, since the belt holder has the symmetrical shape with respect to the symmetrical line of the center coupling line CL, it can be mounted in the slider without being worried about the front and rear of the belt holder. This speeds up the operation of mounting the belt holder.

This embodiment was explained with reference to the linear guide using balls as rolling elements. However, this invention can be also applied to the linear guide apparatus using rollers using the rolling elements. In this case, the rail rolling-element guide face and the slider rolling-element guide face which constitute the load path are constructed by a rail track face on which the rollers roll and a slider track face; the sliding-contact face of the spacer is formed as an arc face with which the roller is in sliding-contact; and the rolling-element insertion guide face is formed as a face communicating to the arc face. In such a configuration, the same effect as described above can be obtained.

Additionally, in each of the embodiments described above, the spacer was explained as having the disk shape. However, the spacer may be elliptical or octagonal. In such a shape also, the same effect as described can be obtained.

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A rolling element accommodating belt for a linear guide apparatus which comprises:
   a guide rail having a rolling element guiding face;
   a slider arranged relatively movable to the guide rail and comprising:
      a load rolling element guiding face opposite to the rolling element guiding face to constitute a rolling element track path together with the rolling element guiding face;
      a pair of direction converting paths communicating to both ends of the rolling element track path; and
      a rolling element return path communicating to the pair of direction converting paths;
   a plurality of rolling elements circulating while rolling within an endless circulation path defined by the rolling element track path, the pair of direction converting paths and the rolling element return path; and
   a guide groove provided internally along the endless circulation path,
   the rolling element accommodating belt comprising:
   a plurality of spacer portions interposed between the rolling elements adjacent to each other;
   coupling arms coupling the spacer portions with one another and hanging over outwardly from end faces of the spacer portions so as to be guided by the guide grooves; and
   rolling element accommodating portions defined by the spacer portions and the coupling arms and accommodating the rolling element individually so as to align the rolling elements in an arrangement direction in which the rolling element aligns within the endless circulation path,
   wherein the spacer comprises an inward abutting face abutting on the rolling element so as to prevent the rolling element from moving to inner diameter side of the endless circulation path; and
   wherein the spacer further comprises an other abutting face abutting on the rolling element, the other abutting face permitting the rolling element to move toward outer diameter side of the endless circulation path in the rolling element track path.

2. The rolling element accommodating belt as set forth in claim 1, wherein each of the rolling element accommodating portions permit the rolling element from failing off at least one side of inner and outer diameter sides of the endless circulation path,
   among the spacer portions which exist in the rolling element track path, there exist:
      at least one of the spacer portions comprising an inward abutting face preventing the rolling element from moving to an inner diameter side of the endless circulation path; and
      at least one of the spacer portions comprising an outward abutting face preventing the rolling element from moving to an outer diameter side of the endless circulation path.

3. The rolling element accommodating belt as set forth in any one of claims 1 and 2, comprising both end portions at a longitudinal direction of thereof, and
   the spacer portions positioned at the end portion comprising the inward abutting face.

4. The rolling element accommodating belt as set forth in any one of claims 1 and 2, wherein the spacer portion comprising an relief portion at a position of the spacer portion further inner diameter side of the endless circulation path than the inward abutting face, and
   the relief portion opposes to the rolling element.

5. The rolling element accommodating belt as set forth in any one of claims 1 and 2,
   wherein a part of the spacer portion which is positioned further inner diameter side of the circulation path than the coupling arm is thin plate-shaped.

6. The rolling element accommodating belt as set forth in any one of claims 1 and 2, wherein a part of the inward abutting face which restricts a movement of the rolling elements is formed as a slope,
   an inclination angle of the respective slope of the inward abutting faces relative to a direction perpendicular to the arrangement direction path is constant.

7. The rolling element accommodating belt as set forth in claim 6, the slope is a flat surface.

8. The rolling element accommodating belt as set forth in claim 6, the slope is a concave conical surface.

9. The rolling element accommodating belt as set forth in claim 6, wherein the slope is a surface having an inclination angle satisfying following equation (1):

$$\theta k \leq \tan^{-1}(((Rb+e)\sin\theta w - (tw/2)\cos\theta w/((Rb+e)\cos\theta w + (tw/2)\sin\theta w - Rp))) - \theta w \quad (1)$$

where $\theta w = tw/2Rb$(rad),
$\theta k$ is an inclination angle (deg) of the slope relative to the direction perpendicular to the arrangement direction,
$tw$ is a distance (mm) between centers of the adjacent rolling elements when the rolling-element accommodating belt is developed,
$Rb$ is a curvature of radius (mm) of central line of the rolling-element Accommodating belt at a center of the direction converting path when the rolling-element accommodating belt curves along the guide groove,
"e" is a distance (mm) from a center of the rolling element to a center line of the rolling-element accommodating belt, and
$Rp$ is a curvature of radius (mm) of the central locus of the rolling element at the center of the direction converting path.

10. A linear guide apparatus comprising:
a guide rail having a rolling element guiding face;
a slider arranged relatively movable to the guide rail and comprising:
   a load rolling element guiding face opposite to the rolling element guiding face to constitute a rolling element track path together with the rolling element guiding face;
   a pair of direction converting paths communicating to both ends of the rolling element track path; and
   a rolling element return path communicating to the pair of direction converting paths;
a plurality of rolling elements circulating while rolling within an endless circulation path defined by the rolling element track path, the pair of direction converting paths and the rolling element return path;
a guide groove provided internally along the endless circulation path; and
the rolling element accommodating belt as set forth in any one of claims 1, 2 and 3.

11. The linear guide apparatus as set forth in claim 10, wherein the guide groove is provided such that in the direction converting path, the coupling arm circulate at inner diameter side of the endless circulation path than a central locus of the rolling element.

12. A linear guide apparatus comprising:
a guide rail having a rolling element guiding face;
a slider arranged relatively movable to the guide rail and comprising:
   a load rolling element guiding face opposite to the rolling element guiding face to constitute a rolling element track path together with the rolling element guiding face;
   a pair of direction converting paths communicating to both ends of the rolling element track path; and
   a rolling element return path communicating to the pair of direction converting paths;
a plurality of rolling elements circulating while rolling within an endless circulation path defined by the rolling element track path, the pair of direction converting paths and the rolling element return path;
a guide groove provided internally along the endless circulation path; and
a rolling element accommodating belt comprising:
   a plurality of spacer portions interposed between the rolling elements adjacent to each other;
   coupling arms coupling the spacer portions with one another and hanging over outwardly from end faces of the spacer portions so as to be guided by the guide grooves; and
   rolling element accommodating portions defined by the spacer portions and the coupling arms and accommodating the rolling element individually so as to align the rolling elements in an arrangement direction in which the rolling element aligns within the endless circulation path,
wherein the spacer comprises an abutting face abutting on the rolling element
the abutting face abuts on the rolling element with at least two positions,
the abutting face prevents the rolling element from moving to an inner diameter side of the endless circulation path,
a part of preventing a motion of the rolling element is formed as a slope,
an inclination angle of the slope satisfies following equation (1):

$$\theta k \leq \tan^{-1}(((Rb+e)\sin\theta w-(tw/2)\cos\theta w/((Rb+e)\cos\theta w+(tw/2)\sin\theta w-Rp)))-\theta w \quad (1)$$

where $\theta w = tw/2Rb$ (rad),
$\theta k$ is an inclination angle (deg) of the slope relative to the direction perpendicular to the arrangement direction,
tw is a distance (mm) between centers of the adjacent rolling elements when the rolling-element accommodating belt is developed,
Rb is a curvature of radius (mm) of central line of the rolling-element Accommodating belt at a center of the direction converting path when the rolling-element accommodating belt curves along the guide groove,
"e" is a distance (mm) from a center of the rolling element to a center line of the rolling-element accommodating belt,
Rp is a curvature of radius (mm) of the central locus of the rolling element at the center of the direction converting path, and
wherein the inclination angle of the respective slope of the inward abutting faces relative to a direction perpendicular to the arrangement direction path is constant.

* * * * *